US012527835B2

(12) United States Patent
Cho et al.

(10) Patent No.: US 12,527,835 B2
(45) Date of Patent: Jan. 20, 2026

(54) BREVICAN-BINDING PEPTIDES FOR BRAIN TUMOR IMAGING

(71) Applicant: The Brigham and Women's Hospital, Inc., Boston, MA (US)

(72) Inventors: Choi-Fong Cho, Boston, MA (US); Sean Edward Lawler, Scituate, MA (US); Mariano Sebastian Viapiano, Newton, MA (US)

(73) Assignee: The Brigham and Women's Hospital, Inc., Boston, MA (US)

( * ) Notice: Subject to any disclaimer, the term of this patent is extended or adjusted under 35 U.S.C. 154(b) by 1003 days.

(21) Appl. No.: 17/282,028

(22) PCT Filed: Oct. 1, 2019

(86) PCT No.: PCT/US2019/054064
§ 371 (c)(1),
(2) Date: Apr. 1, 2021

(87) PCT Pub. No.: WO2020/072491
PCT Pub. Date: Apr. 9, 2020

(65) Prior Publication Data
US 2021/0353708 A1 Nov. 18, 2021

Related U.S. Application Data

(60) Provisional application No. 62/739,845, filed on Oct. 1, 2018.

(51) Int. Cl.
*A61K 38/08* (2019.01)
*A61K 38/10* (2006.01)
*A61K 38/12* (2006.01)
*A61K 47/64* (2017.01)
*A61K 49/14* (2006.01)
*A61P 35/00* (2006.01)
*C07K 7/04* (2006.01)
*C07K 7/06* (2006.01)
*C07K 7/08* (2006.01)
*C07K 7/64* (2006.01)

(52) U.S. Cl.
CPC .............. *A61K 38/12* (2013.01); *A61K 47/64* (2017.08); *A61K 49/14* (2013.01); *A61P 35/00* (2018.01); *C07K 7/04* (2013.01); *C07K 7/64* (2013.01)

(58) Field of Classification Search
CPC ........ A61K 38/08; A61K 38/10; A61K 38/12; A61K 47/64; A61K 49/14; A61P 35/00; C07K 7/04; C07K 7/64; C07K 7/06; C07K 7/08
See application file for complete search history.

(56) References Cited

U.S. PATENT DOCUMENTS

| 7,820,436 | B2* | 10/2010 | Mori | ................... | A61K 35/763 |
| | | | | | 435/320.1 |
| 2005/0227322 | A1* | 10/2005 | Lindquist | ............. | C07K 14/721 |
| | | | | | 435/254.2 |
| 2007/0061916 | A1* | 3/2007 | Kovalic | ............... | C07K 14/415 |
| | | | | | 536/23.6 |
| 2011/0296543 | A1* | 12/2011 | Chang | ............ | C12Y 302/01004 |
| | | | | | 800/13 |
| 2016/0302425 | A1 | 10/2016 | DiDonato et al. | | |
| 2017/0015757 | A1 | 1/2017 | Viapiano et al. | | |

FOREIGN PATENT DOCUMENTS

WO WO 2007056536 5/2007

OTHER PUBLICATIONS

Chang et al., Seq Id No. 87861 from US 2011/0296543. 2011.*
Mori et al., Seq Id No. 133 from U.S. Pat. No. 7,820,436. 2010.*
Amadei et al., "A fast, reproducible and low-cost method for sequence deconvolution of 'on-bead'peptides via 'on-target' maldi-TOF/TOF mass spectrometry," Journal of Mass Spectrometry, Mar. 2010, 45(3):241-51.
Chen et al., "Modern methods for delivery of drugs across the blood-brain barrier," Advanced Drug Delivery Reviews, May 15, 2012, 64(7):640-65.
Cho et al., "Blood-brain-barrier spheroids as an in vitro screening platform for brain-penetrating agents," Nature Communications, Jun. 6, 2017, 8(1), 14 pages.
Cho et al., "DDIS-19. Novel Peptide Homing to Glioma-Specific Isoform of Brevican Selectively Targets Malignant Brain Tumors," Neuro-Oncology, Nov. 2017, 19(Suppl 6):vi62, 2 pages (abstract only).
Cho et al., "Design of a microfluidic chip for magnetic-activated sorting of one-bead-one-compound libraries," ACS Combinatorial Science, Jun. 13, 2016, 18(6):271-8.
Cho et al., "Discovery of novel integrin ligands from combinatorial libraries using a multiplex "beads on a bead" approach," Nano Letters, Nov. 14, 2012, 12(11):5957-65.
Cho et al., "Exth-51. Brevican-Specific Peptides for the Development of Next-Generation Targeted Theranostics for Malignant Gliomas," Neurooncology, Nov. 2016, 18(Supp 6), 1 page (abstract only).
Cho et al., "High-throughput screening of one-bead-one-compound peptide libraries using intact cells," ACS Combinatorial Science, Aug. 12, 2013, 15(8):393, 25 pages.
Cho et al., "Viral nanoparticles decorated with novel EGFL7 ligands enable intravital imaging of tumor neovasculature," Nanoscale, Aug. 2017, 9(33):12096-109.
Dhermain et al., "Advanced MRI and PET imaging for assessment of treatment response in patients with gliomas," The Lancet Neurology, Sep. 1, 2010, 9(9):906-20.
Dwyer et al., "Brevican knockdown reduces late-stage glioma tumor aggressiveness," Journal of Neuro-Oncology, Oct. 2014, 120(1):63-72.

(Continued)

Primary Examiner — Julie Ha
(74) Attorney, Agent, or Firm — Fish & Richardson P.C.

(57) ABSTRACT

Provided herein are compositions comprising peptides that bind specifically to BΔg (deglycosylated brevican), and methods of use thereof to deliver therapeutic and diagnostic agents to brevican-expressing cells, e.g., cancerous cells, e.g., brain cancer cells, e.g., glioblastoma cells.

36 Claims, 58 Drawing Sheets

Specification includes a Sequence Listing.

(56) References Cited

OTHER PUBLICATIONS

Fadzen et al., "Perfluoroarene-based peptide macrocycles to enhance penetration across the blood-brain barrier," Journal of the American Chemical Society, Nov. 8, 2017, 139(44):15628-31.

Garcia-Carbonero et al., "Current perspectives on the clinical experience, pharmacology, and continued development of the camptothecins," Clinical Cancer Research, Mar. 1, 2002, 8(3):641-61.

GenBank: ADG12460.1, "signal transduction histidine kinase [Caulobacter segnis ATCC 21756]," dated Jan. 28, 2014, 2 pages.

Giannini et al., "Patient tumor EGFR and PDGFRA gene amplifications retained in an invasive intracranial xenograft model of glioblastoma multiforme," Neuro-oncology, Apr. 1, 2005, 7(2):164-76.

Hayashi-Takanaka et al., "Evaluation of chemical fluorescent dyes as a protein conjugation partner for live cell imaging," PloS one, Sep. 3, 2014, 9(9):e106271, 11 pages.

Henne et al., "Synthesis and activity of a folate peptide camptothecin prodrug," Bioorganic & Medicinal Chemistry Letters, Oct. 15, 2006, 16(20):5350-5.

Holland, "Glioblastoma multiforme: the terminator," Proceedings of the National Academy of Sciences, Jun. 6, 2000, 97(12):6242-4.

Hu et al., "The proteoglycan brevican binds to fibronectin after proteolytic cleavage and promotes glioma cell motility," Journal of Biological Chemistry, Sep. 5, 2008, 283(36):24848-59.

Jaworski et al., "BEHAB (brain enriched hyaluronan binding) is expressed in surgical samples of glioma and in intracranial grafts of invasive glioma cell lines," Cancer Research, May 15, 1996, 56(10):2293-8.

Jaworski et al., "BEHAB, a new member of the proteoglycan tandem repeat family of hyaluronan-binding proteins that is restricted to the brain," The Journal of Cell Biology, Apr. 15, 1994, 125(2):495-509.

Johnson et al., "Mutational analysis reveals the origin and therapy-driven evolution of recurrent glioma," Science, Jan. 10, 2014, 343(6167):189-93.

Kalepu et al., "Insoluble drug delivery strategies: review of recent advances and business prospects," Acta Pharmaceutica Sinica B, Sep. 1, 2015, 5(5):442-53.

Kemper et al., "Modulation of the blood-brain barrier in oncology: therapeutic opportunities for the treatment of brain tumours?," Cancer Treatment Reviews, Aug. 1, 2004, 30(5):415-23.

Ladner et al., "Phage display-derived peptides as therapeutic alternatives to antibodies," Drug Discovery Today, Jun. 1, 2004, 9(12):525-9.

Lam et al., "A new type of synthetic peptide library for identifying ligand-binding activity," Nature, Nov. 1991, 354(6348):82-4.

Leriche et al., "Cleavable linkers in chemical biology," Bioorganic & Medicinal Chemistry, Jan. 15, 2012, 20(2):571-82.

Liskamp et al., "Bioactive macrocyclic peptides and peptide mimics," Modern Supramolecular Chemistry: Strategies for Macrocycle Synthesis, Feb. 13, 2008, 1-27.

Löscher et al., "Drug resistance in brain diseases and the role of drug efflux transporters," Nature Reviews Neuroscience, Aug. 2005, 6(8):591-602.

Louis, "Molecular pathology of malignant gliomas," Annu. Rev. Pathol. Mech. Dis., Feb. 28, 2006. 1:97-117.

Lu et al., "The role of brevican in glioma: promoting tumor cell motility in vitro and in vivo," BMC Cancer, Dec. 2012, 12(1):1-0, 10 pages.

McLendon et al., "Comprehensive genomic characterization defines human glioblastoma genes and core pathways," Nature, Oct. 23, 2008, 455(7216):1061-8.

Mijalis et al., "A fully automated flow-based approach for accelerated peptide synthesis," Nature Chemical Biology, Feb. 2017, 13(5):464, 5 pages.

Milton et al., "Total chemical synthesis of a D-enzyme: the enantiomers of HIV-1 protease show reciprocal chiral substrate specificity [corrected]," Science, Jun. 5, 1992, 256(5062):1445-8.

Morgan et al., "Dendrimer-encapsulated camptothecins: increased solubility, cellular uptake, and cellular retention affords enhanced anticancer activity in vitro," Cancer Research, Dec. 15, 2006, 66(24):11913-21.

Motl et al., "Pharmacokinetic considerations in the treatment of CNS tumours," Clinical Pharmacokinetics, Sep. 2006, 45(9):871-903.

Oberlies et al., "Camptothecin and taxol: historic achievements in natural products research," Journal of Natural Products, Feb. 27, 2004, 67(2):129-35.

PCT International Preliminary Report on Patentability in International Appln. No. PCT/US2019/054064, dated Apr. 15, 2021, 7 pages.

PCT International Search Report and Written Opinion in International Appln. No. PCT/US2019/054064, dated Mar. 10, 2020, 11 pages.

Phillips et al., "Molecular subclasses of high-grade glioma predict prognosis, delineate a pattern of disease progression, and resemble stages in neurogenesis," Cancer Cell, Mar. 1, 2006, 9(3):157-73.

Polivka et al., "Advances in experimental targeted therapy and immunotherapy for patients with glioblastoma multiforme," Anticancer Research, Jan. 1, 2017, 37(1):21-33.

Raavé et al., "Chemotherapeutic drug delivery by tumoral extracellular matrix targeting," Journal of Controlled Release, Mar. 28, 2018, 274:1, 22 pages.

Rudolf et al., "Chemical proteomics: ligation and cleavage of protein modifications," Current Opinion in Chemical Biology, Feb. 1, 2013, 17(1):110-7.

Saito et al., "Drug delivery strategy utilizing conjugation via reversible disulfide linkages: role and site of cellular reducing activities," Advanced Drug Delivery Reviews, Feb. 10, 2003, 55(2):199-215.

Simon et al., "Rapid flow-based peptide synthesis," Chembiochem: a European Journal of Chemical Biology, Mar. 21, 2014, 15(5):713-20.

Stupp et al., "Radiotherapy plus concomitant and adjuvant temozolomide for glioblastoma," New England Journal of Medicine, Mar. 10, 2005, 352(10):987-96.

Verhaak et al., "Integrated genomic analysis identifies clinically relevant subtypes of glioblastoma characterized by abnormalities in PDGFRA, IDH1, EGFR, and NF1," Cancer Cell, Jan. 19, 2010, 17(1):98-110.

Viapiano et al., "A novel membrane-associated glycovariant of BEHAB/brevican is up-regulated during rat brain development and in a rat model of invasive glioma," Journal of Biological Chemistry, Aug. 29, 2003, 278(35):33239-47.

Viapiano et al., "BEHAB/brevican requires ADAMTS-mediated proteolytic cleavage to promote glioma invasion," Journal of Neurooncology, Jul. 2008, 88(3):261-72.

Viapiano et al., "Novel tumor-specific isoforms of BEHAB/brevican identified in human malignant gliomas," Cancer Research, Aug. 1, 2005, 65(15):6726-33.

Welch et al., "Potent D-peptide inhibitors of HIV-1 entry," Proceedings of the National Academy of Sciences, Oct. 23, 2007, 104(43):16828-33.

Zhang et al., "Expression of a cleaved brain-specific extracellular matrix protein mediates glioma cell invasion in vivo," Journal of Neuroscience, Apr. 1, 1998, 18(7):2370-6.

Zhang et al., "Peptides in cancer nanomedicine: drug carriers, targeting ligands and protease substrates," Journal of Controlled Release, Apr. 10, 2012, 159(1):2-13.

\* cited by examiner

■ BΔg-peptide: VHGPPTETLPTPRE
■ Scramble peptide: TRELTPGVETHPPP

SCREEN 1: Magnetic-activated screen i) Negative screen

Scramble peptide

Discard ii) Positive screen

BΔg peptide

Collected for SCREEN 2

Microfluidic magnetic-activated sorter

Bare beads

"Hit" beads (magnetized)

| Peptide | Sequence | MW (Da) | Predicted PI | Charge at pH 7 |
|---|---|---|---|---|
| BTP-2 | W R K A F T G Y | 1028.16 | 10.05 | +1.91 |
| BTP-3 | R R R H D A N P | 1021.09 | 11.8 | +2.08 |
| BTP-5 | N K H V F R H W | 1123.27 | 11.05 | +2.24 |
| BTP-7 | T K W G H V N K | 969.09 | 10.01 | +2.07 |
| BTP-8 | T I R K L V R H | 1022.24 | 12.11 | +3.07 |
| BTP-9 | A D R R Q R A I | 985.1 | 12.17 | +2.00 |
| BTP-10 | S H W A V N R F | 1016.11 | 10.05 | +1.08 |

| Specimen | Original ID | Age (years) | Gender | Diagnosis | PMI |
|---|---|---|---|---|---|
| Control 1 | C6 | 15.5 | M | suicide gunshot | 26 h |
| 2 | C3 | 4.5 | M | trauma | 15 h |
| 3 | C1 | 43 | M | epilepsy | surgery |
| 4 | Ad00/183 | 83 | M | AD stage 5 | 5 h |
| 5 | C18 | 54 | F | pulmonary thromb | 5 h |
| 6 | Ct11 | 60 | F | acoustic neuroma | surgery |
| 7 | Ad00/268 | 81 | F | AD stage 5 | 6 h |

| Specimen | Original ID | Age (years) | Gender | Diagnosis |
|---|---|---|---|---|
| Glioma 1 | G7 | 42 | F | GBM |
| 2 | Gli19 | 37 | F | GBM |
| 3 | G3 | 61 | M | ANAPLAST OLIGO |
| 4 | G1 | 45 | M | GBM |
| 5 | Gli16 | 46 | M | ANAPLAST OLIGO |
| 6 | G6 | 50 | M | GBM |
| 7 | Gli18 | 51 | M | GBM RECURR |
| 8 | G2 | 42 | M | GBM |
| 9 | G4 | 50 | M | GBM |
| 10 | Gli14 | 45 | F | GBM |
| 11 | Gli_8 | 58 | F | GBM RECURR |

*FIG. 8D*

MRI: Tumor formation (Day 15)

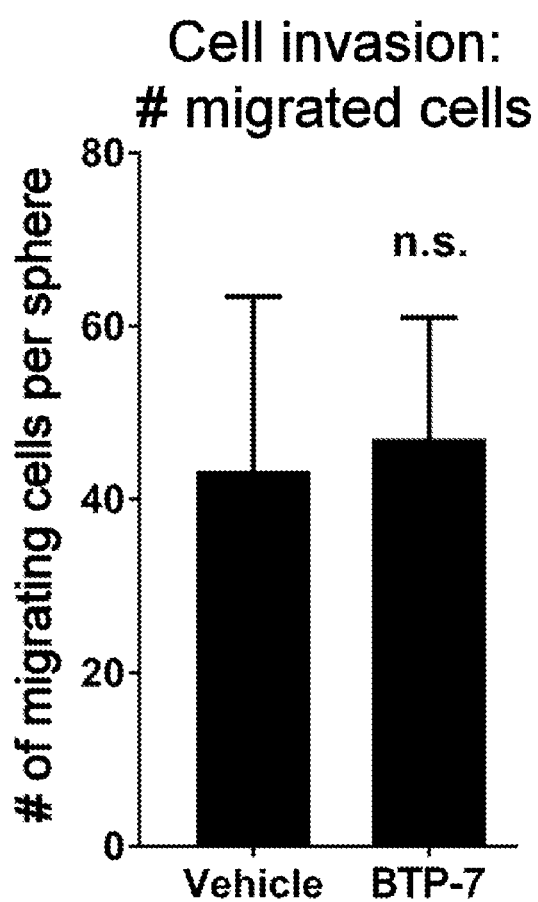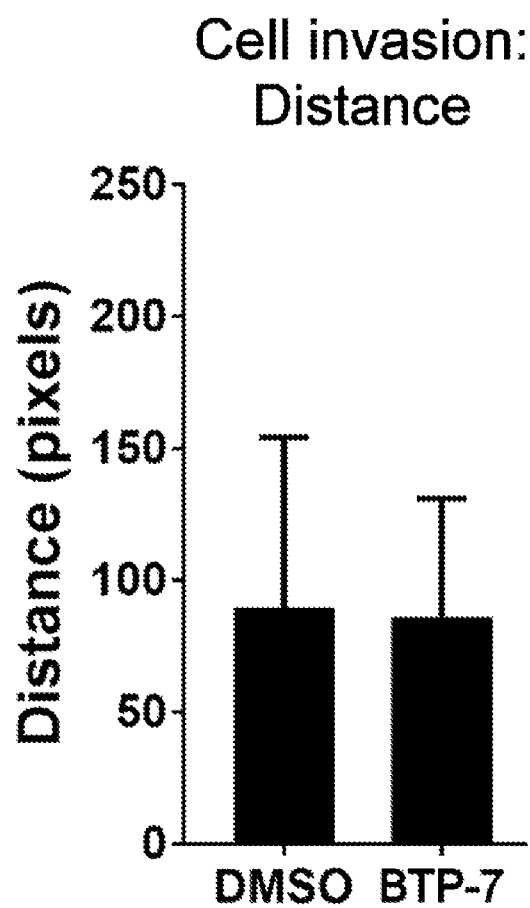
FIG. 15B
FIG. 15C a) CH$_2$Cl$_2$, 2 hr RT. b) Triphosgene, 4-dimethylaminopyridine, CH$_2$Cl$_2$, 15 min. c) 3, 6 hr RT. d) 6, 0.1 M 2-ethanesulfonic acid pH = 6 in H$_2$O, DMSO 1 hr RT.

BREVICAN-BINDING PEPTIDES FOR BRAIN TUMOR IMAGING

CLAIM OF PRIORITY

This application is a National Stage application under 35 U.S.C. § 371 of International Application No. PCT/US2019/054064, having an International Filing Date of Oct. 1, 2019, which claims the benefit of U.S. Provisional Application Ser. No. 62/739,845, filed on Oct. 1, 2018. The entire contents of the foregoing are incorporated herein by reference.

GOVERNMENT SUPPORT

This invention was made with government support under W81XWH-19-1-0791 awarded by the Army Medical Research and Development Command. The government has certain rights in the invention.

SEQUENCE LISTING

This application contains a Sequence Listing that has been submitted electronically as an ASCII text file named "29618-0186US1_SL.txt." The ASCII text file, created on Mar. 31, 2021, is 2,897 bytes in size. The material in the ASCII text file is hereby incorporated by reference in its entirety.

TECHNICAL FIELD

Described herein are compositions comprising peptides that bind specifically to BΔg (deglycosylated brevican), and methods of use thereof to deliver therapeutic and diagnostic agents to brevican-expressing cells, e.g., cancerous cells, e.g., brain cancer cells, e.g., glioblastoma cells.

BACKGROUND

High-grade gliomas including grade III and IV (glioblastoma; GBM) are aggressive brain tumors and considered incurable. Patient prognosis remains poor (median survival is approximately 14 months) after surgery and aggressive chemo-radiotherapy.[1,2] Invasive glioma cells disperse into the surrounding brain tissues, and during surgery, these cells are indistinguishable from healthy tissues by modern medical imaging. Current non-invasive imaging technologies in the clinic lack the sensitivity and precision to readily detect every malignant cell.[3] Furthermore, excising too much normal brain tissue can risk impacting the patient negatively. Thus, complete surgical resection of all tumor cells at the molecular level is generally impossible, and many of these tumor cells also escape radiation therapy.[4] The blood-brain-barrier (BBB) poses another hurdle for therapeutic delivery and protects the invasive glioma cells from most systemic chemotherapeutics.[4,5,6] Collectively, these factors hamper the success of therapy in patients with high-grade gliomas, and lead to tumor recurrence and patient morbidity. On the other hand, potent chemotherapeutics that cross the BBB usually damage healthy tissues and cause toxicity issues that may force early termination of a potentially successful treatment. These roadblocks limit progress in the neuro-oncology field, and highlight the critical need for novel therapies with improved brain-delivery and tumor-recognition capabilities that can effectively destroy only glioma cells while sparing healthy tissues.

Gliomas display a high level of intratumoral cellular heterogeneity. Therefore, strategies to target the tumor extracellular matrix (ECM) may confer advantages over conventional targeted-therapies that are specific for membrane receptors on select tumor cell populations.[7]

SUMMARY

High-grade gliomas are deadly, and current standard-of-care has demonstrated limited success. The ability to specifically target glioma cells can allow for the development of safer and more efficacious brain cancer therapy strategies. Brevican (Bcan), a CNS-specific extracellular matrix protein is upregulated in glioma cells and its expression correlates with tumor progression. Particularly, a Bcan isoform lacking glycosylation, BΔg is a unique glioma marker and not expressed in non-cancerous tissues. Therefore, BΔg represents a valuable target for anti-cancer strategies. Described herein is screening of a one-bead-one-compound combinatorial peptide library to discover a novel "BΔg-Targeting Peptides", called BTP-7 that can bind BΔg with high affinity and specificity. BTP-7 displayed little association with the glycosylated Bcan. Scrambling of the BTP-7 sequence led to complete abrogation of BΔg binding. Furthermore, BTP-7 is preferentially taken up by BΔg-expressing glioma cells compared with non-expressing cells. BTP-7 can also cross the blood-brain-barrier (BBB) as demonstrated using both the in vitro BBB organoid and in mice models. BTP-7 displayed 10× greater binding to intracranial GBM-6 tumors than control peptides, and 4× higher tumor uptake than in normal brain tissues. As a proof-of-concept, conjugation of BTP-7 to camptothecin (an anti-tumor drug) via a cleavable linker led to increased DNA damage in intracranial GBM-6 tumors and prolonged survival in tumor-bearing mice. The present results show that the peptides described herein, especially BTP-7, can be used as targeted therapeutics in patients with brain cancer including advanced brain cancer.

Thus, provided herein are isolated peptides that bind to deglycosylated brevican (BΔg), comprising a sequence shown in FIG. 3A, or a variant thereof that is at least 80% identical to a sequence shown in FIG. 3A (e.g., 5, 6, 7, or 8 consecutive nucleotides of a sequence shown in FIG. 3A), wherein the variant retains the ability to bind BΔg.

In some embodiments, the isolated peptide comprises TKWGHVNK (SEQ ID NO:6) or a variant thereof.

In some embodiments, the isolated peptide is modified.

In some embodiments, one or more, and optionally all, of the amino acids in the peptide sequence are amino acid analogs.

In some embodiments, the amino acid analogs are selected from the group consisting of D-amino acid enantiomers or unnatural amino acids.

In some embodiments, the peptide is cyclized.

In some embodiments the peptide is biotinylated at the amino terminus and/or amidated at the carboxy terminus.

In some embodiments, the isolated peptide is linked to a payload. In some embodiments, the isolated peptide is linked to a payload selected from the group consisting of therapeutic agents and detectable agents. In some embodiments, the isolated peptide is linked to a payload selected from the group consisting of antibodies, peptides, oligonucleotides, and microbubbles. In some embodiments, the isolated peptide the therapeutic agent comprises a cytotoxin, radioactive ion, or chemotherapeutic agent. In some embodiments, the isolated peptide the detectable agent comprises a fluorophore, radioactive ion, or contrast agent. In some embodiments, the isolated peptide the detectable agent comprises a nanoparticle. In some embodiments, the isolated peptide the nanoparticle comprises an iron oxide nanoparticle, preferably a gadolinium functionalized iron oxide nanoparticle; peptide-coated nanoparticle; gold nanoparticle; and/or superparamagnetic iron oxide nanoparticle micelle.

Also provided herein are compositions comprising the isolated peptides described herein.

Further, provided herein are methods for treating a subject who has a brain cancer, the method comprising administering to the subject a therapeutically effective amount of a peptide described herein, e.g., a peptide linked to a therapeutic agent (preferably an agent that is effective in treating the cancer). Also provided are the peptides for use in a method of treating a subject who has cancer.

Additionally, provided herein are methods for detecting brain cancer in a subject, the method comprising administering to the subject a detectable amount of an isolated peptide as described herein that is linked to a payload comprising a detectable agent, and detecting a signal from the detectable agent in the brain of the subject. Also provided are the peptides for use in a method of detecting a cancer in a subject, e.g., a brain cancer.

In some embodiments, the brain cancer is a glioma. In some embodiments, the glioma is glioblastoma.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

in tumor and non-tumor tissues. Scale bar: 100 microns. Statistics were performed using the two-way ANOVA and Sidak's Multiple Comparison test ($n_{tissue}=3$; ** $p<0.0001$,  $p<0.01$). (d) Bar graph showing the level of DNA damage (from panel (c)) for each group. Nuclei from the images were selected and the percentage of nuclei that was positive for phosphor-H2AX staining was quantified using the ImageJ software ($n_{tissue}=3$).

FIGS. 8A-D. Expression of BΔg in high-grade glioma samples. (a) Western blot analyses showing a pan-Bcan polyclonal antibody recognizes all Bcan isoforms (top), while BG1 IgG recognizes only the BΔg isoform (bottom). Culture medium (CM) and cell membranes (mb) of U87 cells transfected with either a Bcan cDNA (B) or a mutated Bcan cDNA ($B_m$) sequence are analyzed by western blot. B. cells, where the three threonine residues within the a.a. 535-548 have been replaced with alanines can no longer be detected by the BG1 antibody. CM was additionally deglycosylated with sialidase and O-glycosydase (CM deglyc). (b) Western blot showing the expression level of BΔg in glioma stem cells (cultured as neurospheres in Neurobasal medium) derived from patients with IDH-wildtype GBM (from the Erasmus Medical Center, Netherlands). Additional pathology information is listed in the table below. (c) Expression of Bcan isoforms in high-grade gliomas (grade 3 or GBM) and control samples. A major glycosylated isoform of Bcan in all brain samples is observed. In contrast, high-grade glioma tissues exhibit an obvious BΔg band in all tumor specimens. Asterisk (*) in the blot indicates presence of hyper-sialylated Bcan. (d) Pathology reports for all tissue specimens shown in (c). PMI: Post-mortem interval for samples that were recovered after autopsy. Control samples were obtained from the NIH NeuroBioBank, while all tumor samples were obtained from Yale-New Haven Hospital, Division of Neurosurgery.

Figure 9A:
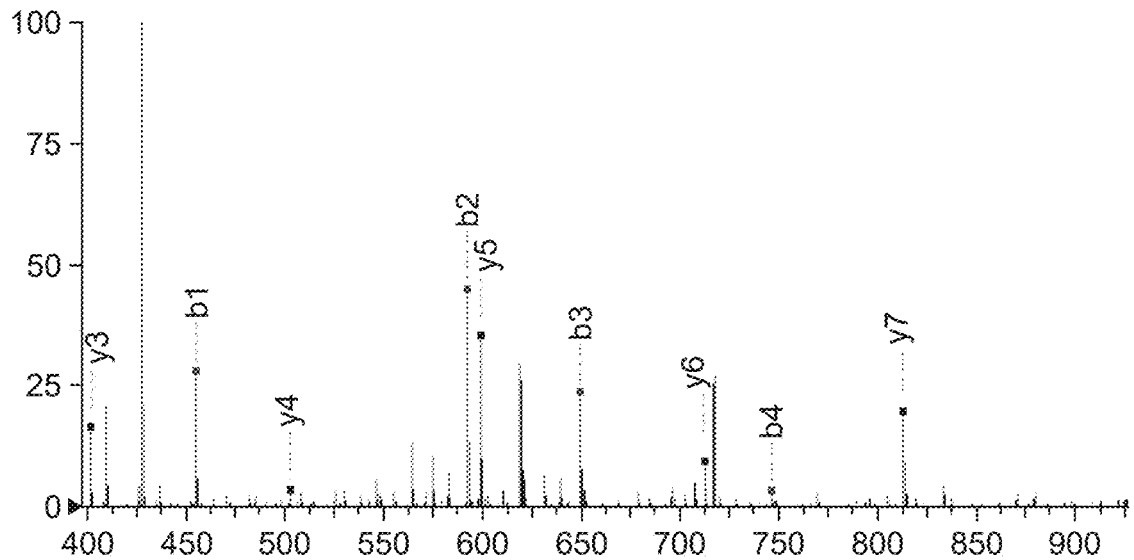
Figure 9B:
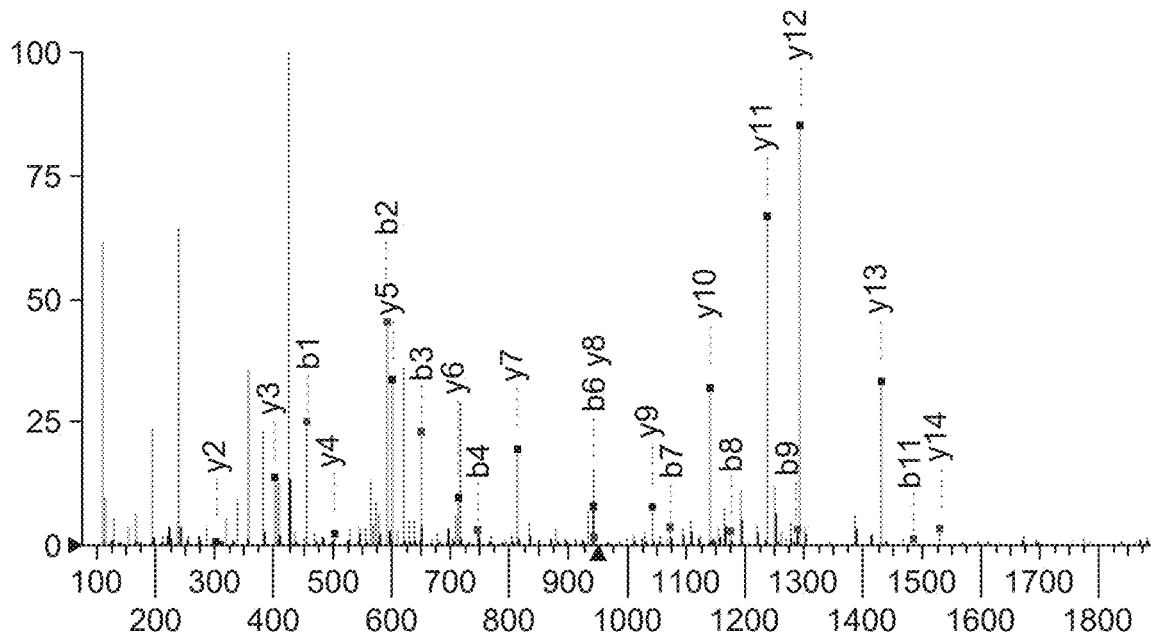

FIGS. 9A-B. Conjugation of BΔg-derived peptide on magnetic particles used for OBOC library screen. (a) BΔg-derived peptide sequence (residue 535-548, SEQ ID NO:1) or (b) scrambled peptide (SEQ ID NO:2) functionalized with a biotin on the C-terminus was conjugated onto streptavidin-coated magnetic particles. After rigorous washing to remove any unbound peptide, the magnetic particles were subjected to MALDI mass spectrometry. Spectra show the b and y ions of the corresponding peptide, confirming successful linkage of the peptide onto the particles.

Figure 10:
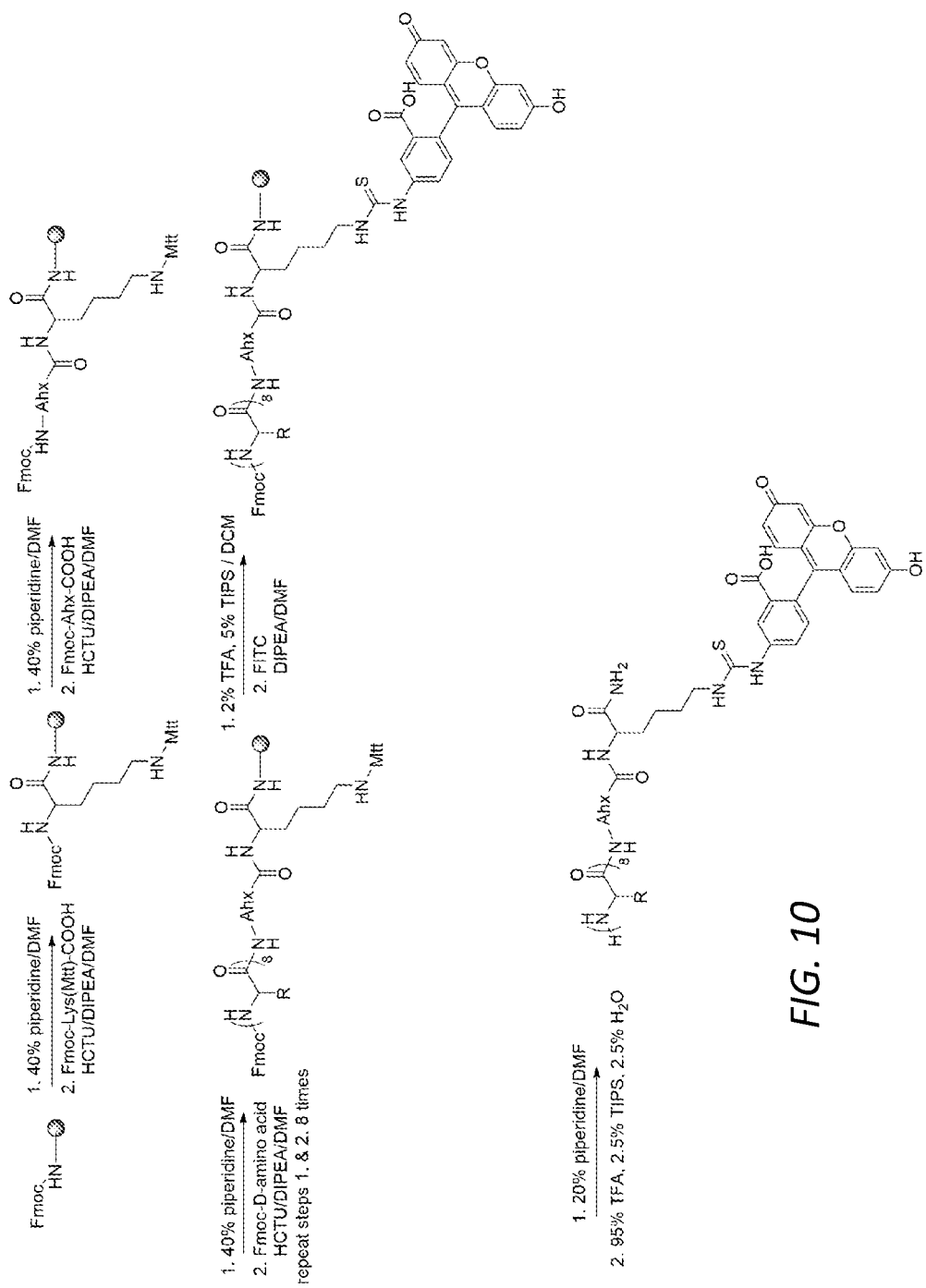

FIG. 10. Workflow for the synthesis of fluorescein (FITC)-labeled peptide. (See methods).

Figure 11:
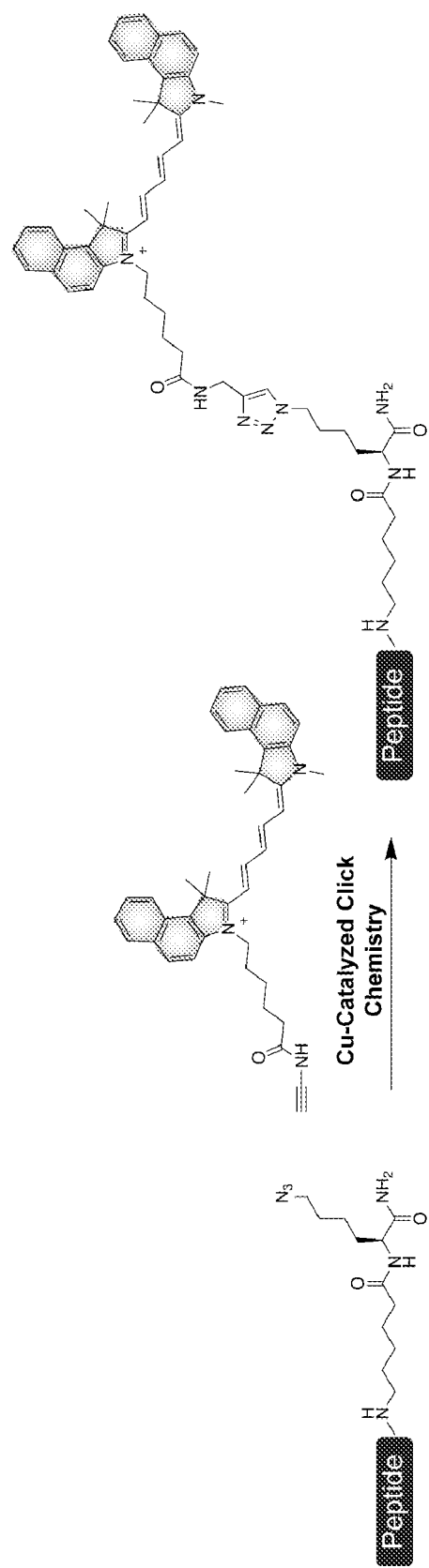
Figure 12A:
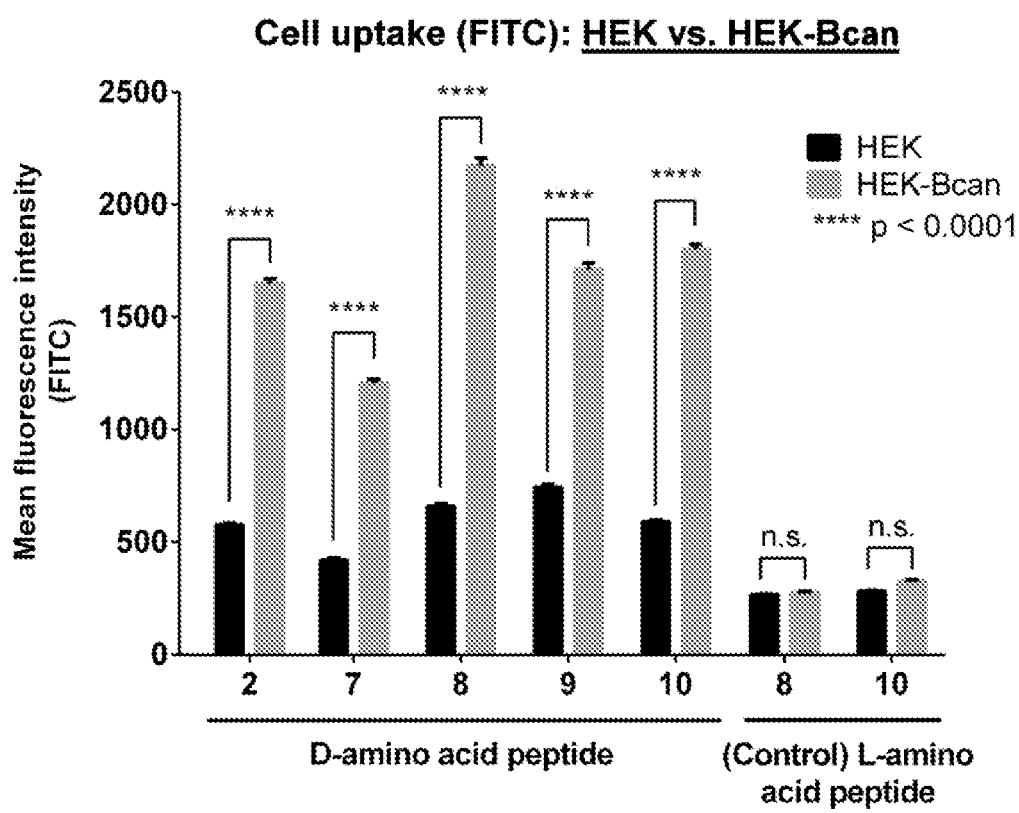
Figure 12B:
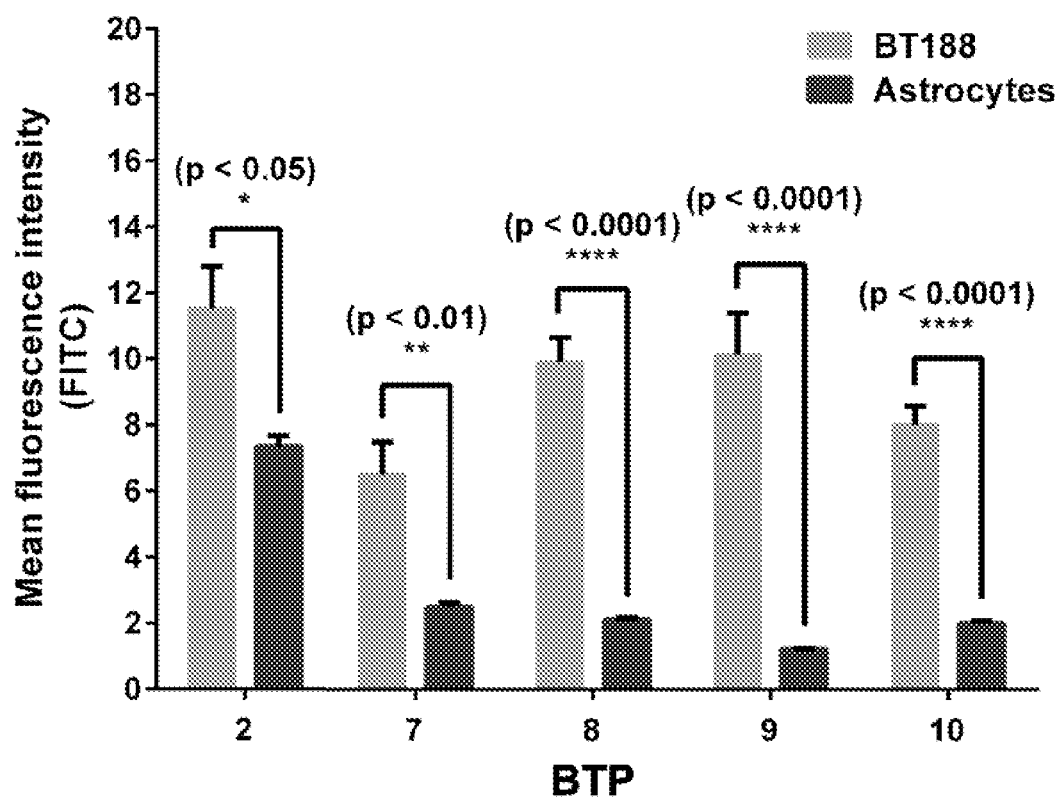
Figure 12C:
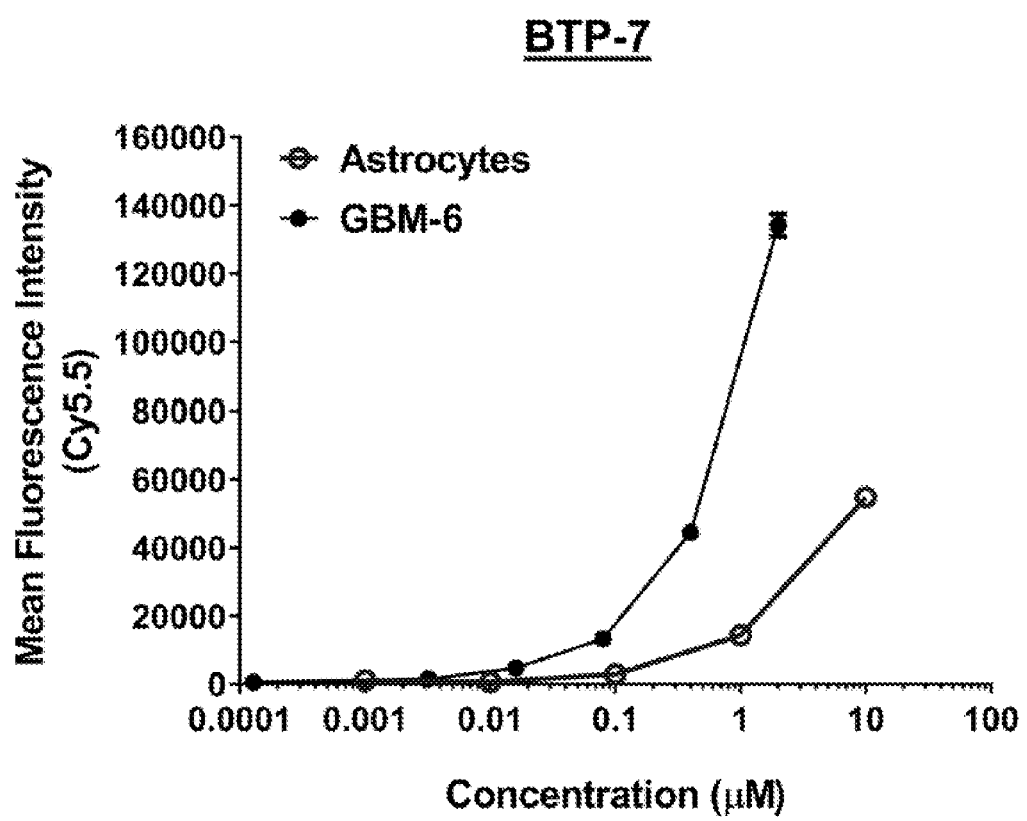
Figure 12D:
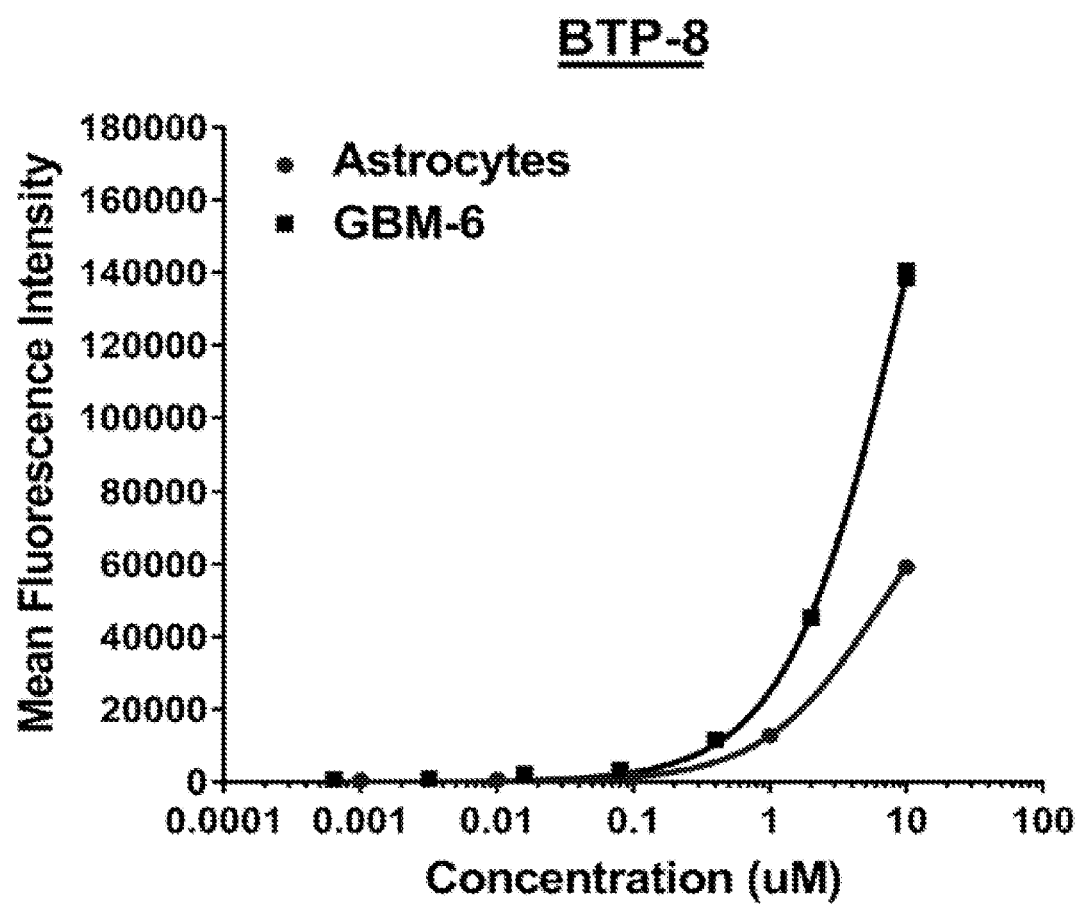
Figure 12E:
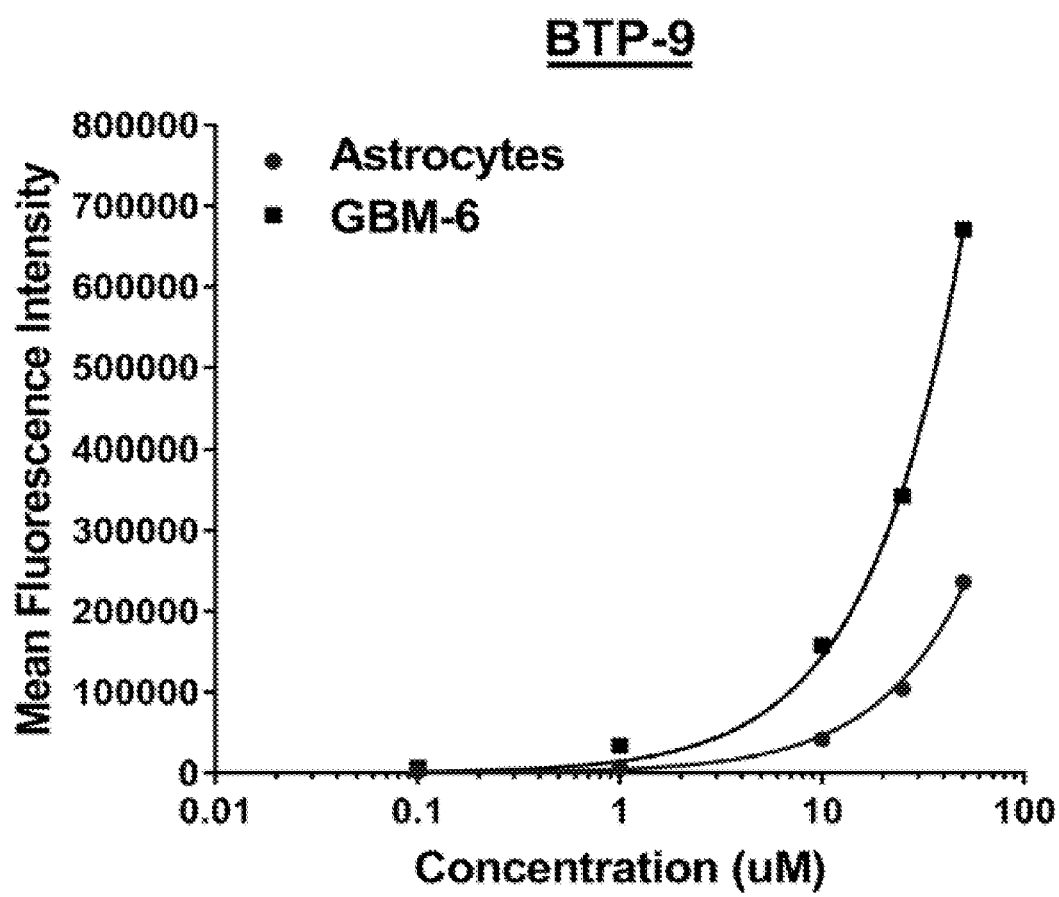
Figure 12F:
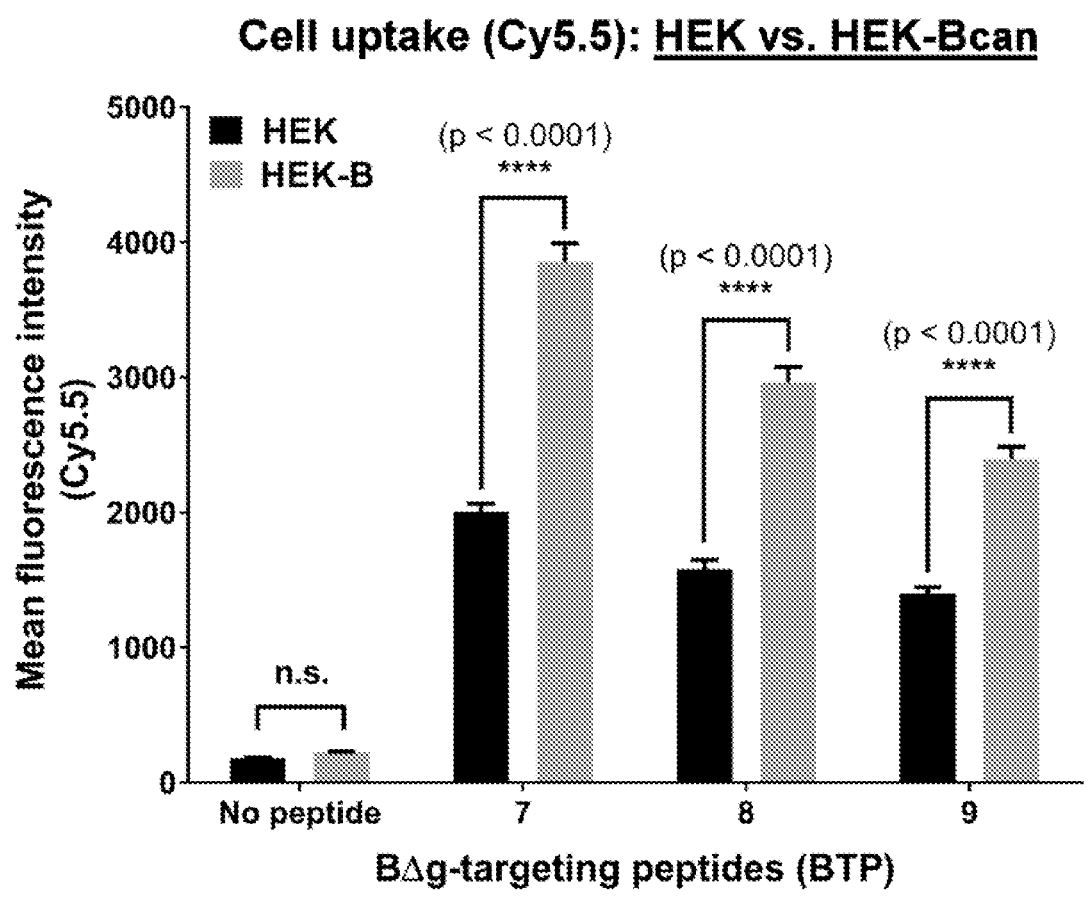
Figure 12G:
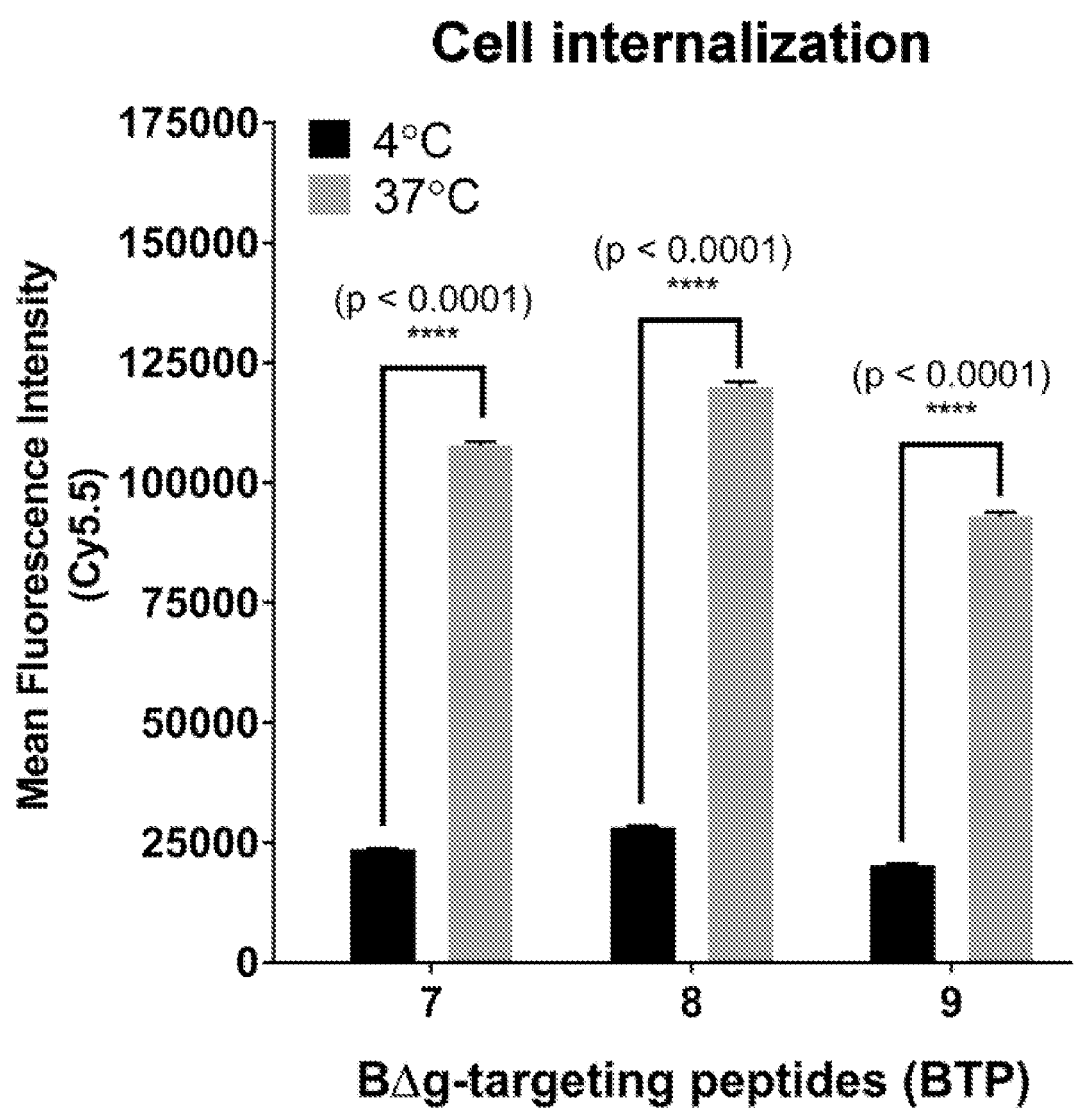
Figure 12H:
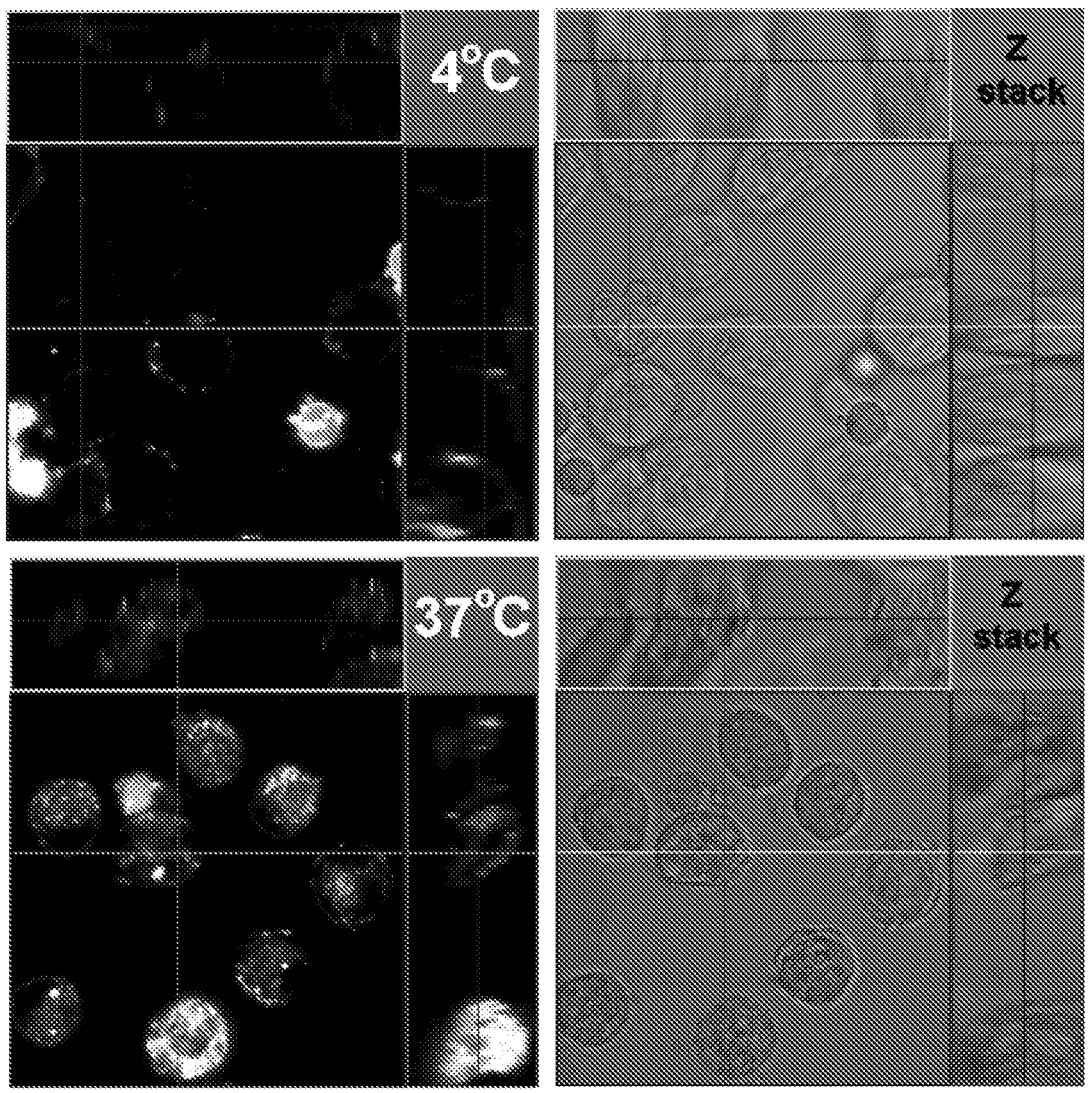

FIG. 11. Workflow for the synthesis of Cy5.5-labeled peptide. (See methods).

FIGS. 12A-H. Characterization of peptides for BΔg specificity using cell uptake studies. (a) Flow cytometry analysis showing that the uptake of fluorescein-conjugated BTP candidates made from D-amino acids (at 10 μM conc.) in HEK-Bcan cells was significantly higher than in regular HEK cells (BΔg-null) ($n_{events}=5,000$). When BTP-8 and BTP-10 were mutated to L-amino acids, the increased peptide uptake in HEK-Bcan cells was abrogated. The bar graph depicts the geometric mean fluorescence intensity with 95% confidence interval error bars, and statistics were performed using the two-way ANOVA and Sidak's Multiple Comparison test. (b) Uptake of fluorescein-labeled BTP-2, 7, 8, 9, and 10 (at 2 μM conc.) in BT188 (BΔg-high) glioma stem cells (GSCs) or astrocytes (BΔg-null). The graph shows mean fluorescence intensity quantified from fluorescence images of the GSCs (by confocal microscopy) with s.d. error bars ($n_{GSCs}=20$). Statistics were performed using the two-way ANOVA and Dunnett's Multiple Comparison test. Flow cytometry analysis showing that the uptake of Cy5.5-conjugated (c) BTP-7, (d) BTP-8 and (e) BTP-9 in GBM-6 GSCs (BΔg-positive) was significantly higher than in astrocytes ($n_{events}=20,000$). (f) Flow cytometry analysis showing that the uptake of Cy5.5-conjugated BTP-7, 8 and 9 (at 5 μM conc.) in HEK-Bcan cells was significantly higher than in regular HEK cells ($n_{events}=20,000$). (g) Flow cytometry analysis showing that the uptake of Cy5.5-conjugated BTP-7, 8 and 9 (at 5 μM conc.) in GBM-6 cells was significantly reduced at 4° C. (inhibition of endocytosis) compared to at 37° C., suggesting peptide internalization by cells at 37° C. ($n_{events}=20,000$). (h) Representative fluorescence images acquired using confocal microscopy depicting BTP-7 uptake/internalization into GBM-6 cells at 37° C. (but not at 4° C., as in (g)). A higher level of dead cells was also observed in the 4° C. group (shriveled cells seen in the bright field channel), which exhibited high non-specific binding/uptake of the peptides.

Figure 13A:
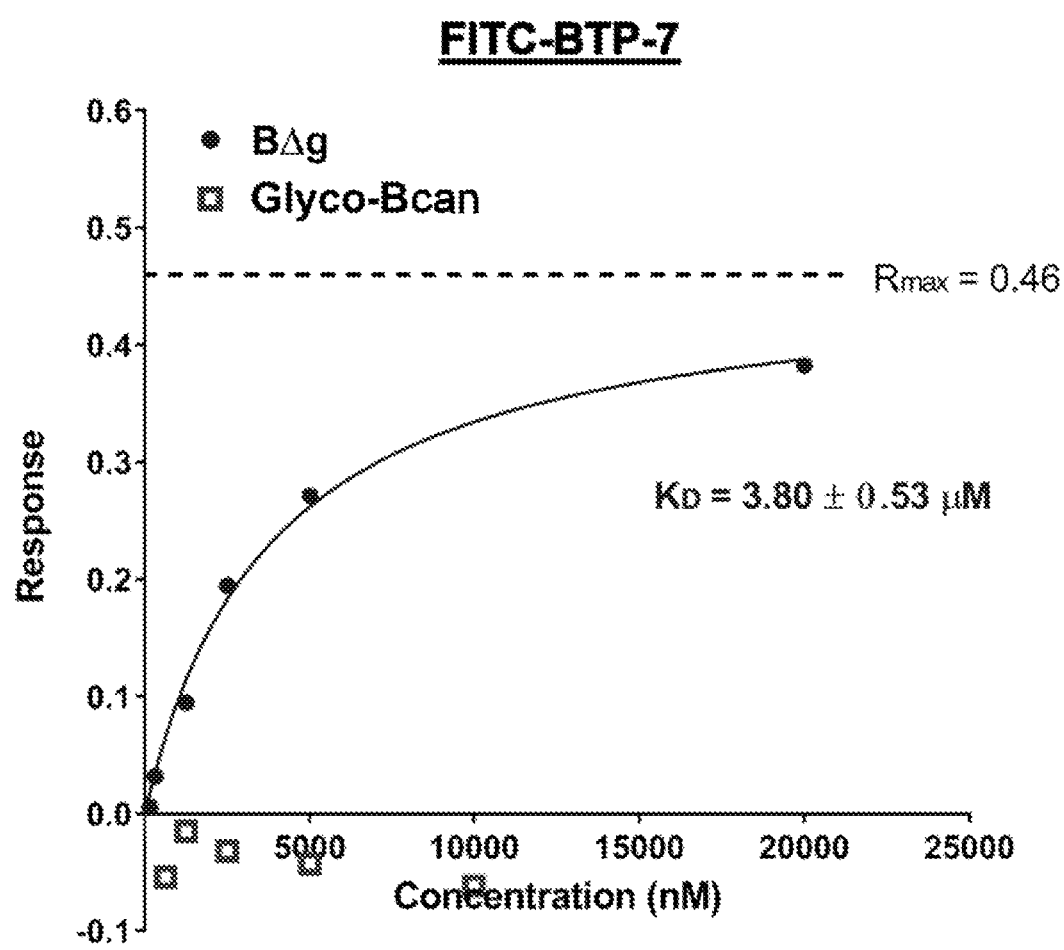
Figure 13B:
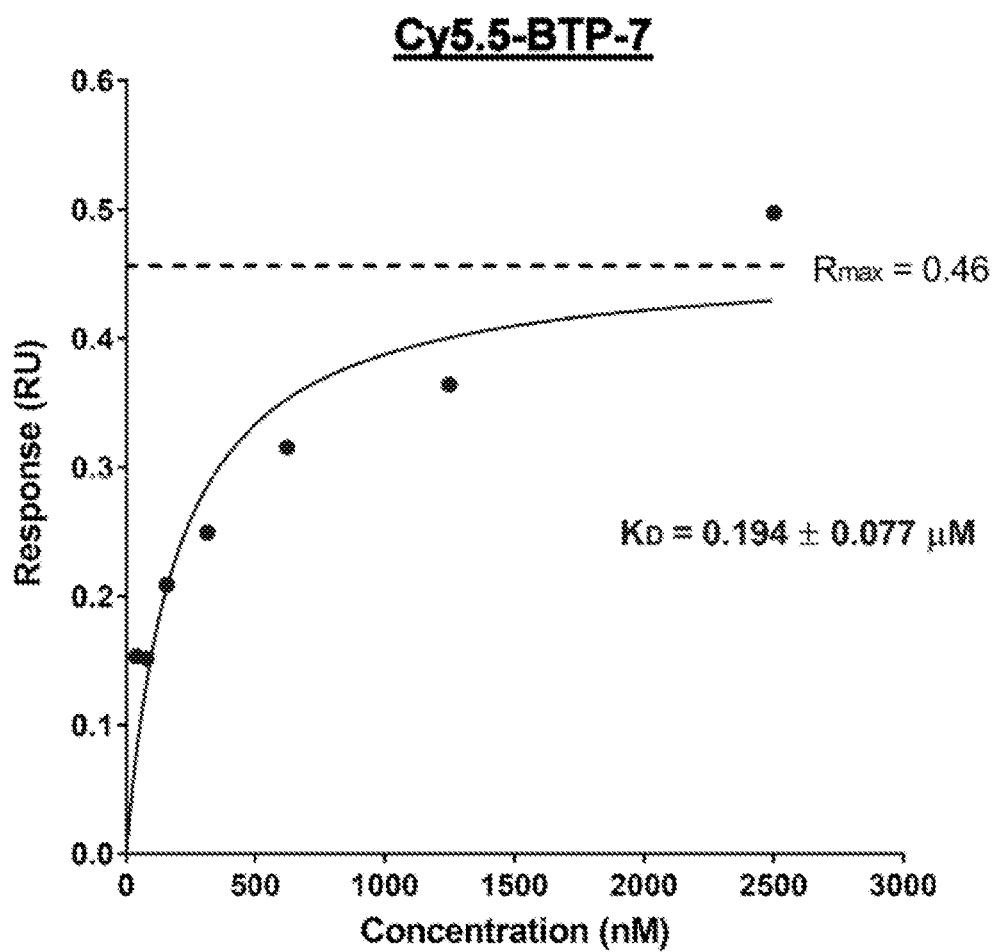

FIGS. 13A-B. Binding affinity of BTP-7 to BΔg protein. (a) Steady state analysis using the Octet platform (Forte Bio) to measure the binding affinity of fluorescein-labeled BTP-7 to recombinant BΔg or the fully glycosylated Bcan protein. (b) Steady state analysis to measure the binding affinity of Cy5.5-labeled BTP-7 to recombinant BΔg. The $K_D$ (dissociation constant) of each peptide to BΔg is indicated. All steady state curves were plotted on the GraphPad Prism software (version 7.03), and the $K_D$ and $R_{max}$ values were measured through a non-linear regression (one site specific binding) fit.

Figure 14A:
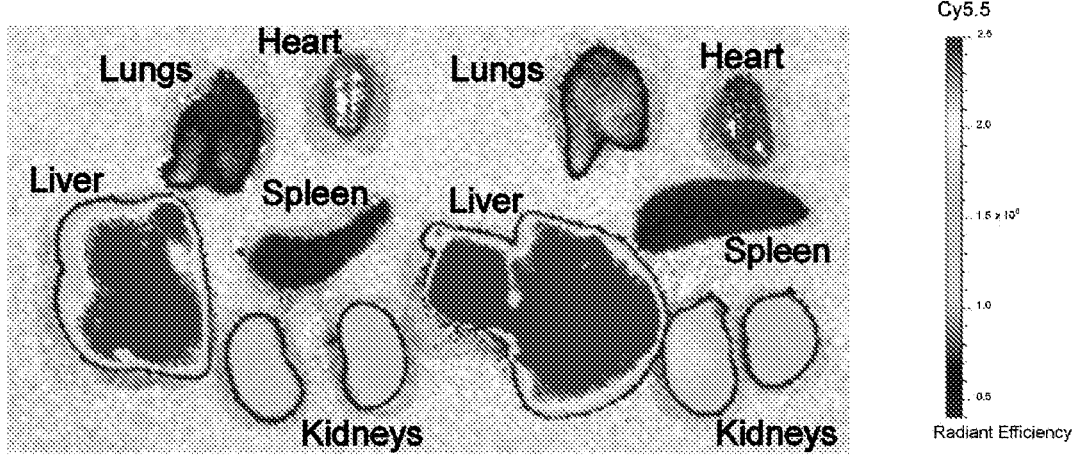
Figure 14B:
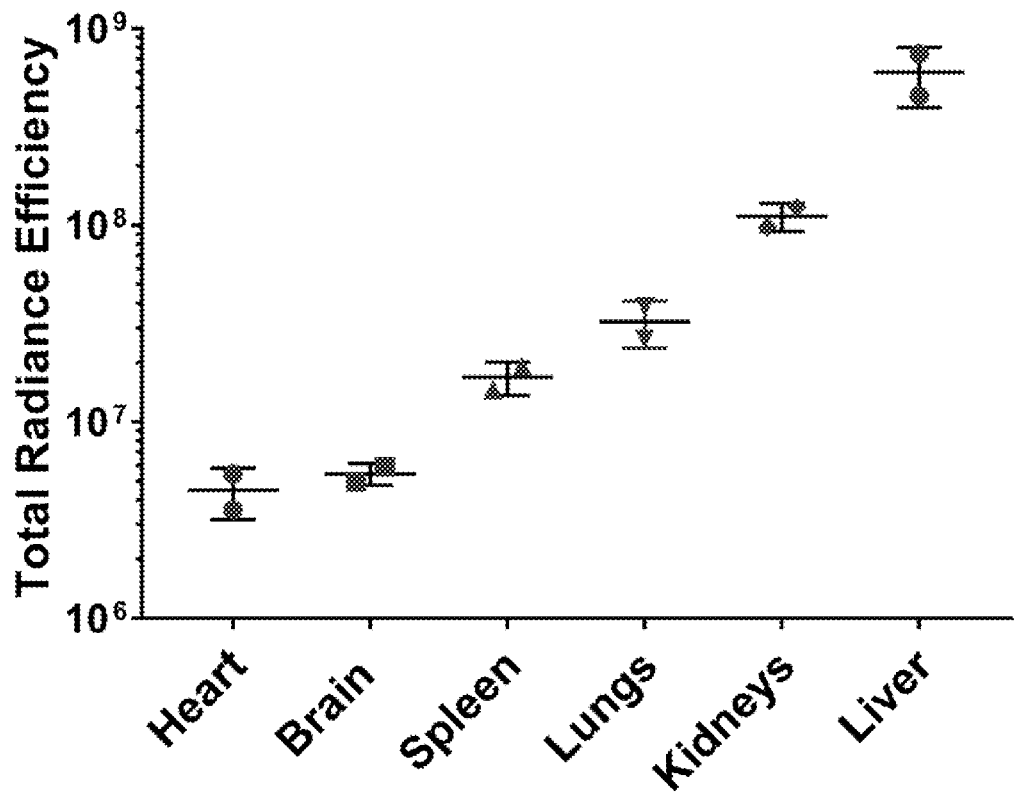
Figure 14C:
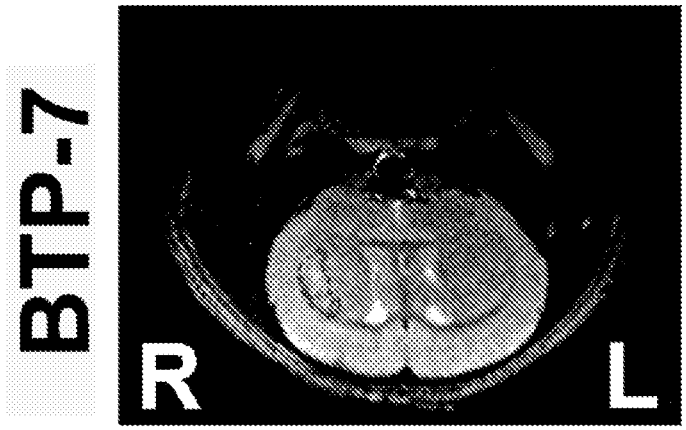
Figure 14C:
Figure 14C:

FIGS. 14A-C. In vivo analysis of BTP-7. (a) Biodistribution analysis of Cy5.5-labeled BTP-7 in mouse heart, lungs, liver, spleen and kidneys at 4 hrs post injection (100 μL of 100 μM peptide). Images of all organs were obtained by IVIS imaging after excitation at 640 nm (n=2). (b) Quantification of the total Cy5.5 radiance efficiency in all mouse organs. (c) Coronal section of mouse brains obtained through T2-weighted magnetic resonance imaging (MRI) showing intracranial GBM-6 xenograft tumors (delineated with dotted lines) established in the right frontal (2 representative images from each group are shown at Day 14 post-tumor implantation).

FIGS. 15A-D. BTP-7 does not affect GBM cell proliferation or invasion. (a) Luminescent cell viability (CellTitre Glo) assay showing that the BTP-7 peptide (50 μM conc.) does not affect GBM-6 glioma stem cells (14,000 cells per well) compared to a vehicle control at 48 hrs post incubation ($n_{well}=3$; s.d. error bars). Doxorubicin (DOX; 10 μM conc.) serves as a positive control drug. (b) BTP-7 peptide (50 μM conc.) does not affect the number of cells (per GBM-6 neurosphere) that have disseminated and migrated away from the body of the neurosphere. (c) BTP-7 peptide (50 μM conc.) does not affect GBM-6 cell invasion. GBM-6 neurospheres (n=3) were embedded in collagen and imaged over 60 hours. Each cell that has disseminated and migrated from the body of the neurosphere was tracked. The bar graph shows the average distance traveled by each cell, as measured using the ImageJ software. (d) Individual cellular track of GBM-6 cells that have migrated from the neurosphere ($n_{sphere}=3$) over 48 hrs in the presence of BTP-7 peptide (50 μM conc.) or the vehicle (DMSO) control.

Figure 16A:
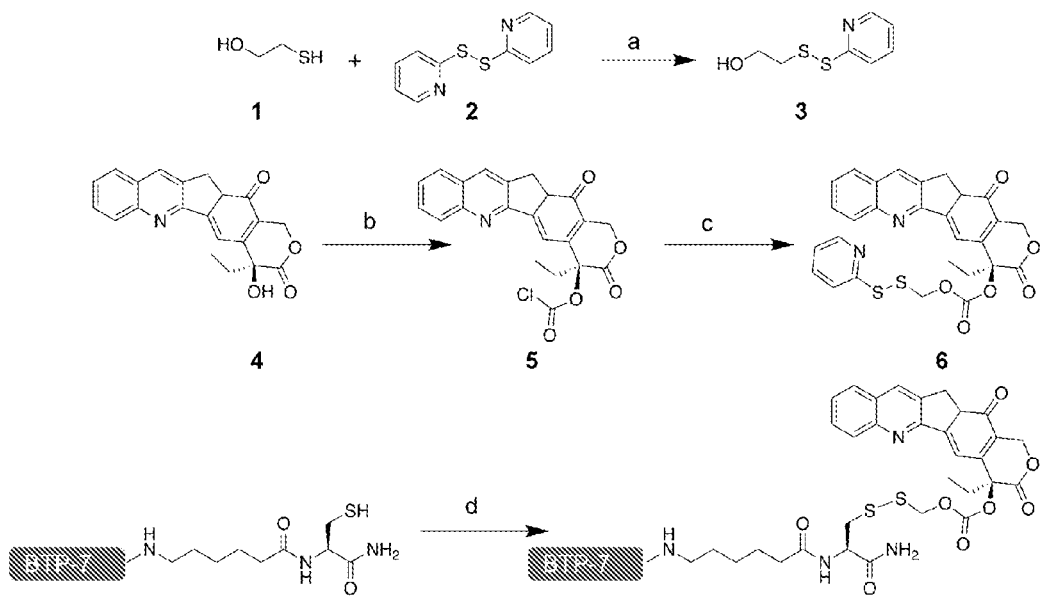
Figure 16B:
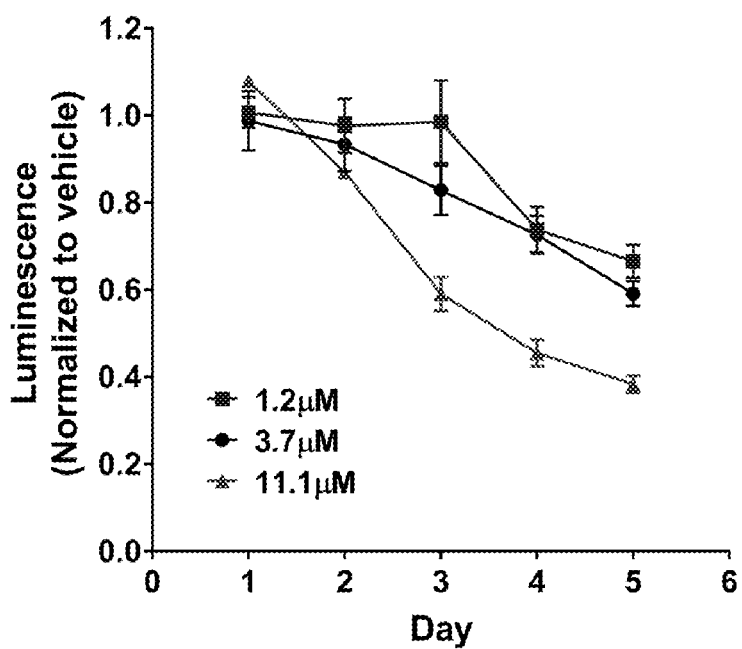
Figure 16C:
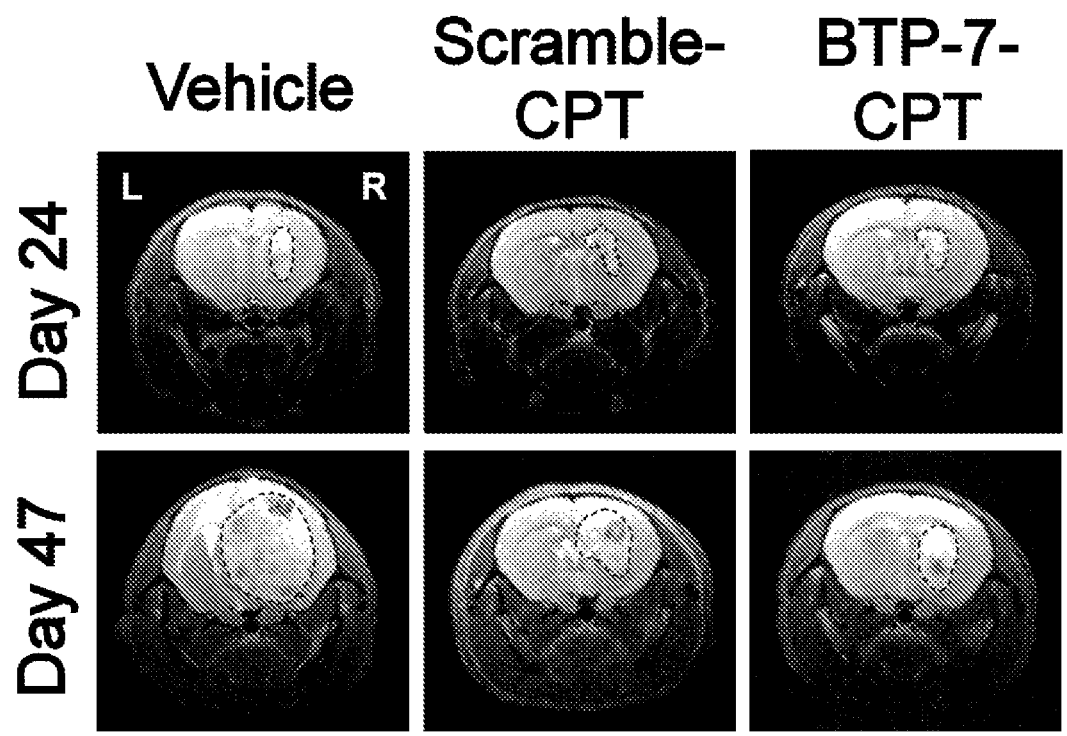

FIGS. 16A-C. Camptothecin (CPT) functionalized with BTP-7 reduces tumor burden. (a) Chemical synthesis workflow showing the conjugation of BTP-7 to camptothecin (CPT). (b) Luminescent cell viability (CellTitre Glo) assay showing that BTP-7-CPT at different concentrations reduces GBM-6 glioma stem cell viability (30,000 cells per well) over 5 days ($n_{well}=3$; s.d. error bars). (c) Coronal section of mouse brains obtained through T2-weighted magnetic resonance imaging (MRI) showing intracranial GBM-6 xenograft tumors (delineated with blue dotted lines) established in the right frontal at Day 24 post-tumor implantation (before treatment). The animal brains were imaged again using the same parameters at Day 47 (after treatment). Both the BTP-7-CPT and Scr-7-CPT groups show reduced tumor burden compared to the control group.

DETAILED DESCRIPTION

Despite advances being made in understanding the molecular genetics of malignant gliomas,[39,40] very little progress has been achieved over the past two decades in terms of identification of clinically efficacious new therapeutic strategies.[41] Tumor heterogeneity (both inter- and intra-tumoral) is a hurdle for targeted therapeutic strategies in treating high-grade gliomas.[42,43] Given the lack of success in the field, there is a need for new approaches to tackle these hard-to-treat tumors.

Brevican (Bcan), a major ECM protein expressed exclusively in the central nervous system (CNS),[8] is upregulated in gliomas,[9,10] and is associated with increased tumor invasion and aggressiveness, progression and lethality.[11-14,44] Bcan exhibits a unique isoform that lacks normal glycosylation, called BΔg (deglycosylated brevican) that is found only in the ECM of glioma samples. Surgically excised high-grade glioma tissues express high levels of BΔg expression in all samples analyzed to date,[9] and this observation is confirmed herein. BΔg was present throughout major portions of all high-grade glioma tissues (either surgically-excised or biopsied) that were analyzed to date, as well as throughout different areas within a tumor sample (FIG. 1b, c), underscoring its potential as a glioma-specific marker for the development of new targeted therapies. Importantly, BΔg is absent in age-matched cortical controls and in samples from other neuropathologies (i.e. non-glial intracranial tumors and Alzheimer's Disease).[9]

Thus, BΔg could serve as a promising tumor-specific marker for the development of novel therapeutic targeting strategies for malignant gliomas.

The specific function of BΔg has not been very well studied, though it is possible that BΔg shares the same (or similar) functions as the glycosylated Bcan protein. It is not entirely clear how the BΔg isoform is produced in the cells, whether it is a lack of post-translational glycosylation, or a result of deglycosylation of Bcan. It is clear however, that while brevican is mostly secreted and found predominantly in the media of cell cultures, the glioma-specific BΔg isoform is found mostly in the extracellular matrix of cells and is accessible for drug targeting. Most of the conventional human GBM cell lines lose their Bcan expression over time due to gene silencing. Fortunately, primary patient-derived GSCs that were obtained and tested (in their non-differentiated state) appear to retain Bcan and BΔg expression, even after being passaged in mice, and can be appropriately used for both in vitro and in vivo GBM modeling and drug targeting analyses.

Described herein is the development of peptides with high affinity for BΔg that can be used, e.g., to deliver a toxic therapeutic payload to malignant gliomas. Peptides are attractive tools for rationally-designed therapeutics as they are small, cost-effective, scalable, and can be easily modified and tailored to further optimize for binding specificity and BBB penetration.[15,16] While naturally-occurring L-peptides are faced with the limitation of protease degradation, the use of D-amino acids (a.a.) (mirror image of their native L-form) yields improved protease resistance and can increase the serum half-life of a peptide.[17,18] To identify BΔg affinity peptides, a one-bead-one-compound (OBOC) combinatorial library built on micro-sized polystyrene beads,[19] with each bead displaying only one unique peptide species composed of D-a.a., was screened. Through a combination of high-throughput screening strategies as previously described (including a magnetic-capture technique for screening OBOC libraries, cell-bead binding assays, and microfluidics-assisted bead sorting),[20-23] a novel BΔg-targeting peptide, called BTP-7, that can specifically bind BΔg and target human GBM in vivo using an intracranial mouse xenograft model was identified. BTP-7 has moderate affinity and specificity for the human BΔg protein, with little to no cross-reactivity to the major Bcan isoform. Further, BTP-7 can cross the BBB in mice and in human BBB organoids, highlighting the clinical potential of this peptide as a route to cross the BBB, as well as tumor-targeting vehicle to deliver systemic therapeutics directly to malignant glioma cells. Drug targeting studies evaluated the ability of BTP-7 to target a potent anti-tumor drug camptothecin (CPT),[24] which is a DNA topoisomerase I inhibitor, to intracranial xenografts GBM. CPT has shown great promise in the treatment of both primary and metastatic brain tumors in preclinical models. While potent in preclinical models, CPT itself is insoluble and has failed in clinical trails.[25,26,27] Here, the ability of BTP-7 to target CPT specifically to intracranial GBM xenograft tumors, and induce elevated DNA damage in tumor tissues and prolong survival in mice bearing intracranial human GBM, was demonstrated.

Furthermore, BTP-7 confers an additional advantage, in that it is a charged and hydrophilic, and improves the solubility of the drug to potentially improve its performance in the clinic. For brain uptake, there has been a concern in the field that making a drug more hydrophilic decreases its ability to cross the BBB.[46] As demonstrated herein, BTP-7 can cross the BBB (FIG. 5e-i), though the exact mechanisms involved are still unknown. All in all, this signifies that functionalization of a drug with BTP-7 confers several additional advantages besides tumor targeting, as this could also optimize drug pharmacokinetics and brain delivery. These results yield convincing possibilities that BTP-7 can be used as a targeting vehicle to increase the concentration of conventional drugs in intracranial human GBM tumors established in mice, leading to increased tumor cell death and prolonged animal survival.

In animal studies, no obvious signs of toxicity were observed from a treatment regimen involving intraperitoneal administration of BTP-7-CPT. Mild acute toxicity (decreased activity level) was observed after intravenous injection of BTP-7-CPT, suggesting the possibility of premature cleavage of the disulfide linker in the bloodstream to release the toxic CPT metabolite in circulation, causing an acute systemic toxicity. This effect is relatively benign, as the mice that had received intravenous treatment regained their normal characteristics and activities in less than an hour. There are other cleavable linkers, such as acid or enzyme-cleavable linkers[47] that can be explored in the formulation of new BTP-7 derived drug variants to further promote tumor specificity. Moreover, BTP-7 can be used to enhance the pharmacokinetics and efficacy of a wide array of anti-cancer therapeutics for the treatment of high-grade gliomas. This peptide made from D-a.a. should be very stable in serum and likely tolerate oral administration since D-a.a. are resistant to digestive enzymes. Additionally, BTP-7 could also provide a robust platform for the development of new targeted non-invasive molecular imaging agents (such as BTP-7- derived radiotracers for positron emission tomography (PET) and MRI contrast agents (i.e. via gadolinium functionalization)), multifunctional targeted nanoparticles (e.g., gadolinium functionalized iron oxide nanoparticles, peptide-coated nanoparticles, microbubbles, gold and/or superparamagnetic iron oxide nanoparticle micelles (see, e.g., J Biomed Nanotechnol. 2016 February; 12(2):347-56)), and use of a corresponding imaging method to detect the presence of the peptides in the subject, e.g., in tumor tissue in the subject, as well as cytotoxic radionuclides for targeted radiotherapy.

Peptides

Provided herein are compositions comprising peptides with high affinity for BΔg. In some embodiments, the peptides comprise a sequence shown in FIG. 3A, or a variant thereof that is at least 80%, 85%, 90%, 95%, or 99% identical to a sequence shown in FIG. 3A, e.g., having 1, 2, or 3 amino acid differences from the reference sequence, e.g., 1, 2, or 3 conservative substitutions, wherein the variant retains the ability to bind BΔg. In some embodiments, the peptide variants are at least 80%, 85%, 90%, 95%, or 99% identical to 5, 6, 7, or 8 consecutive amino acid residues of a sequence shown in FIG. 3A, e.g., having 1, 2, or 3 amino acid differences from the reference sequence, e.g., 1, 2, or 3 conservative substitutions, wherein the variant retains the ability to bind BΔg. In some embodiments, the peptide comprises BTP-7 (TKWGHVNK, SEQ ID NO:6) or a variant thereof. The peptides can be, e.g., at least 5, 6, 7, or 8 amino acids long, up to about 8, 9, 10, 11, 12, 13, 14, 15, 18, 20, 22, 24, 26, 28, 30, 32, 25, 40 or more amino acids long.

Calculations of identity between sequences are performed as follows. To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes is at least 80% of the length of the reference sequence, and in some embodiments is at least 90% or 100%. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences, taking into account the number of gaps, and the length of each gap, which need to be introduced for optimal alignment of the two sequences.

For purposes of the present invention, the comparison of sequences and determination of percent identity between two sequences can be accomplished using a Blossum 62 scoring matrix with a gap penalty of 12, a gap extend penalty of 4, and a frameshift gap penalty of 5.

A "conservative amino acid substitution" is one in which an amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Thus, a predicted nonessential amino acid residue in a peptide is preferably replaced with another amino acid residue from the same side chain family. The above amino acid classification is not absolute, as several amino acids are included in more than one side chain family (e.g., tyrosine is both a polar and an aromatic amino acid, tryptophan is both nonpolar and aromatic). Alternatively, in another embodiment, mutations can be introduced randomly along all or part of a peptide sequence, such as by saturation mutagenesis, and the resultant mutants can be screened for biological activity (BΔg binding, for example) to identify mutants that retain activity.

The peptides can be made, e.g., recombinantly by expression in a host cell, but are preferably made synthetically using methods known in the art, e.g., in vitro translation or chemical synthesis methods.

Modifications/Peptidomimetics

The peptides disclosed herein can be modified according to the methods known in the art, e.g., for producing peptidomimetics. See, e.g., Qvit et al., Drug Discov Today. 2017 February; 22(2): 454-462; Farhadi and Hashemian, Drug Des Devel Ther. 2018; 12: 1239-1254; Avan et al., Chem. Soc. Rev., 2014, 43, 3575-3594; Pathak, et al., Indo American Journal of Pharmaceutical Research, 2015. 8; Kazmierski, W. M., ed., Peptidomimetics Protocols, Human Press (Totowa N.J. 1998); Goodman et al., eds., Houben-Weyl Methods of Organic Chemistry: Synthesis of Peptides and Peptidomimetics, Thiele Verlag (New York 2003); and Mayo et al., J. Biol. Chem., 278:45746 (2003). In some cases, these modified peptidomimetic versions of the peptides and fragments disclosed herein exhibit enhanced stability in vivo, relative to the non-peptidomimetic peptides.

Methods for creating a peptidomimetic include substituting one or more, e.g., all, of the amino acids in a peptide sequence with D-amino acid enantiomers. Such sequences are referred to herein as "retro" sequences. In another method, the N-terminal to C-terminal order of the amino acid residues is reversed, such that the order of amino acid residues from the N-terminus to the C-terminus of the original peptide becomes the order of amino acid residues from the C-terminus to the N-terminus in the modified peptidomimetic. Such sequences can be referred to as "inverso" sequences. For example, an inverso BT-7 peptide sequence would be KNVHGWKT, SEQ ID NO:12.

Peptidomimetics can be both the retro and inverso versions, i.e., the "retro-inverso" version of a peptide disclosed herein. The new peptidomimetics can be composed of D-amino acids arranged so that the order of amino acid residues from the N-terminus to the C-terminus in the peptidomimetic corresponds to the order of amino acid residues from the C-terminus to the N-terminus in the original peptide.

Other methods for making a peptidomimetic include replacing one or more amino acid residues in a peptide with a chemically distinct but recognized functional analog of the amino acid, i.e., an unusual or non-natural amino acid analog. Amino acid analogs include non-natural amino acids such as Homo-amino acids, Alpha-methyl amino acids, β-homo-amino acids, N-methyl amino acids, β-amino acids, β-substituted β-amino acids ("$\beta^3$-amino acids"), phosphorous analogs of amino acids, such as ∀-amino phosphonic acids and ∀-amino phosphinic acids, unusual amino acids, and amino acids having non-peptide linkages. See, e.g., Junkers, ChemFiles 2008, 8.7:3. Examples of unusual amino acids include citrulline (Cit), hydroxyproline (Hyp), norleucine (Nle), 3-nitrotyrosine, nitroarginine, ornithine (Orn), naphthylalanine (Nal), Abu, DAB, methionine sulfoxide or methionine sulfone. Artificial amino acids can be used to create peptidomimetics, such as peptoid oligomers (e.g., peptoid amide or ester analogues), β-peptides, cyclic peptides (e.g., macrocyclized peptides, oligourea or oligocarbamate peptides; or heterocyclic ring molecules. Exemplary retro-inverso targeting peptidomimetics include KNVHGWKT (SEQ ID NO:12), wherein the sequences include all D-amino acids. These sequences can be further modified, e.g., by biotinylation of the amino terminus and amidation of the carboxy terminus.

See, e.g., Liskamp et al., "Bioactive Macrocyclic Peptides and Peptide Mimics," In *Modern Supramolecular Chemistry: Strategies for Macrocycle Synthesis*, Diederich et al., Eds. WILEY-VCH Verlag GmbH & Co. KGaA (2008).

Linkers

In some embodiments, the peptides are linked to a payload, e.g., a therapeutic or diagnostic payload. The payload can be directly linked to the peptides (e.g., via a covalent linkage, e.g., conjugation to a free thiol via disulfide exchange) or linked via an intermediary, e.g., a peptide or chemical linker.

The term "linker" as used herein refers to a group of atoms, e.g., 0-500 atoms, and may be comprised of the atoms or groups such as, but not limited to, carbon, amino, alkylamino, oxygen, sulfur, sulfoxide, sulfonyl, carbonyl, and imine. The linker chain may also comprise part of a saturated, unsaturated or aromatic ring, including polycyclic and heteroaromatic rings wherein the heteroaromatic ring is an aryl group containing from one to four heteroatoms, N, O or S. Specific examples include, but are not limited to, unsaturated alkanes, polyethylene glycols, and dextran polymers. The linker must not interfere with binding of the peptide to the target.

In some embodiments, cleavable linkers, such as linkers cleavable by enzymes, nucleophilic/basic reagents, reducing agents, photo-irradiation, electrophilic/acidic reagents, organometallic and metal reagents, or oxidizing reagents[47,48], can be used.

Biocompatible Nanoparticles

The peptides described herein can be modified by being linked to nanoparticles made of materials that are (i) biocompatible, i.e., do not cause a significant adverse reaction in a living animal when used in pharmaceutically relevant amounts; (ii) feature functional groups to which the binding moiety can be covalently attached, (iii) exhibit low non-specific binding of interactive moieties to the nanoparticle, and/or (iv) are stable in solution, i.e., the nanoparticles do not precipitate. The nanoparticles can be monodisperse (a single crystal of a material, e.g., a metal, per nanoparticle) or polydisperse (a plurality of crystals, e.g., 2, 3, or 4, per nanoparticle).

A number of biocompatible nanoparticles are known in the art, e.g., organic or inorganic nanoparticles. Liposomes, dendrimers, carbon nanomaterials and polymeric micelles are examples of organic nanoparticles. Quantum dots can also be used. Inorganic nanoparticles include metallic nanoparticle, e.g., Au, Ni, Pt and TiO2 nanoparticles. Magnetic nanoparticles can also be used, e.g., spherical nanocrystals of 10-20 nm with a Fe2+ and/or Fe3+ core surrounded by dextran or PEG molecules. In some embodiments, colloidal gold nanoparticles are used, e.g., as described in Qian et al., Nat. Biotechnol. 26(1):83-90 (2008); U.S. Pat. Nos. 7,060,121; 7,232,474; and U.S. P.G. Pub. No. 2008/0166706. Suitable nanoparticles, and methods for constructing and using multifunctional nanoparticles, are discussed in e.g., Sanvicens and Marco, Trends Biotech., 26(8): 425-433 (2008).

In all embodiments, the nanoparticles are attached (linked) to the peptides described herein via a functional group. In some embodiments, the nanoparticles are associated with a polymer that includes the functional groups, and also serves to keep the metal oxides dispersed from each other. The polymer can be a synthetic polymer, such as, but not limited to, polyethylene glycol or silane, natural polymers, or derivatives of either synthetic or natural polymers or a combination of these. Useful polymers are hydrophilic. In some embodiments, the polymer "coating" is not a continuous film around the magnetic metal oxide, but is a "mesh" or "cloud" of extended polymer chains attached to and surrounding the metal oxide. The polymer can comprise polysaccharides and derivatives, including dextran, pullanan, carboxydextran, carboxmethyl dextran, and/or reduced carboxymethyl dextran. The metal oxide can be a collection of one or more crystals that contact each other, or that are individually entrapped or surrounded by the polymer.

In other embodiments, the nanoparticles are associated with non-polymeric functional group compositions. Methods are known to synthesize stabilized, functionalized nanoparticles without associated polymers, which are also within the scope of this invention. Such methods are described, for example, in Halbreich et al., Biochimie, 80 (5-6):379-90, 1998.

In some embodiments, the nanoparticles have an overall size of less than about 1-100 nm, e.g., about 25-75 nm, e.g., about 40-60 nm, or about 50-60 nm in diameter. The polymer component in some embodiments can be in the form of a coating, e.g., about 5 to 20 nm thick or more. The overall size of the nanoparticles is about 15 to 200 nm, e.g., about 20 to 100 nm, about 40 to 60 nm; or about 60 nm.

The nanoparticles can also be linked to one or more therapeutic agents and/or detectable agents as described herein.

Synthesis of Nanoparticles

There are varieties of ways that the nanoparticles can be prepared, but in all methods, the result must be a nanoparticle with functional groups that can be used to link the nanoparticle to the binding moiety.

For example, peptides can be linked to the metal oxide through covalent attachment to a functionalized polymer or to non-polymeric surface-functionalized metal oxides. In the latter method, the nanoparticles can be synthesized according to a version of the method of Albrecht et al., Biochimie, 80 (5-6): 379-90, 1998. Dimercapto-succinic acid is coupled to the nanoparticle and provides a carboxyl functional group. By functionalized is meant the presence of amino or carboxyl or other reactive groups that can be used to attach desired moieties to the nanoparticles, e.g., the peptides described herein or antibodies.

In another embodiment, the peptides are attached to the nanoparticles via a functionalized polymer associated with the nanoparticle. In some embodiments, the polymer is hydrophilic. In a specific embodiment, the conjugates are made using oligonucleotides that have terminal amino, sulfhydryl, or phosphate groups, and superparamagnetic iron oxide nanoparticles bearing amino or carboxy groups on a hydrophilic polymer. There are several methods for synthesizing carboxy and amino derivatized-nanoparticles. Methods for synthesizing functionalized, coated nanoparticles are discussed in further detail below.

Carboxy functionalized nanoparticles can be made, for example, according to the method of Gorman (see WO 00/61191). Carboxy-functionalized nanoparticles can also be made from polysaccharide coated nanoparticles by reaction with bromo or chloroacetic acid in strong base to attach carboxyl groups. In addition, carboxy-functionalized particles can be made from amino-functionalized nanoparticles by converting amino to carboxy groups by the use of reagents such as succinic anhydride or maleic anhydride.

Nanoparticle size can be controlled by adjusting reaction conditions, for example, by varying temperature as described in U.S. Pat. No. 5,262,176. Uniform particle size materials can also be made by fractionating the particles using centrifugation, ultrafiltration, or gel filtration, as described, for example in U.S. Pat. No. 5,492,814.

Nanoparticles can also be treated with periodate to form aldehyde groups. The aldehyde-containing nanoparticles can then be reacted with a diamine (e.g., ethylene diamine or hexanediamine), which will form a Schiff base, followed by reduction with sodium borohydride or sodium cyanoborohydride.

Dextran-coated nanoparticles can also be made and cross-linked, e.g., with epichlorohydrin. The addition of ammonia will react with epoxy groups to generate amine groups, see Hogemann et al., Bioconjug. Chem. 2000. 11(6):941-6, and Josephson et al., Bioconjug. Chem., 1999, 10(2):186-91.

Carboxy-functionalized nanoparticles can be converted to amino-functionalized magnetic particles by the use of water-soluble carbodiimides and diamines such as ethylene diamine or hexane diamine.

Avidin or streptavidin can be attached to nanoparticles for use with a biotinylated binding moiety, such as an oligonucleotide or polypeptide. See e.g., Shen et al., Bioconjug. Chem., 1996, 7(3):311-6. Similarly, biotin can be attached to a nanoparticle for use with an avidin-labeled binding moiety.

In all of these methods, low molecular weight compounds can be separated from the nanoparticles by ultra-filtration, dialysis, magnetic separation, or other means. The unreacted peptides can be separated from the ligand-nanoparticle conjugates, e.g., by size exclusion chromatography.

In some embodiments, colloidal gold nanoparticles are made using methods known in the art, e.g., as described in Qian et al., Nat. Biotechnol. 26(1):83-90 (2008); U.S. Pat. Nos. 7,060,121; 7,232,474; and U.S. P.G Pub. No. 2008/0166706.

In some embodiments, the nanoparticles are pegylated, e.g., as described in U.S. Pat. Nos. 7,291,598; 5,145,684; 6,270,806; 7,348,030, and others.

Payload

The peptides described herein can be linked to one or more payload moieties or molecules. The payload can be used, e.g., for labeling (e.g., a detectable agent such as a fluorophore, heavy metal/contrast agent, or radiolabel, which can be used for imaging, e.g., for diagnosis), or for therapeutic purposes (e.g., a cytotoxin or other therapeutic agent).

In some embodiments, the peptides are linked to a nanoparticle that is linked to one or more other payloads, e.g., therapeutic or detectable agents.

Therapeutic Agents

In some embodiments, the peptide is linked to a payload comprising a therapeutic agent such as a cytotoxin, radioactive ion, or other therapeutic agents. A cytotoxin or cytotoxic agent includes any agent that is detrimental to cells. Examples of cytotoxins include taxol, cytochalasin B, gramicidin D, ethidium bromide, emetine, mitomycin, etoposide, tenoposide, colchicin, daunorubicin, dihydroxy anthracin dione, mithramycin, actinomycin D, 1-dehydrotestosterone, glucocorticoids, procaine, tetracaine, lidocaine, amphotericin B, propranolol, puromycin, maytansinoids, e.g., maytansinol (see U.S. Pat. No. 5,208,020), CC-1065 (see U.S. Pat. Nos. 5,475,092, 5,585,499, 5,846, 545) and analogs or homologs thereof.

Chemotherapeutic drug molecules include, but are not limited to, antimetabolites (e.g., methotrexate, 6-mercaptopurine, 6-thioguanine, cytarabine, 5-fluorouracil decarbazine), alkylating agents (e.g., mechlorethamine, thioepa chlorambucil, CC-1065, melphalan, carmustine (BSNU) and lomustine (CCNU), cyclophosphamide, busulfan, dibromomannitol, streptozotocin, mitomycin C, and cis-dichlorodiamine platinum (II) (DDP) cisplatin), anthracyclines (e.g., daunorubicin (formerly daunomycin) and doxorubicin), antibiotics (e.g., dactinomycin (formerly actinomycin), bleomycin, mithramycin, and anthramycin (AMC)), antifungal agents (e.g., butenafine, terbinafine, and naftifine), immunomodulating drugs (e.g., glatiramer acetate, fingolimod, teriflunomide, and dimethyl fumarate), and anti-mitotic agents (e.g., vincristine, vinblastine, paclitaxel, and maytansinoids).

Examples of suitable chemotherapeutic agents include any of: abarelix, aldesleukin, alitretinoin, allopurinol, altretamine, anastrozole, arsenic trioxide, asparaginase, azacitidine, bexarotene, bleomycin, bortezomib, busulfan, calusterone, capecitabine, carboplatin, carmustine, chlorambucil, cisplatin, cladribine, clofarabine, cyclophosphamide, cytarabine, dacarbazine, dactinomycin, dalteparin, dasatinib, daunorubicin, decitabine, denileukin, dexrazoxane, docetaxel, doxorubicin, dromostanolone, epirubicin, erlotinib, estramustine, etoposide, exemestane, filgrastim, floxuridine, fludarabine, fluorouracil, fulvestrant, gefitinib, gemcitabine, goserelin acetate, histrelin acetate, idarubicin, ifosfamide, imatinib, irinotecan, lapatinib ditosylate, lenalidomide, letrozole, leucovorin, leuprolide, levamisole, lomustine, mechlorethamine, megestrol, melphalan, mercaptopurine, methotrexate, methoxsalen, mitomycin C, mitotane, mitoxantrone, nandrolone, nelarabine, nofetumomab, oxaliplatin, paclitaxel, pamidronate, pegaspargase, pegfilgrastim, pemetrexed, pentostatin, pipobroman, plicamycin, procarbazine, quinacrine, rasburicase, ruxolitinib, sorafenib, streptozocin, sunitinib, tamoxifen, temozolomide, teniposide, testolactone, thalidomide, thioguanine, thiotepa, topotecan, toremifene, tretinoin, uracil mustard, valrubicin, vinblastine, vincristine, vinorelbine, vorinostat, and zoledronate, or a pharmaceutically acceptable salt thereof.

Radioactive ions include, but are not limited to iodine (e.g., iodine 125 or iodine 131), strontium 89, phosphorous, palladium, cesium, iridium, phosphate, cobalt, yttrium 90, Samarium 153 and praseodymium. Other therapeutic agents include, but are not limited to, antimetabolites (e.g., methotrexate, 6-mercaptopurine, 6-thioguanine, cytarabine, 5-fluorouracil decarbazine), alkylating agents (e.g., mechlorethamine, thioepa chlorambucil, CC-1065, melphalan, carmustine (BSNU) and lomustine (CCNU), cyclophosphamide, busulfan, dibromomannitol, streptozotocin, mitomycin C, and cis-dichlorodiamine platinum (II) (DDP) cisplatin), anthracyclines (e.g., daunorubicin (formerly daunomycin) and doxorubicin), antibiotics (e.g., dactinomycin (formerly actinomycin), bleomycin, mithramycin, and anthramycin (AMC)), and anti-mitotic agents (e.g., vincristine, vinblastine, taxol and maytansinoids).

Nucleic acids, e.g., inhibitory nucleic acids, e.g., small interfering RNAs, antisense, aptamers, can also be used as therapeutic agents.

Microbubbles can also be used, e.g., for focused ultrasound treatment (via thermal ablation).

Detectable Agents

In some embodiments, the peptide is linked to a payload comprising a detectable/diagnostic agent, or an agent that can be used as both a diagnostic and/or a therapeutic agent. Examples of detectable substances include various organic small molecules, inorganic compounds, nanoparticles, enzymes or enzyme substrates, fluorophores (fluorescent materials), luminescent materials, bioluminescent materials, chemiluminescent materials, radioactive materials, and contrast agents. Examples of suitable enzymes include horseradish peroxidase, alkaline phosphatase, beta-galactosidase, or acetylcholinesterase; examples of suitable fluorescent materials include boron-dipyrromethene (BODIPY®), 4,4-difluoro-5,7-dimethyl-4-bora-3a,4a-diaza-s-indacene-3-propionic acid (BODIPY® FL), 6-((4,4-difluoro-1,3-dimethyl-5-(4-methoxyphenyl)-4-bora-3a,4a-diaza-s-indacene-2-propionyl)amino)hexanoic acid, succinimidyl ester (BODIPY® TRM-X), Oregon Green 88, 6-(((4,4-difluoro-5-(2-pyrrolyl)-4-bora-3a,4a-diaza-s-indacene-3-yl)stearyloxy)acetyl)aminohexanoic acid, succinimidyl ester (BODIPY® 650/665-X), 7-N,N-diethylaminocoumarin, VIVOTAG 680 (an amine-reactive near-infra-red fluorochrome, from VisEn Medical), umbelliferone, fluorescein, fluorescein isothiocyanate, rhodamine, dichlorotriazinylamine fluorescein, dansyl chloride or phycoerythrin; an example of a luminescent material includes luminol; examples of bioluminescent materials include luciferase, luciferin, and aequorin. In some embodiments an near infrared fluor is used, e.g., a cyanine dye (a molecule containing a polymethine bridge between two nitrogen atoms with a delocalized charge), e.g., non-sulfonated dyes including Cy3, Cy3.5, Cy5, Cy5.5, Cy7, and Cy7.5; xanthenes fluorescent dyes, phthalocyanines, porphyrin derivates, single-walled carbon nanotubes (SWCNTs), quantum dots and rare earth compounds, or indocyanine green (ICG) and analogs thereof. See, e.g., Lio et al., Biomaterials. 2011 October; 32(29):7127-38; Chang et al., Micromachines (Basel). 2019 Jun. 24; 10(6). pii: E422.

Examples of suitable radioactive materials include $^{18}$F, $^{67}$Ga, $^{81m}$Kr, $^{82}$Rb, $^{111}$In, $^{123}$I, $^{133}$Xe, $^{201}$Tl, $^{125}$I, $^{35}$S, $^{14}$C, or $^{3}$H, $^{99m}$Tc (e.g., as pertechnetate (technetate(VII), TcO$_4^-$), or other radioisotope detectable by direct counting of radioemmission or by scintillation counting. In addition, contrast agents, e.g., contrast agents for MRI or NMR, for X-ray CT, Raman imaging, optical coherence tomography, absorption imaging, ultrasound imaging, or thermal imaging can be used. Exemplary contrast agents include gold (e.g., gold nanoparticles), gadolinium (e.g., chelated Gd), iron oxides (e.g., superparamagnetic iron oxide (SPIO), monocrystalline iron oxide nanoparticles (MIONs), and ultrasmall superparamagnetic iron oxide (USPIO)), manganese chelates (e.g., Mn-DPDP), barium sulfate, iodinated contrast media (iohexol), microbubbles, or perfluorocarbons can also be used.

In some embodiments, the detectable agent is a non-detectable pre-cursor that becomes detectable upon activation. Examples include fluorogenic tetrazine-fluorophore constructs (e.g., tetrazine-BODIPY FL, tetrazine-Oregon Green 488, or tetrazine-BODIPY TMR-X) or enzyme activatable fluorogenic agents (e.g., PROSENSE (VisEn Medical)).

Uses

The compositions and methods described herein can be used in a number of different scenarios in which delivery of a substance (the "payload") to a biological target is desired, for example delivery of detectable substances for detection of the target, or delivery of a therapeutic agent. Detection methods can include both imaging in vitro and in vivo imaging methods, e.g., immunohistochemistry, bioluminescence imaging (BLI), Magnetic Resonance Imaging (MRI), positron emission tomography (PET), electron microscopy, X-ray computed tomography, Raman imaging, optical coherence tomography, absorption imaging, thermal imaging, fluorescence reflectance imaging, fluorescence microscopy, fluorescence molecular tomographic imaging, nuclear magnetic resonance imaging, X-ray imaging, ultrasound imaging, photoacoustic imaging, lab assays, or in any situation where tagging/staining/imaging is required.

Pharmaceutical Compositions and Methods of Administration

The methods described herein include the manufacture and use of pharmaceutical compositions, which include compounds described herein as active ingredients. Also included are the pharmaceutical compositions themselves. In some embodiments, the compositions include a ligand that is specific for a tumor antigen or cancerous tissue, and the payload is a therapeutic agent such as a cytotoxin, radioactive agent, or other therapeutic agent useful in treating cancer.

Pharmaceutical compositions typically include a pharmaceutically acceptable carrier. As used herein the language "pharmaceutically acceptable carrier" includes saline, solvents, dispersion media, coatings, antibacterial and antifungal agents, isotonic and absorption delaying agents, and the like, compatible with pharmaceutical administration. Supplementary active compounds can also be incorporated into the compositions.

Pharmaceutical compositions are typically formulated to be compatible with its intended route of administration. Examples of routes of administration include parenteral, e.g., intravenous, intraarterial, intradermal, subcutaneous, intratumoral, intrathecal (e.g., via lumbar injection, cisternal magna injection, or intraparenchymal injection), intracisternal, intracerebral, or intraspinal; endosinusial, oral or nasal (e.g., inhalation), transdermal (topical), transmucosal, sublingual, and vaginal or rectal administration.

Methods of formulating suitable pharmaceutical compositions are known in the art, see, e.g., the books in the series *Drugs and the Pharmaceutical Sciences: a Series of Textbooks and Monographs* (Dekker, NY). For example, solutions or suspensions used for parenteral, intradermal, or subcutaneous application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates or phosphates and agents for the adjustment of tonicity such as sodium chloride or dextrose. pH can be adjusted with acids or bases, such as hydrochloric acid or sodium hydroxide. The parenteral preparation can be enclosed in ampoules, disposable syringes or multiple dose vials made of glass or plastic.

Pharmaceutical compositions suitable for injectable use can include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, NJ) or phosphate buffered saline (PBS). In all cases, the composition must be sterile and should be fluid to the extent that easy syringability exists. It should be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, sodium chloride in the composition. Prolonged absorption of the injectable compositions can be brought about by including in the composition an agent that delays absorption, for example, aluminum monostearate and gelatin.

Sterile injectable solutions can be prepared by incorporating the active compound in the required amount in an appropriate solvent with one or a combination of ingredients enumerated above, as required, followed by filtered sterilization. Generally, dispersions are prepared by incorporating the active compound into a sterile vehicle, which contains a basic dispersion medium and the required other ingredients from those enumerated above. In the case of sterile powders for the preparation of sterile injectable solutions, the preferred methods of preparation are vacuum drying and freeze-drying, which yield a powder of the active ingredient plus any additional desired ingredient from a previously sterile-filtered solution thereof.

Oral compositions generally include an inert diluent or an edible carrier. For the purpose of oral therapeutic administration, the active compound can be incorporated with excipients and used in the form of tablets, troches, or capsules, e.g., gelatin capsules. Oral compositions can also be prepared using a fluid carrier for use as a mouthwash. Pharmaceutically compatible binding agents, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring.

For administration by inhalation, the compounds can be delivered in the form of an aerosol spray from a pressured container or dispenser that contains a suitable propellant, e.g., a gas such as carbon dioxide, or a nebulizer. Such methods include those described in U.S. Pat. No. 6,468,798.

Systemic administration of a therapeutic compound as described herein can also be by transmucosal or transdermal means. For transmucosal or transdermal administration, penetrants appropriate to the barrier to be permeated are used in the formulation. Such penetrants are generally known in the art, and include, for example, for transmucosal administration, detergents, bile salts, and fusidic acid derivatives. Transmucosal administration can be accomplished through the use of nasal sprays or suppositories. For transdermal administration, the active compounds are formulated into ointments, salves, gels, or creams as generally known in the art.

The pharmaceutical compositions can also be prepared in the form of suppositories (e.g., with conventional suppository bases such as cocoa butter and other glycerides) or retention enemas for rectal delivery.

Liposomes (e.g., as described in U.S. Pat. No. 6,472,375) and microencapsulation can also be used. Biodegradable targetable microparticle delivery systems can also be used (e.g., as described in U.S. Pat. No. 6,471,996).

In one embodiment, the therapeutic compounds are prepared with carriers that will protect the therapeutic compounds against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Such formulations can be prepared using standard techniques, or obtained commercially, e.g., from Alza Corporation and Nova Pharmaceuticals, Inc. Liposomal suspensions (including liposomes targeted to selected cells with monoclonal antibodies to cellular antigens) can also be used as pharmaceutically acceptable carriers. These can be prepared according to methods known to those skilled in the art, for example, as described in U.S. Pat. No. 4,522,811.

The pharmaceutical compositions can be included in a container, pack, or dispenser together with instructions for administration.

Methods of Treatment

The methods described herein include methods for the treatment of glioma, e.g., GBM, astrocytoma or oligodendroglioma, e.g., a glioma that has increased levels of brevican expression (increased as compared to normal tissue or to other gliomas). Generally, the methods include administering a therapeutically effective amount of a peptide as described herein, to a subject who is in need of, or who has been determined to be in need of, such treatment. In some embodiments, the methods include the use of one or more standard treatments.

As used in this context, to "treat" means to ameliorate at least one clinical parameter of the glioma; thus, in some embodiments, administration of a therapeutically effective amount of a compound described herein for the treatment of glioma results in a reduction in tumor size; a reduction in tumor growth rate; a reduction in risk of tumor regrowth or recurrence; an improved prognosis; or an increase in survival time. In some embodiments, the treatment improves one or more symptoms of the glioma.

In some embodiments, the subject has a cancer that may become metastatic, e.g., breast cancer or colorectal cancer. The methods described herein can be used to reduce the risk or likelihood that the subject who has cancer, e.g., breast or colorectal cancer, will develop metastatic disease, e.g., a brain metastasis.

A diagnosis of a glioma (e.g., identification of a subject with glioma, e.g., GBM, astrocytoma or oligodendroglioma) can be made based on methods known in the art. Gliomas such as GBM commonly presents with symptoms that include the following: progressive neurologic deficit; motor weakness; headache; generalized symptoms of increased intracranial pressure or neurologic symptoms including headaches, nausea and vomiting, memory loss, personality changes, confusion, and cognitive impairment; and seizures. Focal signs can include hemiparesis, sensory loss, visual loss, and aphasia. A diagnosis is typically made based on imaging studies including computed tomography (CT), magnetic resonance imaging (MRI), with and/or without contrast; positron emission tomography (PET); and/or magnetic resonance spectroscopy (MRS); a biopsy can be done to confirm the diagnosis, usually during surgical resection or using a stereotactic needle biopsy.

Presently, standard therapy includes maximal surgical resection (preferably gross total resection), radiotherapy, and concomitant and adjuvant chemotherapy, e.g., with temozolomide, nitrosoureas (e.g., carmustine [BCNU]), MGMT inhibitors (e.g., O6-benzylguanine); platinum-containing agents, e.g., cisplatin; anti-VEGF agents, e.g., bevacizumab (alone or with irinotecan); and tyrosine kinase inhibitors (e.g., gefitinib, erlotinib).

Methods of Diagnosis

The peptides can also be used in diagnosis. For example, a peptide linked to a detectable agent can be used. In some embodiments, in living subjects, the methods can include administering a peptide linked to a detectable agent suitable for detection in living tissues, e.g., non-invasive molecular imaging agents (e.g., radiotracers for positron emission tomography (PET) and MRI contrast agents (e.g., via gadolinium functionalization of iron oxide nanoparticles), Peptide-coated nanoparticles, and microbubbles, gold and/or superparamagnetic iron oxide nanoparticle micelles (see, e.g., J Biomed Nanotechnol. 2016 February; 12(2):347-56)), and use of a corresponding imaging method to detect the presence of the peptides in the subject, e.g., in tumor tissue in the subject.

EXAMPLES

The invention is further described in the following examples, which do not limit the scope of the invention described in the claims.

Materials and Methods

The following materials and methods were used in the examples below.

Materials

For peptide synthesis, $N^\alpha$-Fmoc protected D-amino acids (a.a.) were purchased through Advanced ChemTech (Louisville, KY). H-Rink Amide-ChemMatrix resin was obtained from PCAS BioMatrix Inc. (St-Jean-sur-Richelieu, Quebec, Canada). 4-pentynoic acid, 2-(1H-Benzotriazol-1-yl)-1,1,3,3-tetramethyluronium hexafluorophosphate (HBTU), and 2-(7-Aza-1H-benzotriazole-1-yl)-1,1,3,3-tetramethyluronium hexafluorophosphate (HATU) were purchased from Chem Impex (Wood Dale, IL). N,N-Dimethylformamide (DMF), dichloromethane (DCM), and HPLC-grade acetonitrile were from EMD Millipore (Billerica, MA). All solvents used for HPLC-MS were purchased from EMD and Fluka (Darmstadt, Germany). Cy5.5-azide was obtained from Lumiprobe (Hallandale Beach, FL). All other chemicals and reagents were purchased from Sigma-Aldrich. For liquid chromatography-mass spectrometry (LC-MS), all chromatograms and mass spectra were obtained using an Agilent 6520 ESI-Q-TOF mass spectrometer.

For western blot analysis, two rabbit polyclonal antibodies were produced against synthetic peptides corresponding to the chondroitin sulfate attachment region of brevican: The pan-brevican (Bcan) antibody (targeting a.a. 506-529 of rat brevican) detected both glycosylated and deglycosylated isoforms of the protein,[9] whereas the antibody BG1 (targeting a.a. 537-548 of human brevican, see, e.g., WO2007056536A1) specifically recognized the deglycosylated isoform (verified in FIGS. 8A-D). ECL horseradish peroxidase anti-rabbit IgG (GE Healthcare; Cat. #NA934V) was used as a secondary antibody, and SuperSignal West Femto Maximum Sensitivity chemiluminescent substrate (Thermo Scientific; Cat. #34096) was used for detection. BG1 was additionally used for immunofluorescence staining.

The following antibodies were used for immunofluorescence staining: rabbit polyclonal anti-cyclophilin A (Abcam; Cat. #ab41684), rabbit anti-caspase-3 (Abcam; Cat. #ab4051), mouse anti-cytochrome c (Abcam; Cat. #ab13575), and rabbit anti-phospho-H2AX (Cell Signaling Technology; Cat. #9718). All the primary antibodies recognize both human and mouse protein, except for the anti-cyclophilin-A, which does not recognize the mouse protein. Anti-mouse Alexa-Fluor 647, and anti-rabbit Alexa-Fluor 647 secondary antibodies (Invitrogen) and Hoechst dye (Life Technologies; Cat. #H3570) were used for detection.

The following supplies and reagents were used in the present experimental studies: Recombinant human brevican (R&D Systems; Cat. #4009-BC-050), streptavidin-coated pink-fluorescent magnetic particles (2.0-2.9 μm, Spherotech; Cat. #FSVM-2058-2), O-glycosidase (Roche; 11347101001), Neuraminidase (Sialidase) (Sigma-Aldrich; Cat. #10269611001), PNGase F (New England Biolabs; Cat. #P0704S), Octet Ni-NTA Biosensors (Forte Bio; Cat. #18-5101), CellTiter-Glo 3D cell viability assay (Promega; Cat. #G983), and PureCol purified bovine collagen solution (Advanced Biomatrix; Cat. #5005-B). The BΔg-peptide and scramble(BΔg)-peptide with and without functionalization with biotin-Ahx (Ahx: aminohexanoic acid) on the N-terminus were synthesized by GenScript USA Inc. FITC-labeled peptides were synthesized and purified in the Luyt laboratory. All other peptides (including the unlabeled, Cy5.5-labeled, and peptide-drug conjugates) were synthesized in the Pentelute lab using established protocols.[28]

For fluorescence imaging, either the Zeiss LSM 710 laser scanning confocal microscope or the Nikon Eclipse Ti epi-fluorescence microscope equipped with a QIClick camera was used. For wide-field time-lapse imaging for cell invasion/migration assays, the Nikon Eclipse TE2000-U epi-fluorescence microscope was used. For flow cytometry analysis, either the Becton Dickinson SORP LSR II or Beckman Coulter Gallios (from the Beth Israel Deaconess Medical Center Flow Cytometry Core) was used. For binding kinetics analysis, the Octet RED384 Platform and the Jasco J-815 Circular Dichroism (CD) Spectropolarimeter (from the Harvard University Center for Molecular Interactions) were used. For magnetic resonance imaging (MRI), a high-field (7 Tesla) unit MR Biospec 70/20+cryoprobe (Bruker) was used for small animal (rat and mice) imaging at the Brigham and Women's Hospital animal facility. Fluorescence imaging of whole organs was conducted using the In Vivo Imaging System (IVIS) Lumina III (Perkin Elmer) connected to isoflurane vaporizer.

Cell Lines and Culture Conditions.

All glioma stem cell lines and patient-derived glioma stem cells (obtained from BWH Pathology or Erasmus Medical Center) were cultured as neurospheres in Neurobasal medium (Invitrogen) supplemented with 2% B27 (Invitrogen), 1% glutamine (Invitrogen), epidermal growth factor (EGF) (20 ng/ml; PeproTech), and fibroblast growth factor-2 (FGF) (20 ng/ml; PeproTech). The GBM-6 cells used in the present studies had been passaged once in a mouse brain, where the cells were implanted intracranially and allowed to form a solid tumor over 30 days. Then, the GBM-6 tumor was excised, dissociated in a tissue culture flask and cultured in Neurobasal medium as above. Human neural progenitor cells (NPC) were purchased from EMD Millipore and cultured in neurobasal media. U87 and human embryonic kidney (HEK) cells were cultured in DMEM (Invitrogen) supplemented with 10% FBS. Cells were grown in T25 or T75 vented-cap tissue culture flasks (Sarstedt AG and Co). Primary human astrocytes were purchased from Lonza Bioscience and cultured in Astrocyte Growth Medium (AGM; Lonza Bioscience) (consisting of astrocyte basal medium supplemented with hEGF (human epidermal growth factor), insulin, ascorbic acid, GA-1000 (Gentamicin, Amphotericin-B), L-glutamine and 1% fetal bovine serum (FBS)). Astrocytes were grown in T75 Cell+ vented-cap tissue culture flasks (Sarstedt AG and Co). Human brain microvascular pericytes (HBVP) (ScienCell Research Laboratories, Carlsbad) were cultured in Pericyte Medium (ScienCell Research Laboratories) containing 2% FBS, pericyte growth supplement and penicillin-streptomycin. Immortalized human cerebral microvascular endothelial cells (hCMEC/D3) (Cedarlane, Canada) were maintained in culture in Endothelial Growth Medium (EGM-2) containing hEGF, hydrocortisone, GA-1000, FBS, VEGF, hFGF-B, $R^3$-IGF-1, ascorbic acid and heparin (Lonza Bioscience). For BBB organoid formation in low-attachment co-culture condition and functional assays, the spheroids were maintained in EGM-2 (Lonza Bioscience) supplemented with 2% human serum (Valley Biomedical; Cat. #HS1021) and with the elimination of VEGF supplementation (this media formulation will henceforth be known as 'BBB working media'). All cells were cultured in a humidified incubator at 37° C. with 5% $CO_2$, and 95% natural air. For cell dissociation, StemPro Accutase Cell Dissociation Reagent (Thermo Fisher Scientific; Cat. #A1110501) was used on glioma stem cells cultured as neurospheres, and Trypsin-EDTA (0.05% v/v, with phenol red) (Thermo Fisher Scientific; Cat. #25300054) was used for detaching adherent cells. All cell lines were regularly tested for mycoplasma contamination.

OBOC Library Synthesis and Screening.

OBOC Library Synthesis:

A one-bead-one-compound (OBOC) combinatorial library was synthesized on 1.0 g of 90 µm ANP-TentaGel resin (Tentagel S —$NH_2$; 0.33 mmol/g loading) using a "split and mix" strategy so that each bead carried multiple copies of a unique peptide ligand, as previously described.[19,20,23,29] A photolabile linker, 3-amino-3-(2-nitrophenyl) propionic acid (ANP), was manually added to Tentagel resin beads using standard Fmoc peptide synthesis procedures. The remaining synthesis process was conducted in an automated peptide synthesizer (Biotage Syro Wave, Charlotte, NC). The resin was kept in the dark at all stages. In the automated synthesizer, 20% piperidine in DMF (800 µL/well, ×2) was used to remove the Fmoc group. A different D-a.a. (3 eq.) was used in each well in HCTU (3 eq.) and N,N-Diisopropylethylamine (DIPEA, 6 eq.) in DMF. A total of 18 wells (18 a.a.) were used, one for each of the common D-isomer a.a., excluding Cys and Met to avoid oxidation products. After each coupling step, the resin was rinsed with DMF and DCM several times and recombined in a peptide vessel and mixed thoroughly before being split again into the synthesizer wells for another round of Fmoc deprotection and coupling. The process of deprotection and coupling cycle was repeated until the library reached the desired length of 8 a.a.

OBOC Library Screening:

Library beads (500 mg) were washed 2× using DMF, 2× with methanol, 1× with 5% DIPEA in DMF, 3× in DMF, 3× in DCM, and then finally in 50% DMF in water to completely remove all unbound reagents. In the end, ethanol (70%) was added to the library beads to remove traces of organic solvents, and the beads were then re-suspended in phosphate buffer saline (PBS). The screening strategy (outlined in FIG. 2B) employed a magnetic capture technique as previously described.[20,23] The a.a. 535-548 peptide sequence of BΔg (epitope of BG1, and referred to as "BΔg-peptide") as well as a corresponding scramble (scramble(BΔg)) peptide was synthesized with a biotin on the N-terminus, and then conjugated onto small streptavidin-coated magnetic particles (2 µm size). The magnetic particles displaying the a.a. 535-548 peptide sequence were then used to capture high-affinity peptide ligands displayed on the OBOC library beads (Screen 1). Specifically, a 'negative screen' was first conducted to minimize the incidence of false positives by incubating the OBOC library with magnetic particles coated with the scramble(BΔg) peptide. OBOC beads that exhibited high association with the 'scramble-particles' (likely through non-specific interactions) became highly magnetized, and the magnetized beads were sorted from the non-magnetic population using a magnetic-activated microfluidics device as previously described.[22] The magnetized beads isolated at this stage were discarded, and the non-magnetic population was subjected to the 'positive screen' using the 'Mg-particles', enabling high-throughput magnetic labeling of OBOC beads which presented peptide candidates with high affinity for the BΔg-peptide (FIG. 2f). The magnetized 'hit' beads were isolated using the microfluidic device (described above), and washed extensively with ethanol and PBS to remove the bound magnetic particles. Next, a secondary cell-based assay (Screen 2) was performed using BΔg-expressing and non-expressing cells (FIG. 2b,c,d,g) to increase the likelihood of attaining affinity peptides that will not only bind purified BΔg protein, but also target BΔg-expressing cells. To ensure specificity, 'hit' beads from Screen 1 were first incubated with a confluent plate (10-cm) of live adherent astrocytes (BΔg-negative) overnight at 37° C., and beads (a few hundred) that did not associate with any cells were collected using a micropipette under an inverted dissecting microscope. These beads were then washed with ethanol, followed by a few washes in DMEM supplemented with 10% FBS, and then incubated with a confluent plate (10-cm) of adherent U87 cells that do not express BΔg overnight at 37° C. Beads that did not associate with the cells (approx. 100 beads) were collected (using a micropipette under a dissecting microscope), and then incubated in a similar manner with BΔg-overexpressing U87 (U87-B) cells. 'Hit' beads with the highest interaction with U87-B cells (n=7) were isolated, washed extensively with ethanol and water, and then sequenced by Edman degradation.

Binding Kinetics Analyses.

A ForteBio OctetRed384 instrument was used to study the binding kinetics of each peptide to recombinant human brevican (re-suspended in PBS and 0.1 mM EDTA, pH 6.8). The brevican protein was deglycosylated prior to experimental use in water+0.05% tween, PI, sialidase, 0-glycosidase, N-glycosidase in sodium acetate [200 mM], NaCl [250 mM], Tris-HCl [200 mM], pH 7.5.) in the presence of protease inhibitor overnight at 4° C. (this entire composition will be referred to as 'de-glycosylation buffer'). All binding kinetics assays were performed within the OctetRed instrument under agitation set to 1000 rpm in 0.9% Sodium Chloride (NaCl) Irrigation with 0.05% Tween to improve solubility of the peptides (working buffer). The final volume for all the solutions was 80 µl/well. Assays were performed at 30° C. in solid black 384-well plates (Geiger Bio-One). Prior to beginning, Ni-NTA biosensors were soaked for 10 min in working buffer. Before loading the protein onto each biosensor, a baseline was established in working buffer for 60 s. Deglycosylated brevican (50 µg/ml BΔg; His-tagged) was loaded on the surface of each biosensors for 180 s. Typical capture levels varied slightly between 0.5 and 2 nm, and variability within run did not exceed 0.1 nm. Reference biosensors were also included in the plate as internal controls, where biosensors were exposed to the 'de-glycosylation buffer' lacking brevican protein during the loading step. A 60 s biosensor washing step was applied. Then, biosensors were exposed to the analyte (peptide) in working buffer (ranging between 0-10 µM BTP) for 300 s during the 'association' step. Finally, the biosensors were exposed to working buffer (without peptide) during the 'dissociation' step for 600 s. Binding affinity of each peptide was assessed through steady state analysis, where the response unit was plotted over peptide concentration. All data was plotted and curves were fitted using the non-linear 'one-site specific binding' fit, and the dissociation constant ($K_D$) value was calculated using the GraphPad Prism software.

Synthesis and Purification of BTP-7-CPT.

To prepare the disulfide-cleavable camptothecin prodrug, the literature report by Henne and co-workers was followed (see SI for details).[30] The pyridyldithiol arm of the prodrug allows for conjugation to free thiols via disulfide exchange, enabling CPT to be attached to a cysteine residue on BTP-7. To perform this conjugation, the peptide (15 mg, 12.6 µmol) and 6 (4.74 mg, 8.4 µmol) were combined in 10.5 mL of a buffer containing 3.5 mL DMSO and 7 mL of 0.1 M 2-ethanesulfonic acid (MES), pH=6. After 1 hour, the reaction was quenched with the addition of 100 µL of trifluoroacetic acid and analyzed by LC-MS. The BTP-7-CPT conjugate was purified by reversed-phase high-performance liquid chromatography (RP-HPLC) to afford 11.0 mg (53% yield).

The above conjugation protocol was followed for the synthesis of Scr-7-CPT to afford 10.5 mg (51% yield) after RP-HPLC purification.

Animal Experiments.

Intracranial GBM Implantation and Tumor Uptake Analysis:

For intracranial tumor implantation, animals were injected with 100,000 GBM-6 cells in the right frontal lobe of the mouse brain. Briefly, nude mice (6-8 weeks) were anaesthetized by i.p. injection with ketamine/xylazine/acepromazine mixed in 0.9% NaCl saline solution. Then, the mice heads were mounted onto a stereotactic frame, and sterilized by swabbing with iodine solution. An 8-10 mm sagittal incision was made with a scalpel, and the bregma of the skull was identified. A Hamilton syringe containing GBM-6 cells (in PBS; 3 µL volume) was inserted into the coronal suture of the skull at the following coordinates from the bregma: 2 mm right and 0.5 mm forward. The tip of the needle was lowered/implanted into the brain (3.5 mm distance). GBM-6 cells were injected slowly (0.1 µL per 10 seconds). After that, the needle was retracted, and the skin around the incision was sutured back together. Mice were allowed to recover after surgery (meloxicam were given as analgesia post-surgery). After 2 weeks, to confirm tumor formation, all mice were imaged by T2-weighted magnetic resonance imaging (MRI) using the Bruker 7T MRI small animal scanner at the Brigham and Women's Hospital Small Animal Imaging Laboratory (SAIL). Then, the following day mice were injected intravenously via the tail vein with either Cy5.5-labeled BTP-7, BTP-8 or BTP-9 (n=3; 100 µL of 500 µM peptide solution). A 'no peptide' control group (Cy5.5 dye) was also included. After 8 hrs, mice were sacrificed and their brains excised, cryosectioned, stained with Hoechst dye and imaged by fluorescence microscopy. Tile scanning was performed to image the entire brain slice. The mean Cy5.5 fluorescence intensity of the tumor was performed on ImageJ and compared with the mean fluorescence intensity on the non-tumor area on the contralateral (left) side of the brain.

In Vivo Analysis of BTP-7 for BBB Permeability:

To measure BBB penetration, naïve nude mice were injected intravenously via the tail vein with either Cy5.5-labeled BTP-7 or a scramble (Cy5.5-Scr-7) peptide (100 µL of 100 µM peptide solution). 4 hrs later, mice were injected with 100 µL of 50 mg/mL TRITC-dextran (155 kDa) via the tail vein. Mice were euthanized after 30 mins, and their brains excised, frozen and cryo-sectioned into 16 µm slices. Tissue sections from the frontal lobe were imaged by confocal microscopy using a 20× objective. Areas with high TRITC (red in original) signal indicate regions of high perfusion (i.e. blood vessels). Cy5.5 (peptide) intensity was measured in areas outside of visible TRITC signal to ensure that only peptide intensity in the brain parenchyma (peptide that has successfully extravasated from the vessels and accumulated in the brain tissues) was quantified.

Survival Analysis:

GBM-6 intracranial tumors were established in the right frontal lobe of nude mice as described above. At Day 24 post-implantation, T2-weighted MRI was performed to confirm tumor formation. Animals with comparable tumor sizes were randomly assigned into three test groups, and injected intraperitoneally with either BTP-7-CPT, Scr-7-CPT or vehicle control (DMSO in 0.9% NaCl) at 10 mg/kg every other day until Day 49. At Day 47, animal brains were imaged again by T2-weighted MM. The mice were weighed prior to and throughout treatment, and the animals were monitored every two days (or daily). Animals were sacrificed upon exhibiting signs of morbidity according to standard BWH IACUC guidelines/regulations. Kaplan-Meier survival graph was plotted to show animal survival using GraphPad Prism.

Ex Vivo Immunofluorescence Staining of GBM Tissue Section.

At Day 49 (last day of treatment), one animal from each treatment group was sacrificed by $CO_2$ asphyxiation. Transcardial perfusion was performed on each animal using 50 mL PBS, followed by 50 mL of formalin. The brains were then excised, submerged in 15% sucrose, followed by 30% sucrose (overnight at 4° C.) under constant rotation. The brains were then frozen and cryosectioned into 16 µm sections. For immunostaining, the brain tissue sections were fixed with either 3.7% formaldehyde (for cyclophilin A staining) or methanol (for phospho-H2AX, caspase-3 and cytochrome c staining) for 1 min. The slides were then washed twice with PBS+0.025% Triton X-100. Tissue sections were blocked for 1 hr with blocking solution (10% normal goat serum diluted in PBS+0.025% Triton X-100). Primary antibody was added to the blocking solution (at 1:100 dilution) and the tissues were incubated overnight at 4° C. in a dark humidified box. The slides were then washed three times (2 mins each) with PBS+0.025% Triton X-100. Tissues were then incubated with Alexa Fluor secondary antibody and Hoechst 33342 (both at 1:1000 dilution) in blocking solution. Then, the slides were washed three times (2 mins each) again with PBS+0.025% Triton X-100. Vectashield mounting medium for fluorescence were applied onto the tissues, and a coverslip was then mounted onto the slide. The edges of the coverslip were sealed with clear nail polish, and the tissues were imaged using an epifluorescence microscope under a 20× objective.

Evaluating Brevican Expression by qRT-PCR.

Glioma stem cells were washed once with PBS by centrifugation at 10,000 rpm for 5 mins. RNA was extracted by resuspending the cells in 100 μL of Trizol reagent in a 1.5 mL microcentrifuge tube. After 5 mins at room temp (RT), 20 μL of chloroform was added and vortexed rigorously for 15 s. After 2-3 mins of incubation at RT, the tube was centrifuged at 12,000×g for 15 mins at 4° C. The upper aqueous phase (colorless) was collected using a micropipette and placed inside a new microcentrifuge tube. Then, 50 μL of isopropanol was added to precipitate the RNA. After incubating for 10 mins at RT, the tube was centrifuged at 12,000×g for 10 mins at 4° C. The supernatant was removed, and the RNA was washed once with 500 μL of 70% ethanol. The tube was centrifuged again at 12,000×g for 5 mins at 4° C. The ethanol was removed and the pellet allowed to air dry for 10 mins. Once dried, the RNA was resuspended in 10 μL of RNA-ase free $H_2O$, and the concentration of the RNA solution was determined using the NanoDrop spectrophotometer (Thermo Fisher). qRT-PCR was performed using the following primer sequences: Forward—5'-GCTCCTGCAGCTTTAGCAG-3' (SEQ ID NO:10), Reverse—5'AGGTAGTGGACGTGGCAAG-3' (SEQ ID NO:11). The following conditions were used: 70° C. for 3 mins, 4° C. for 5 mins, 42° C. for 1 hr, 70° C. for 10 mins, and then stored at 4° C. All datasets were normalized to the corresponding GAPDH values.

Analysis of Human Malignant Glioma Tissue Specimens.

Biopsy or surgical specimens were obtained as frozen tissues (stored at −80° C.) from BWH Neuropathology, Erasmus Medical Center, Rotterdam, The Netherlands, and Upstate Medical Center, State University of New York (SUNY). All pathology reports were provided in a de-identified manner, and details are included in this article. The slides were fixed with 3.7% formaldehyde for 10 mins at RT. Tissues were permeabilized with phosphate buffered saline (PBS) containing 0.1% Tween-20 (v/v) for 30 mins. Blocking was performed in 5% normal chicken serum diluted in PBS containing 0.025% Tween-20 (v/v) for 1 hr at RT. Then, the tissues were incubated with the BG1 anti-BΔg antibody (1:100 dilution) overnight at 4° C. Tissues were washed 3 times with PBS containing 0.025% Tween-20 in a Coplin jar, and then incubated with anti-rabbit Alexa Fluor 633 antibody (Invitrogen) (1:1000 dilution) and Hoechst dye (1:1000 dilution) in blocking solution for 1 hr at room temperature. Tissues were then washed 3 times with PBS containing 0.025% Tween-20. Mounting media was applied onto each tissue before a coverslip was mounted onto the slide. To prevent dehydration of tissues for long-term storage, all edges of the coverslip were sealed to the tissue-containing slide using clear nail polish.

Peptide Synthesis, Labeling and Purification.
FITC-Labeling:

The synthesis workflow is demonstrated in FIG. 10. The peptide sequences were synthesized using standard Fmoc-solid phase peptide synthesis conditions on a Biotage Syro-wave automated microwave peptide synthesizer. Fmoc-protected Rink amide MBHA resin was used as a solid support (0.37 mmol/g) after swelling in dichloromethane (DCM). Fmoc removal was achieved using 40% piperidine in dimethylformamide (DMF) over two steps (30 sec and 12 mins). Amino acids were coupled with 4 equivalents of the Fmoc-protected amino acid, 4 equivalents of HCTU and 8 equivalents of N-N-diisopropylethylamine (DIPEA) in DMF/N-methyl pyrrolidinone (NMP) over 1 hour. 4-methyltrityl (Mtt) was used as an orthogonal protecting group on the C-terminal lysine. After completion of the peptide sequence, Mtt was manually removed with a 2 mL cocktail of 2% trifluoroacetic acid (TFA) and 5% triisopropylsilane (TIPS) in DCM (2 minutes, 10 repetitions). The resin was neutralized with a wash of 5% DIPEA in DMF. Subsequently, fluorescein isothiocyanate (FITC) was conjugated to the lysine side-chain with 2 equivalents of FITC and 6 equivalents of DIPEA in 2 mL of DMF overnight. Final N-terminal Fmoc removal was performed through two cycles of 20% piperidine in DMF (3 min and 15 min). Full cleavage of the peptides from resin along with removal of side chain protecting groups was achieved with a solution of TFA (95%), triisopropylsilane (TIPS) (2.5%), and water (2.5%) over 5 h. The peptide was precipitated in cold tert-butylmethyl ether (TBME) and centrifuged at 3000 rpm for 15 min. The TBME was decanted, the peptide dissolved in water, frozen at −78° C. and lyophilized. The peptide was then purified by preparative reverse-phase HPLC-MS using a preparative column (Agilent Zorbax PrepHT SB-C18 Column, 5 μm, 21.2×150 mm, Waters 2487 Photodiode Array Detector, Waters 600 Pump, Waters 2767 Autosampler) at a flow rate of 20 ml/min with various gradients acetonitrile (0.1% TFA) in water (0.1% TFA). After purification, the collected fractions were frozen at −78° C. and lyophilized. Peptides were characterized by ESI+ mass spectrometry using a Waters Micromass Quatro Micro Mass Spectrometer.

Cy5.5-Labeling:

The synthesis workflow is demonstrated in FIG. 11. The peptides were synthesized using an automated flow-based synthesizer using Fmoc chemistry and H-Rink Amide-ChemMatrix resin as previously reported (Simon et al., ChemBioChem 15, 713-720 (2014)). The C-terminus of each peptide was coupled to F-moc-6-aminohexanoic acid, followed by F-moc-L-propargylglycine to functionalize the C-terminus of the peptide with an alkyne. The peptide was then cleaved from the resin and purified using reverse phase HPLC on a Zorbax $C_3$ or the $C_{18}$ column (Agilent). Cy5.5-azide was conjugated using copper-catalyzed "click" chemistry. Briefly, 4 μmol of peptide-alkyne and 4 μmol of Cy5.5-azide was dissolved in a 50:50 mixture of $H_2O$/t-butanol. Then, 100 μL of 500 mM Tris and 50 μL of 100 mM $CuSO_4$ (both dissolved in $H_2O$) were added to the peptide-dye mixture. Then, 10 μL of tris(benzyltriazolylmethyl)amine (TBTA; dissolved in DMSO), 10 μL of tris(2-carboxyethyl)phosphine (TCEP; dissolved in $H_2O$) and 100 μL of ascorbic acid were added. 480 μL of a 50:50 mixture of $H_2O$/t-butanol was added in the end to generate a final volume of 1 mL. The combined mixture was allowed to incubate at room temperature for at least 3 hrs. The labeled peptide was separated from unlabeled by reverse phase HPLC on a Zorbax $C_3$ or the $C_{18}$ column using the parameters below.

The following liquid chromatography (LC) method was used:
 A=water 0.1% TFA; B=acetonitrile 0.1% TFA; flow rate=0.8 mL/min
 0-2 minutes 5% B,
 2-11 minutes linear gradient 5-65% B
 11-12 minutes 65% B
 Column: Zorbax 300SB $C_3$ or the $C_{18}$ column (9.4×250 mm, 5 μm), 40° C.

Circular Dichroism.

The BΔg peptide (or control BΔg(Scramble) peptide), BTP-7-FITC peptide, or a mixture of both (dissolved in Milli-Q $H_2O$ to a final concentration of 50 μM for each peptide) was loaded into a quartz cuvette (1 mm pathlength; Hellma Analytics Catalog #110-1-40). The cuvette was inserted into the Jasco J-815 circular dichroism spectropolarimeter, and the spectral scan measurement was conducted using the Spectrum Manager 2 software. The cuvette was rinsed with Milli-Q $H_2O$ in between each run. A blank (water) was run to establish the baseline for all samples. Scans were measured from 190 nm to 260 nm in a continuous mode (50-100 nm/min) at 20° C. To measure the BTP-7 structural change in the presence of either the BΔg (or control scramble) peptide, spectrum of the BΔg (or scramble) peptide alone was subtracted from the spectrum of the mixture, and then overlaid with the spectrum of BTP-7 alone for comparison. To investigate the structural changes in BTP-7 in a dose-dependent manner, 50 μM of BTP-7 peptide was loaded together with varying concentrations of either the BΔg (or control scramble) peptide. Similarly, the spectrum of each BΔg (or control scramble) peptide at the concentration was subtracted from the spectrum of the corresponding mixture, and then overlaid with the spectrum of BTP-7 alone for comparison.

Flow Cytometry Cell Uptake Analysis.

Cells were washed once with PBS and then, treated with 1 mL of 2.5 mM EDTA to dissociate the cells. The EDTA was removed by centrifugation, and PBS supplemented with 10% FBS was added to create a single-cell suspension. All peptide stocks were dissolved in DMSO, and stored at −20° C. in the dark. Cells were incubated with each peptide (at the desired final concentration, between 1-10 μM) for 3 hrs at 37° C. in the dark under constant rotation. After incubation, cells were washed 3× with PBS with 10% FBS (by centrifugation at 7000 rpm for 3 mins each). Then, cells were resuspended in 3.7% formaldehyde for fixation, and finally washed once with PBS. Cells were evaluated for peptide uptake (mean fluorescence intensity) by flow cytometry (10,000-20,000 events).

For blocking studies, cells were dissociated as described above and resuspended in cold PBS with 10% FBS. Cells were then incubated with a 50× molar excess of unlabeled peptide for 10 mins on ice, before adding the corresponding FITC-labeled peptide at a final concentration of 1 μM and incubated for 1.5 hrs on ice. Cells were then washed with cold PBS with 10% FBS, fixed and analyzed by flow cytometry.

Cell Invasion Assay.

GBM-6 neurospheres (GSC) were plated on a 96-well plate in 25 μL volume per well in the center of the well. Once plated, spheres were allowed to adhere to the plate for approximately 2-3 hours. Collagen solution PureCol Collagen (Cat. #5015) was prepared using 5×DMEM basal media, and supplements (EGF, FGF and B27 in the appropriate proporation) were added to the 5×DMEM. Then, the pH was neutralized to 7.5 using IN NaOH. BTP-7 (at 50 μM final concentration) was added into the collagen solution. Then, 50 μL of the collagen mix was added into each well containing the GBM-6 neurospheres, and the solution allowed to polymerize at 37° C. for 1 hr. Media containing 50 μM of BTP-7 was added into each well (100 μL volume) on top of the polymerized collagen. Live imaging of the neurospheres was performed under an inverted microscope over 48 hrs (snapshots were captured at every 20-min interval) within a 37° C. chamber supplied with $CO_2$ (using a 4× objective).

Cell Proliferation Assay.

The CellTiter Glo luminescent cell viability assay was used. GBM-6 glioma stem cells (Giannini et al., Neuro-oncology 7, 164-176 (2005)) (cultured in Neurobasal growth media), or HEK cells (cultured in supplemented DMEM media), were washed once with PBS, dissociated to form single cell suspension using either StemPro Accutase for GBM-6 neurospheres, or 0.05% (v/v) Trypsin-EDTA for HEK cells, resuspended in the appropriate growth media, and then counted using a hemocytometer. Cells were seeded at the desired number (typically 20,000-30,000 GBM-6 cells per well; 5,000-20,000 HEK cells per well) into clear-bottom black-well 96-well plates (Greiner; Cat. #655090). The cells were plated in triplicate. A serial dilution of the camptothecin (CPT)-conjugated to BTP-7 (BTP-7-CPT) or scramble (Scr-7-CPT) (dissolved/diluted in DMSO) was prepared so that the following final working concentrations on cells were achieved: 100, 33.33, 11.11, 3.704, 1.235, 0.412, 0.137, 0.046, 0.015, 0.005 μM. The drug at each dilution was added onto cells in triplicate (final volume of media is 100 μM). Vehicle (DMSO with no drug) was added as a control. The plates were returned into a 37° C. tissue culture incubator. At every 24 hrs after incubation, a plate was removed from the incubator and 100 μL of CellTiter-Glo working reagent was added to each well using a multi-channel pipette. The plate was allowed to incubate (in the dark) for 10 minutes (while shaking under low speed), and then analyzed in a luminescence plate reader (POLARstar Omega, BMG Labtech). Each dataset was normalized to the vehicle (control), and plotted using GraphPad Prism. $IC_{50}$ values were obtained using a non-linear fit (log(inhibitor) vs. response—variable slope (four parameters)).

BBB Organoid Assay.

Immortalized hCMEC/D3, primary HBVP and primary human astrocytes were used for generation of BBB organoids as previously described (Cho et al., Nat Commun 8, 15623 (2017); Fadzen et al., J. Am. Chem. Soc. 139, 15628-15631 (2017)). Briefly, agarose (0.5 g) was dissolved in 50 mL of MilliQ water or PBS in a conical flask and the solution was heated in a microwave for 1-2 minutes until completely dissolved. Melted agarose was transferred into a sterile tissue culture hood and immediately poured into a 50-mL sterile basin. 50 μL of melted agarose was dispensed into each well in a 96-well plate using a multichannel pipette. The plate was set aside to allow agarose to solidify completely inside the wells for at least 15 minutes. Then, each cell type (hCMEC/D3, HBVP and astrocytes) was released from the flask using 1-1.5 mL of Trypsin-EDTA by incubating for 1-3 minutes at 37° C. in an incubator. Once cells were detached, 9 mL of 'BBB working media' was used to neutralize the trypsin and resuspend the cells. Each cell type was counted using a hemocytometer, and 1,500 of each cell type were seeded into each well containing solidified agarose. Cell density was verified under an inverted microscope after each seeding step. BBB working medium was used to adjust the final volume to 200 μL. The plate was placed in at 37° C. incubator, and the organoids allowed to form in culture for 48 hrs.

For peptide permeability analyses, after 48 hrs, organoids that formed successfully were pooled together into a 0.5-mL microcentrifuge tube in BBB working medium. The test peptide (Cy5.5-labeled) was added to the tube containing the organoids (at a desired final concentration—typically 5-10 μM) in 500 μL of fresh BBB working medium. To test the integrity of the organoid surface, the organoids were co-incubated with the peptide together with fluorescent dextran (FITC-dextran (70 kDa) or TRITC-dextran (4,400 Da)) at a final concentration of 10 μg/mL for 3h at 37° C. in an incubator under constant rotation. The organoids were then washed 3 times with 500 μL of BBB working medium. For nuclei staining, Hoechst dye (1:1000) was incubated for 1 minute at room temperature, and the organoids were washed 3 times with 500 μL of BBB working medium. The organoids were then transferred onto a thin-well chambered coverglass and imaged by confocal fluorescence microscopy. Quantification of peptide permeability was performed using the ImageJ software, where the mean fluorescence intensity of the core of each spheroid (at a depth between 50-90 μm) was measured, and then plotted on GraphPad Prism.

Biodistribution Studies.

The lyophilized BTP-7-Cy5.5 powders were dissolved to a final concentration of 10 mM in DMSO by mass. The peptide was then diluted to a concentration of 100 μM in a solution of 50:50 polyethylene glycol (PEG)-300:0.9% sodium chloride (v/v) irrigation solution. A 100 μL dose of each peptide solution was administered intravenously via the tail vein into healthy 8-week old female nude mice. After 4 hours, 100 μL of 50 mg/mL tetramethylrhodamine isothiocyanate-labeled dextran (155 kDa) in 0.9% sodium chloride was injected via the tail vein. Mice were sacrificed 30 min later by cervical dislocation. The brain, heart, lungs, kidneys, spleen, and liver were excised from each mouse, frozen on dry ice and imaged using an In Vivo Imaging System (Perkin Elmer) at an excitation of 640 nm. Using Living Image software, regions of interest were drawn around each organ and the total radiant efficiency of Cy5.5 from each organ was quantified.

Synthesis of BTP-7-Camptothecin (Refer to FIG. 16A)

Prodrug Synthesis:

For the synthesis of the disulfide-cleavable camptothecin prodrug 6, the literature report by Henne and co-workers was followed (Henne et al., Bioorganic & Medicinal Chemistry Letters 16, 5350-5355 (2006).). Briefly, 2-mercaptoethanol (1 mmol, 70.4 μL) and 2,2'-dipyridyl disulfide (3 mmol, 663 mg) were combined in dichloromethane (DCM) (3 mL) to yield mixed disulfide 3 after 2 hours at room temperature. Product 3 was purified by silica chromatography starting with 100% DCM and increasing the amount of ethyl acetate. 3 was the middle of three spots by thin layer chromatography with 80:20 DCM: ethyl acetate. After rotary evaporation, the yield for 3 was 125 mg, 67%. Purity was confirmed by $^1$H-NMR spectroscopy. Next, 4 (camptothecin, 125 mg, 0.36 mmol), triphosgene (39 mg, 0.13 mmol) and 4-dimethylaminopyridine (264 mg, 2.16 mmol) were combined in DCM (5 mL), and after fifteen minutes, mixed disulfide 3 was added (72 mg, 0.39 mmol). After six hours at room temperature, the end result is 6 (camptothecin with a carbonate bridge to a pyridyldithiol arm). Product 6 was purified by silica chromatography starting with 100% DCM and increasing the amount of acetone. After rotary evaporation, the yield for 6 was 180 mg, 89%. Purity was confirmed by $^1$H-NMR spectroscopy and liquid-chromatography mass-spectrometry (LC-MS).

Synthesis of Camptothecin-Peptide Conjugate:

The pyridyldithiol arm of 6 allows for conjugation to free thiols via disulfide exchange, enabling 6 to be attached to a cysteine residue on BTP-7. To perform this conjugation, the peptide (15 mg, 12.6 μmop and 6 (4.74 mg, 8.4 μmol) were combined in 10.5 mL of a buffer containing 3.5 mL DMSO and 7 mL of 0.1 M 2-ethanesulfonic acid (MES), pH=6. After 1 hour, the reaction was quenched with the addition of 100 μL of trifluoroacetic acid and analyzed by LC-MS. The camptothecin-BTP7 conjugate was purified by reversed-phase high-performance liquid chromatography (RP-HPLC) to afford 11.0 mg (53% yield).

The above conjugation protocol was followed for the synthesis of camptothecin-scramble to afford 10.5 mg (51% yield) after RP-HPLC purification.

Example 1. BΔg is Expressed Specifically in Glioma Tissues and Cells

Figure 1A:
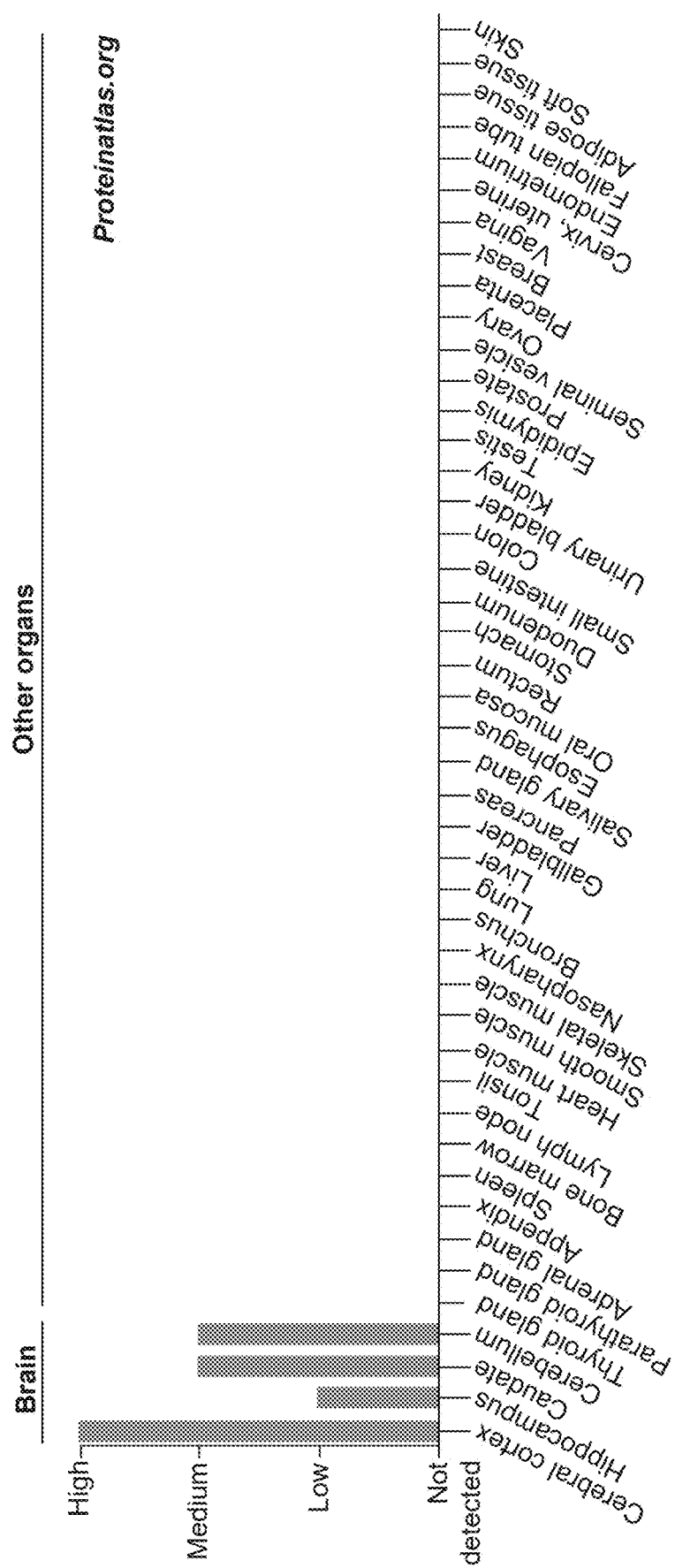
FIGS. 1A-E. Brevican isoform lacking normal glycosylation (BΔg) is expressed specifically in glioma tissues. (a) Bar graph (obtained from The Human Protein Atlas; .proteinatlas.org) showing that the brevican (Bcan) protein is expressed exclusively in the brain and not in other organs. (b) Immunofluorescence images showing high expression level of the deglycosylated isoform of Bcan (BΔg) in GBM surgical specimen (frozen). Minimal level of BΔg is observed in normal cerebral cortex (frozen; Zyagen). Scale bar: 500 microns (20× objective). (c) Immunofluorescence images showing high level of BΔg expression (white) in frozen biopsy GBM specimen obtained from the SUNY Upstate Medical Center. Biopsy sample from the tumor border or core isolated from the same patient were stained with a BΔg-specific primary antibody. Scale bar: 500 microns (20× objective). (d) Immunofluorescence images showing the level of BΔg expression in glioma stem cells obtained from BWH Pathology Department, showing that BT188 had the highest BΔg expression, while BT145 and BT228 had low expression. For all immunofluorescence staining performed on tissue specimen, serial tissue sections were stained with only the secondary antibody as controls (no primary antibody). Nuclei of tissues were stained with Hoechst dye (blue). (e) Bcan RNA level in BT188, BT145 and BT228 GSCs analyzed by qRT-PCR.
Figure 1B:
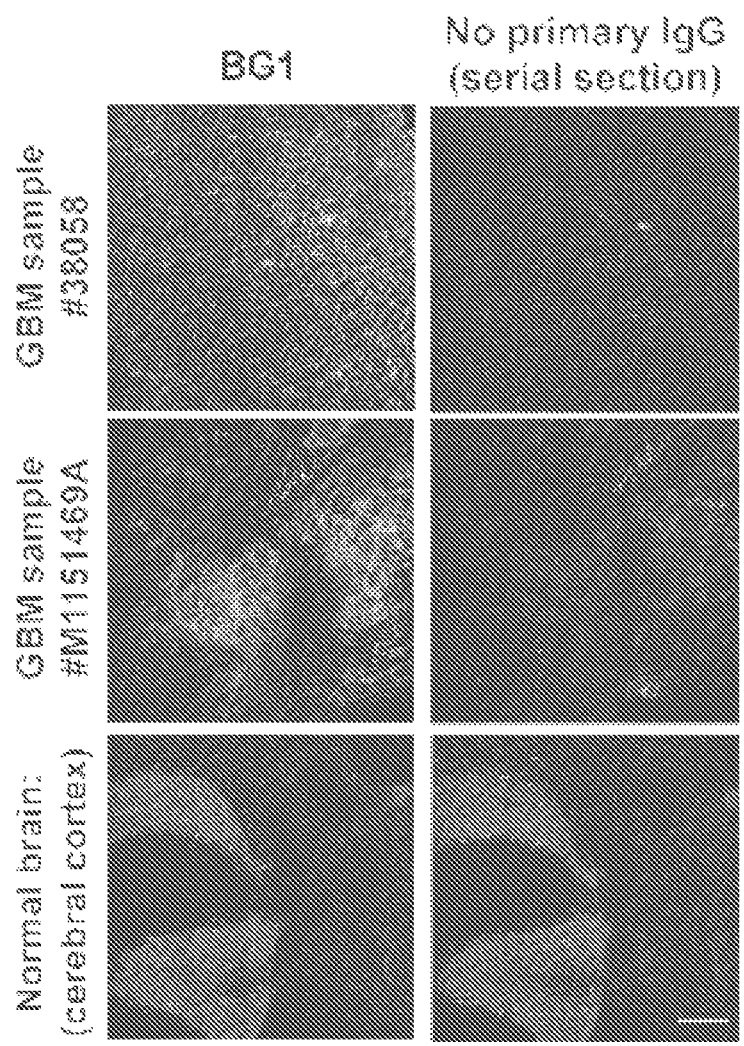
Figure 1C:
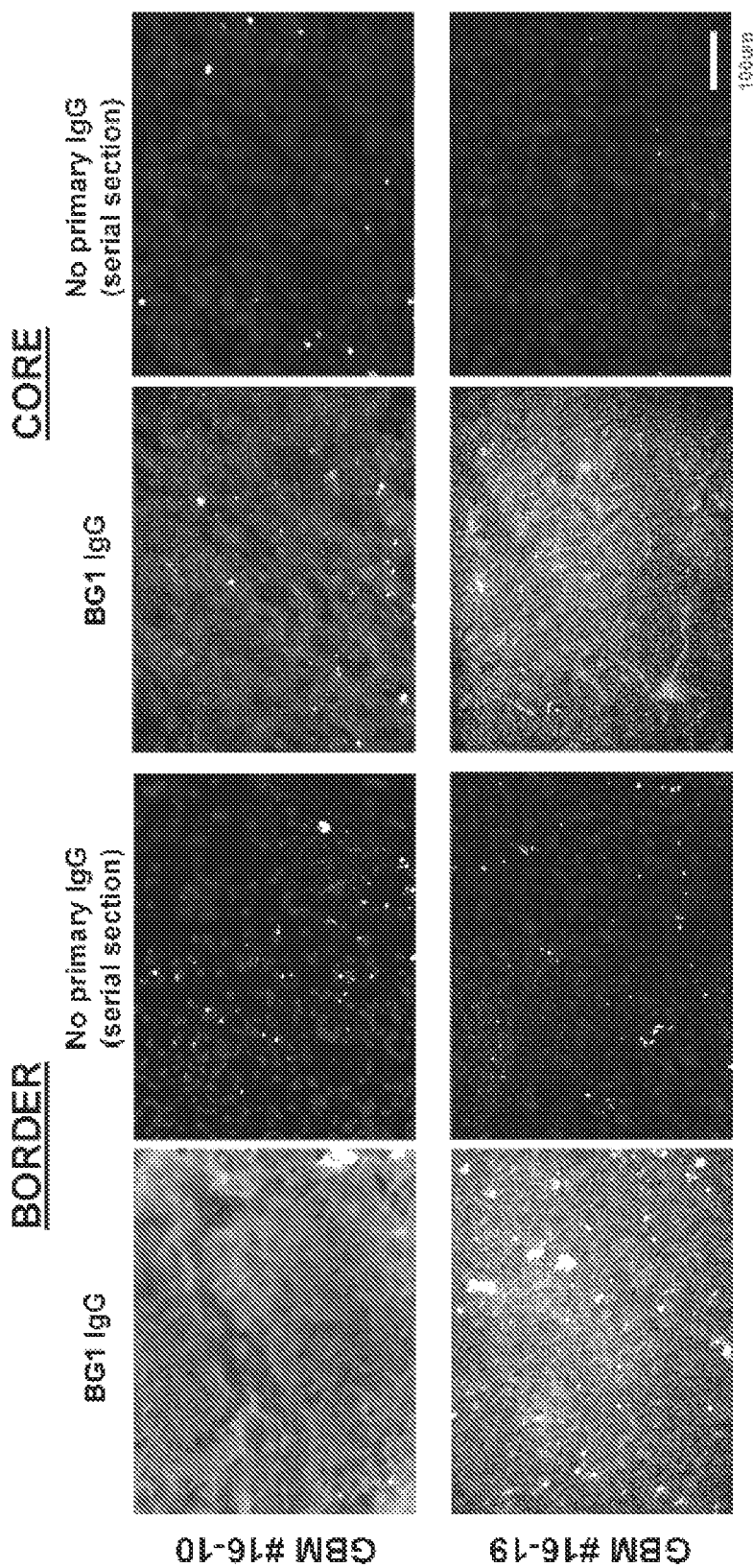
Figure 8A:
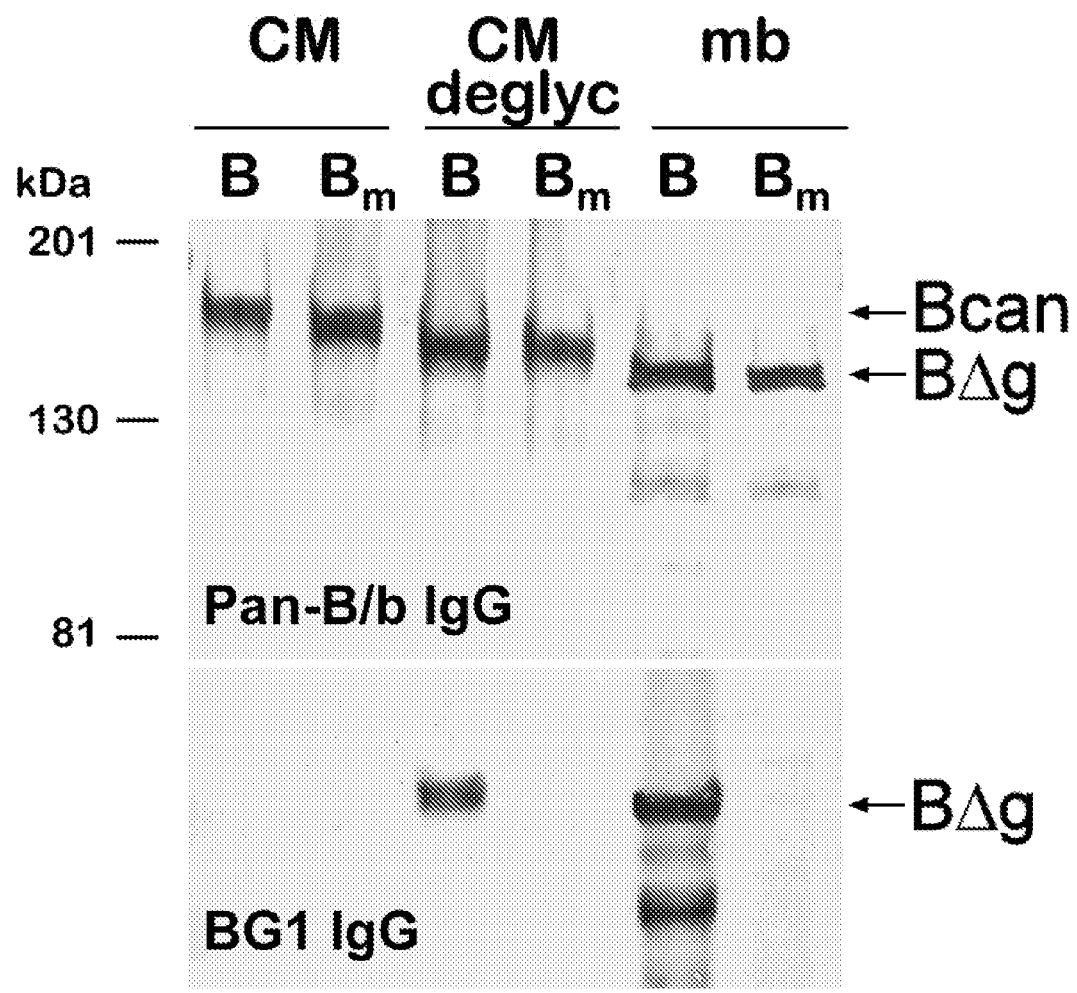

Brevican (Bcan) is an extracellular matrix protein that is found only in the central nervous system,[8] and this is also shown through the Human Protein Atlas (FIG. 1a). Previously, a unique isoform of Bcan lacking glycosylation, called BΔg (deglycosylated Bcan) has been identified, and its expression was seen only in high-grade glioma tissues.[9] A polyclonal antibody generated to detect a deglycosylated Bcan epitope (BG1) (see WO2007056536) demonstrated specificity to recognize endogenous BΔg as well as Bcan pre-treated with glycosidases and a mutant variant of Bcan lacking Ser/Thr residues in the target epitope, confirming that BΔg lacked normal Bcan glycosylation and could be specifically identified in tissue samples. (FIG. 8a). Using the pan-Bcan and BG1 antibodies, full-length Bcan was found preferentially in the medium of cultured glioma cells, while the BΔg isoform was found associated with the cell surface (FIG. 8a). Upon validating specificity of BG1 to the BΔg isoform, the BG1 antibody was then used to perform immunofluorescence staining on frozen GBM surgical specimen, and found a high level of BΔg expression in the tumor samples, but not in normal cerebral cortex tissues (FIG. 1b). Furthermore, immunofluorescence staining of biopsy GBM samples (tissues isolated from the core and border of each patient's tumor) revealed that majority of tumor tissues expressed BΔg, though at varying levels (FIG. 1c). Overall, BΔg was expressed homogenously in the analyzed GBM tissues.

Figure 1D:
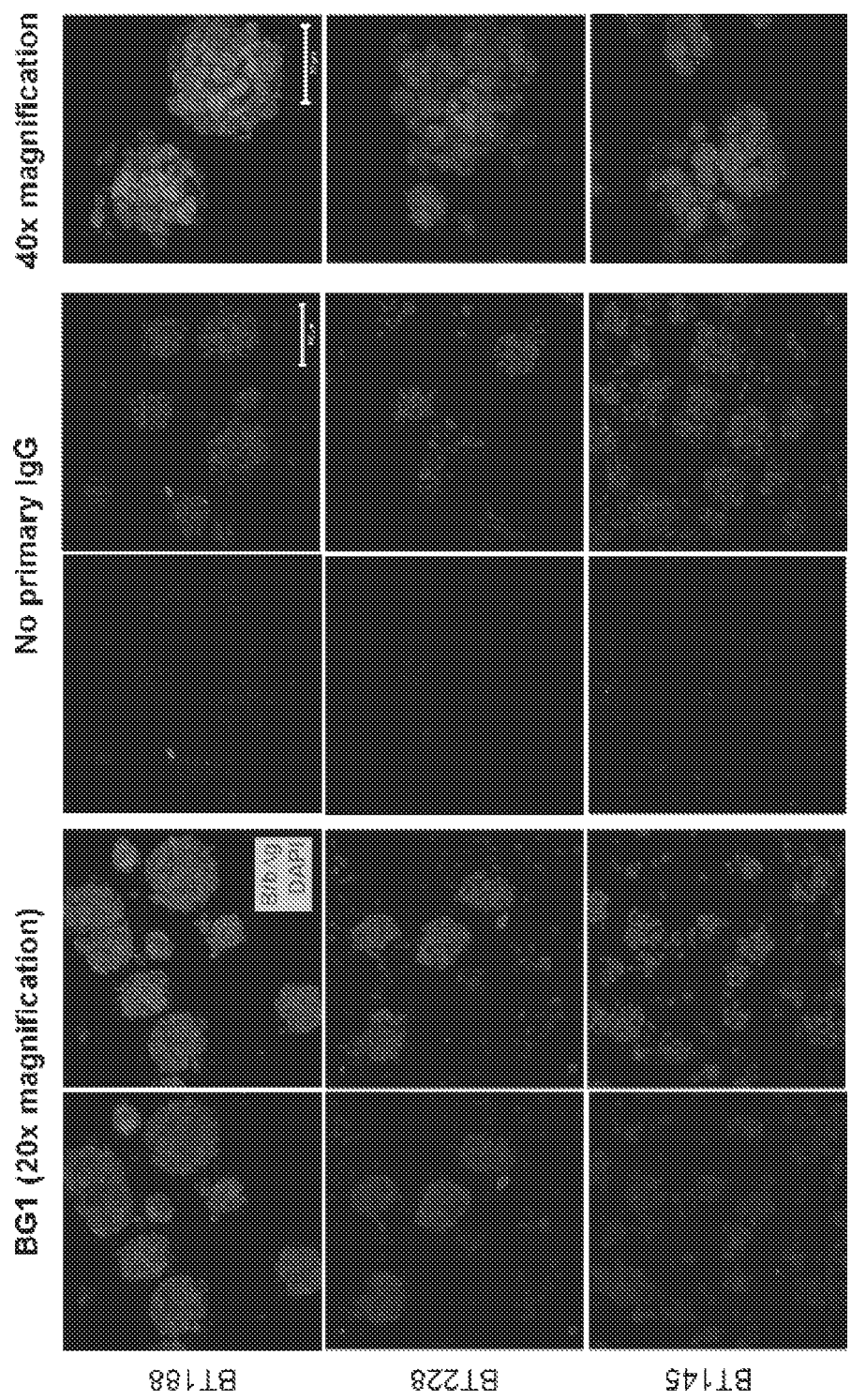
Figure 1E:
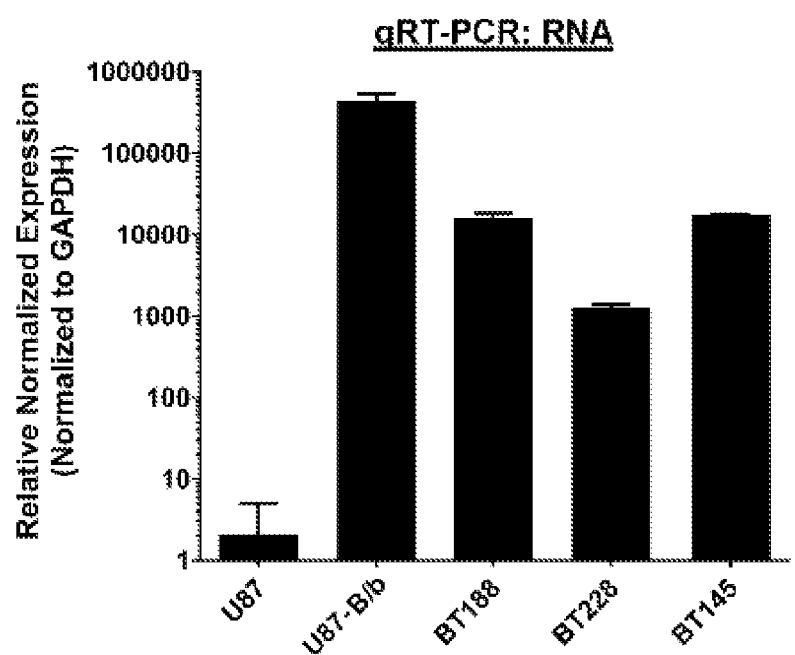
Figure 8B:
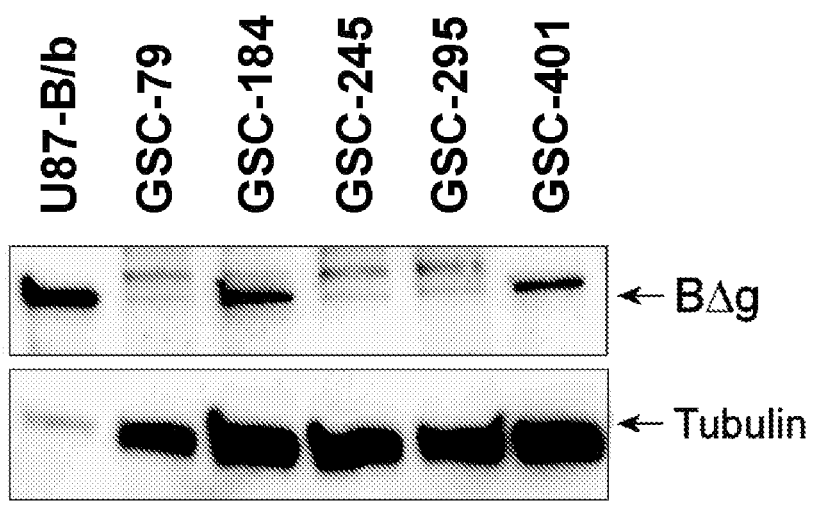
Figure 8C:
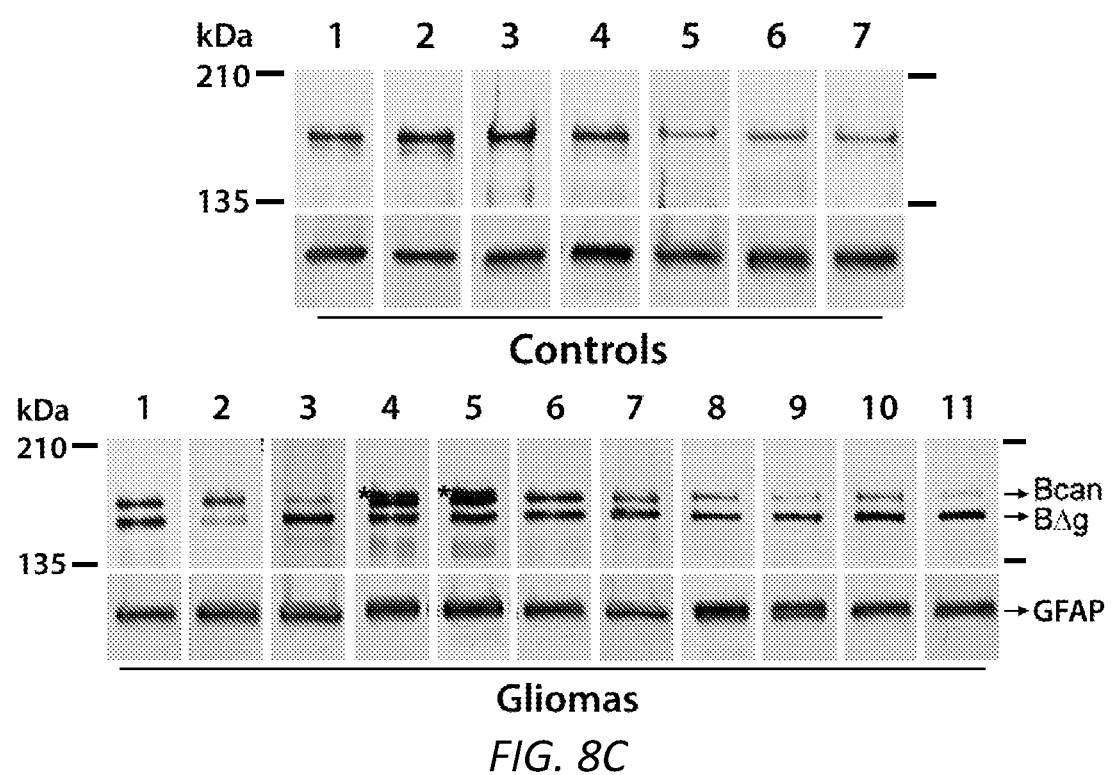

Next, whether patient-derived glioma stem cells (GSC) grown in culture would retain BΔg expression was investigated. Immunofluorescence staining of BT188, BT228 and BT145 GSC cultured as neurospheres, BT188, BT228 and BT145 showed that these undifferentiated GSCs homogenously expressed BΔg, though at varying levels where BT188 expressed the highest BΔg level, while BT145 and BT228 had low expression (FIG. 1d). To evaluate whether the expression level of BΔg correlated with Bcan level, qRT-PCR analysis was performed on these GSC and showed that BT188 had similar Bcan expression compared to BT145 (FIG. 1e). This indicates that the level of BΔg isoform does not necessarily correlate with the level of Bcan cDNA. The expression of BΔg was further confirmed in other patient-derived GSCs with diverse pathology profiles (FIG. 8b). GSC-184 derived from a recurrent patient with MGMT methylation displayed the highest BΔg level. The recurrent GSC specimen (GSC-401) retained a high BΔg level (FIG. 8b). Comparable to previous findings,[9] the expression of BΔg was also observed in various high-grade glioma tissues (grade 3 and GBM), which in contrast, was absent in the control (non-cancerous) brain specimens (FIG. 8c,d). Collectively, these data suggested that BΔg is a promising target for the development of novel therapeutic targeting strategies specific for malignant gliomas.

Example 2. OBOC Peptide Library Screen for BΔg Targeting Peptide Candidates

To discover BΔg-targeting peptides, a two-stage screening process was performed on a one-bead-one-compound (OBOC) combinatorial peptide library using first a magnetic capture technique, followed by a cell-based approach.[20,21,23] An octapeptide OBOC library composed of D-amino acids (D-a.a.) was constructed on 90 μm Tentagel beads where each position was one of eighteen of the amino acids (minus cysteine and methionine) using a standard split-mix synthesis approach[33], to yield a library containing a theoretical diversity of $10^{10}$ different peptides, with each bead displaying $10^{13}$ copies of a unique peptide.

Figure 2A:
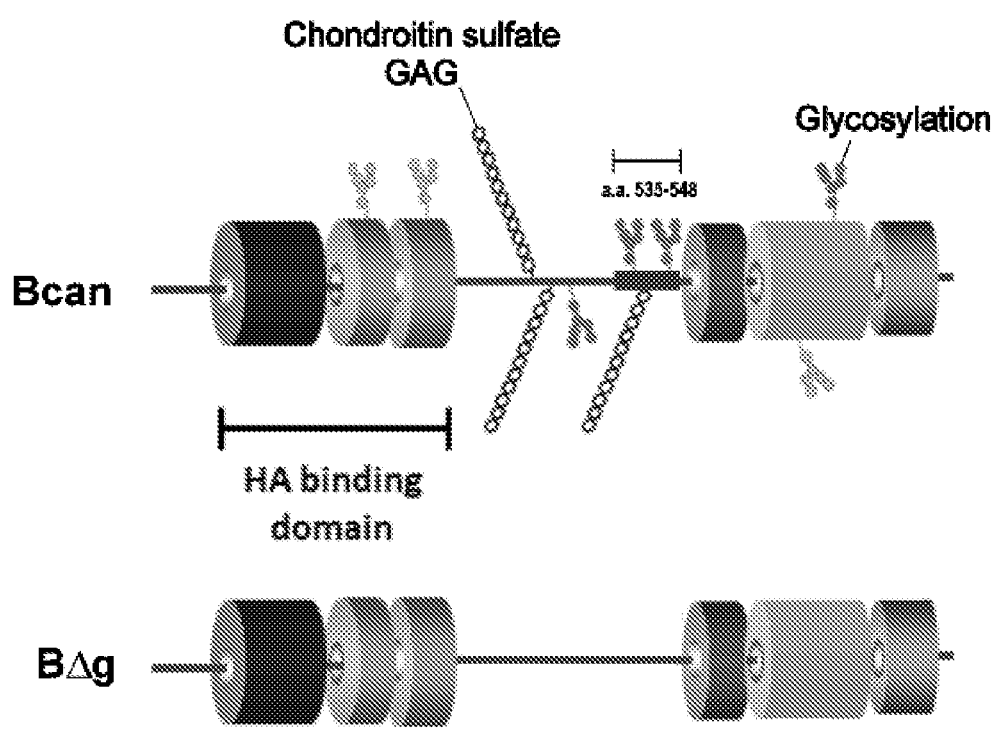
FIGS. 2A-G. Identification of BΔg-binding peptides from screening a one-bead-one-compound (OBOC) library. (a) Schematic of the brevican protein, B/b (top) and its deglycosylated isoform, B/bΔg (bottom). The B/bΔg isoform lacks the vast majority of N- and O-linked carbohydrates (including chondroitin sulfate chains), thus exposing specific epitopes that are blocked in the glycosylated isoform. (b) OBOC library screen by magnetic labeling. Small magnetic particles were decorated with either BΔg-peptide sequence (residue 535-548, SEQ ID NO:1) or the scramble (BΔg) control sequence (SEQ ID NO:2) peptide via the streptavidin-biotin interaction. Firstly, OBOC beads that associated with magnetic particles conjugated with the scramble(BΔg) peptide were isolated using a microfluidic magnetic-activated sorter, and discarded (negative screen). The remaining library were then screened with magnetic particles decorated with the BΔg-peptide, and the magnetized beads (positive hits) were isolated using the microfluidic sorter (positive screen). (c) Immunofluorescence images showing high expression level of BΔg expression in brevican-overexpressing U87 cells, but absent in normal human astrocytes. (d) Immunofluorescence images showing high expression of BΔg in brevican-overexpressing U87 cells compared with the control U87 cells. Scale bar: 100 microns. (e) Western blot analysis showing high expression of BΔg in brevican-overexpressing U87 cells, but not in astrocytes or the control U87 cells (overexpressing empty vector). (f) Predicted 3-dimensional structure of the BΔg-peptide sequence (residue 535-548 from (a)) or scramble (BΔg) control peptide. The structure was predicted using PEP-FOLD (bioserv.rpbs.univ-paris-diderot.fr/services/PEP-FOLD) and visualized in Jmol (N-terminus (blue), C-terminus (orange)). (g) The positive hit beads obtained from (b) were washed rigorously to remove the bound magnetic particles, and incubated with astrocytes (negative screen). Beads with bound astrocytes were discarded, and the remaining beads were washed, and then subjected to U87-GFP cells that do not express BΔg (negative screen). Beads that associated with U87-GFP cells were discarded, and the remaining beads were washed and incubated with BΔg-overexpressing U87-GFP cells (positive screen). Beads with the more significant cell interaction/coating were isolated using a micropipette. The isolated beads were washed rigorously to remove the bound cells, and the peptide on each bead was sequenced by Edman degradation.

The two-stage screening strategy was designed to identify high-affinity BΔg ligands with high stringency and low false positives in a high-throughput manner.[23,34] The fully glycosylated B contains chondroitin sulfate glycosaminoglycan (GAG) chains, N-linked and O-linked sugars[35], which are not present in BΔg (schematic shown in FIG. 2a). Based on the structure of the two isoforms, it was rationalized that the site lacking glycosylation (a.a. 535-548: VHGPPTETLPTPRE, SEQ ID NO:13) is accessible for targeting for the development of specific BΔg affinity ligands. Indeed, this peptide sequence has been successfully utilized in the past to produce the BΔg-specific antibody, BG1 (FIG. 8a).

Figure 2B:
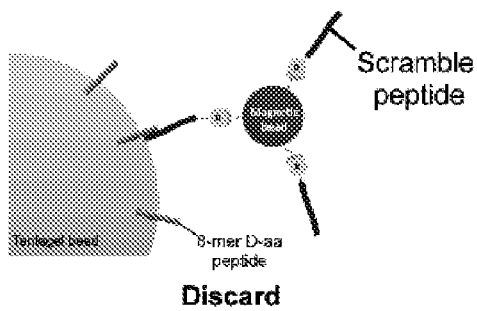
Figure 2B:
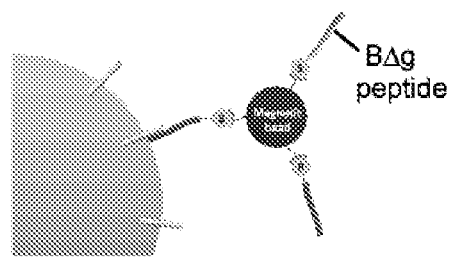
Figure 2B:
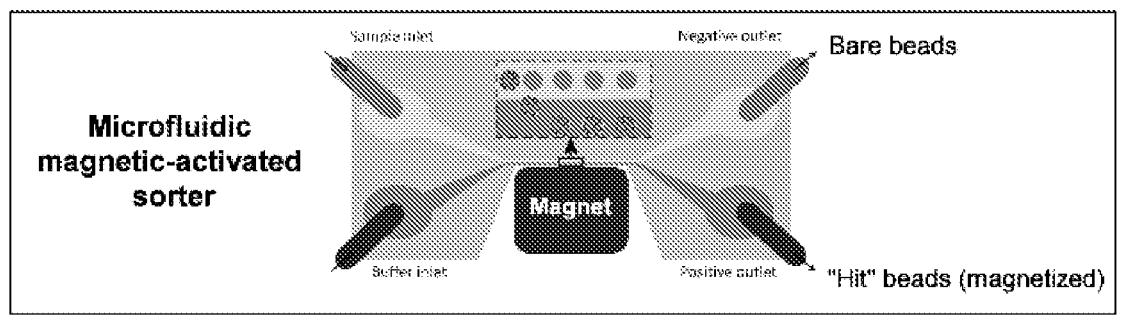
Figure 2C:
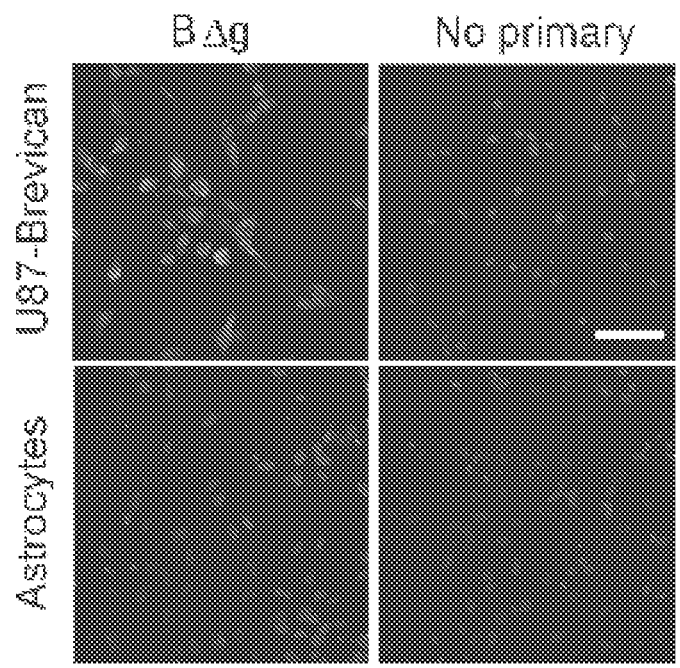
Figure 2D:
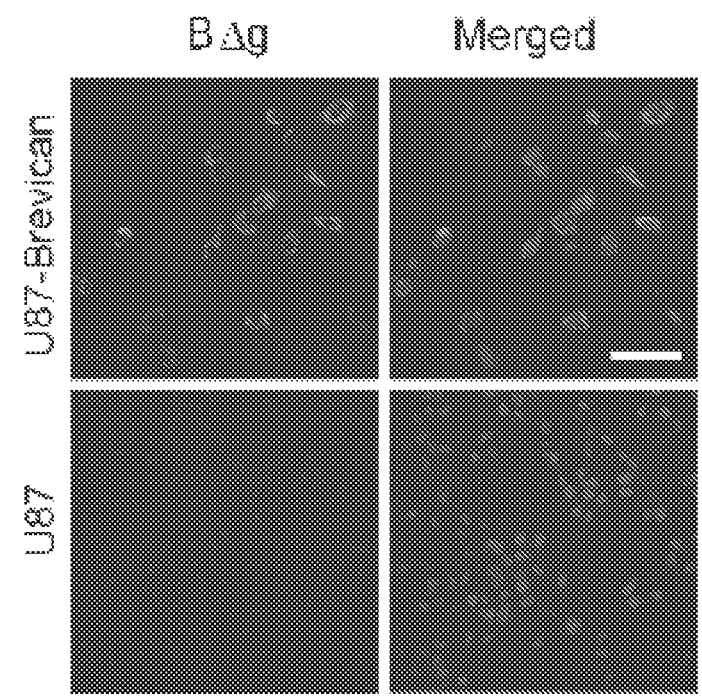
Figure 2E:
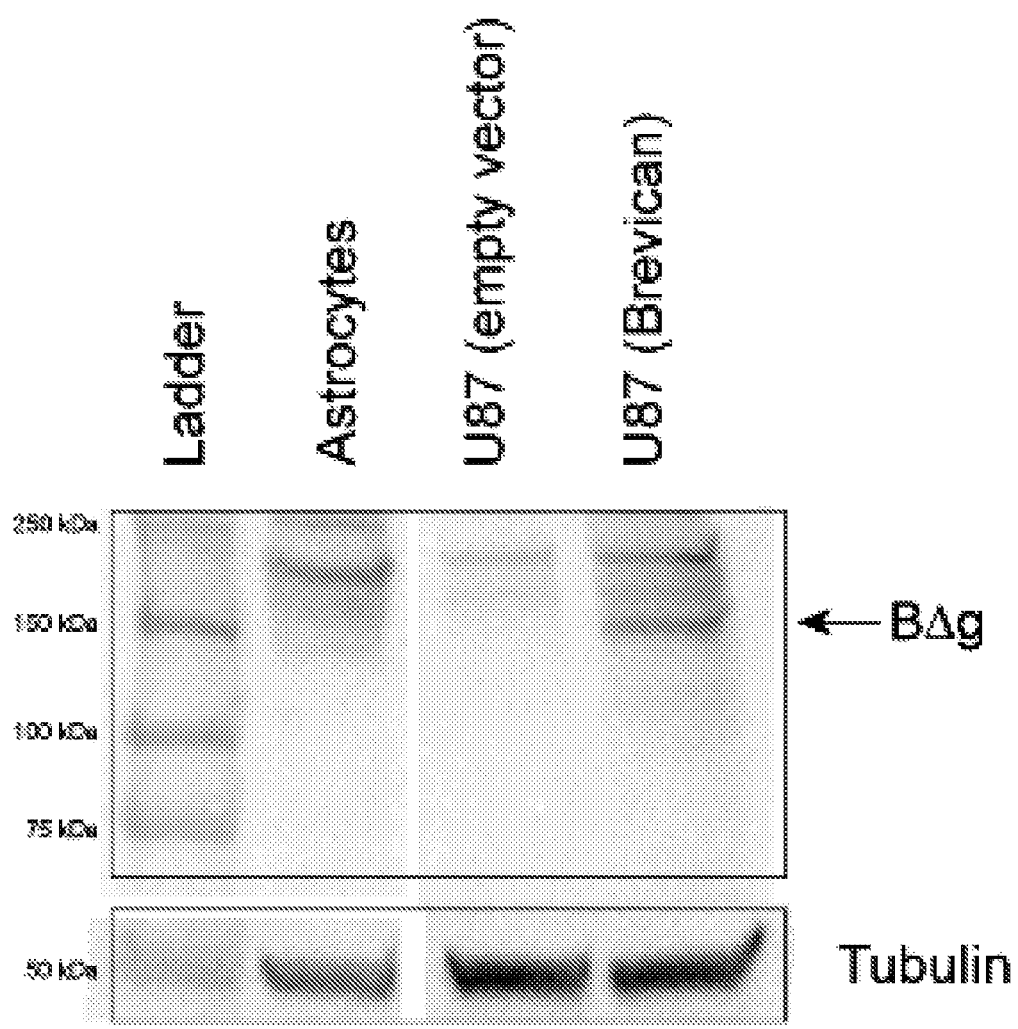
Figure 2F:
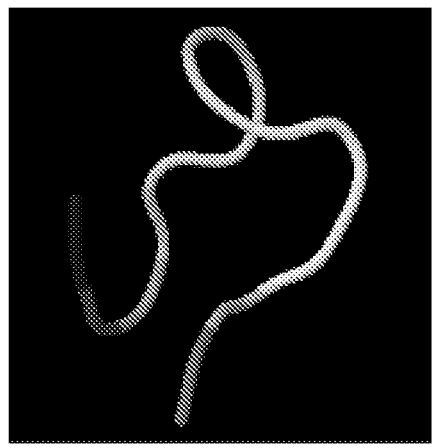
Figure 2F:
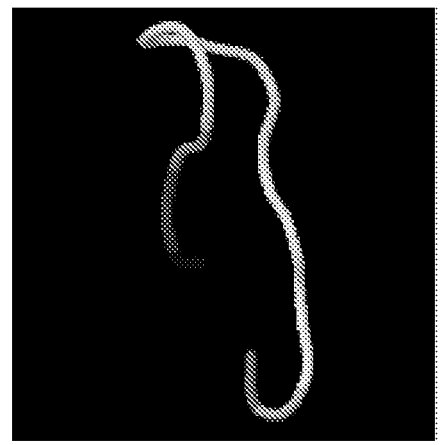
Figures 2G, 3A:
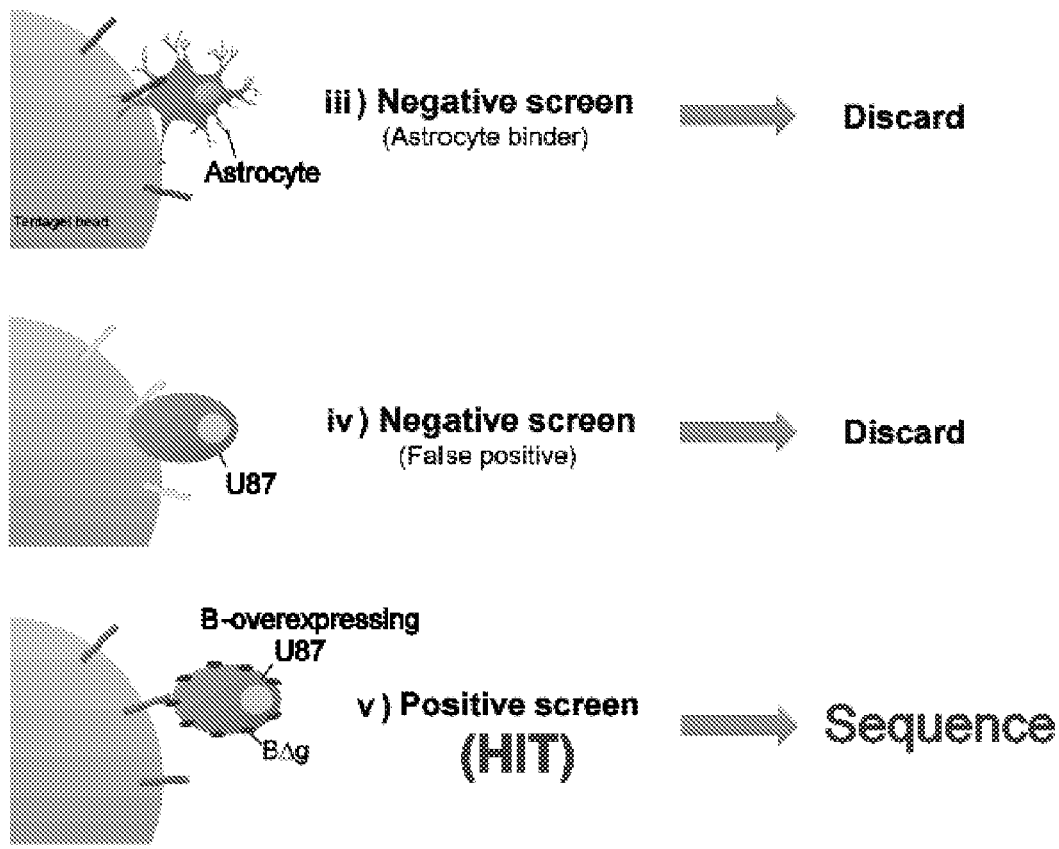
FIGS. 3A-I. Peptide characterization for BΔg specificity in glioma stem cells. (a) Table summary listing the properties of 7 peptides (composed of 8 D-amino acid residues, SEQ ID NOs:3-9, in order of appearance) that were isolated from the OBOC library screen. MW=molecular weight; KD=Kyte-Doolittle scale for amino acid hydropathy (positive scores indicate hydrophilicity, and negative scores indicate hydrophobicity) (Kyte and Doolittle, J. Mol. Biol. 157, 105-132 (1982)). (b) Chemical structure showing the linkage between the peptide and FITC. (c) Western blot analysis showing the level of BΔg and Bcan in human embryo kidney (HEK) cells, and Bcan-overexpressing HEK cells (HEK-Bcan). (d) Flow cytometry analysis showing that uptake of fluorescein-conjugated peptide candidates BTP-2, 7, 8, 9, and 10 (at 1 μM conc.) in HEK-Bcan cells was significantly reduced by an excess (50×) of the corresponding unlabeled peptide, suggesting that the uptake was due to specific ligand-receptor interaction ($n_{events}$=20,000). Each group was normalized to a no-blocking (vehicle) control. Statistics were performed using multiple t-tests, and significance was measured in comparison to each vehicle control (p<0.0001). (e) Uptake of fluorescein-labeled BTP-2, 7, 8, 9, and 10 (at 5 μM conc.) in BT188 (BΔg-high) or BT145 (BΔg-low) glioma stem cells (GSCs). Western blot analysis on the top right confirms the BΔg expression level. The graph shows mean fluorescence intensity quantified from fluorescence images of the GSCs with s.d. error bars ($n_{GSCs}$=10). Statistics were performed using the two-way ANOVA and Tukey's Multiple Comparison test. (f) Chemical structure showing the linkage between the peptide and Cy5.5 dye. (g) Western blot analysis showing the expression of BΔg in GBM-6 cells, with negligible BΔg level in astrocytes or neural progenitor cells (NPC). (h) Graph showing the cell uptake ranking of the top 3 peptide candidates, BTP-7, 8 and 9 in GBM-6 cells as determined by flow cytometry analysis with s.d. error bars (5 μM conc.; $n_{events}$=20,000 cells; $n_{experiment}$=5). Each group is normalized to the control scramble peptide (Scr-8). Statistics were performed using the one-way ANOVA and Tukey's Multiple Comparison test (significance were measured in comparison to the Scr-8 control). (i) Bar graph showing the uptake of BTP-7, 8 and 9 in GBM-6 cells and NPC with 95% confidence interval error bars (1 μM conc.; $n_{events}$=20,000 cells). Statistics were performed using the two-way ANOVA and Sidak's Multiple Comparison test.
Figure 3B:
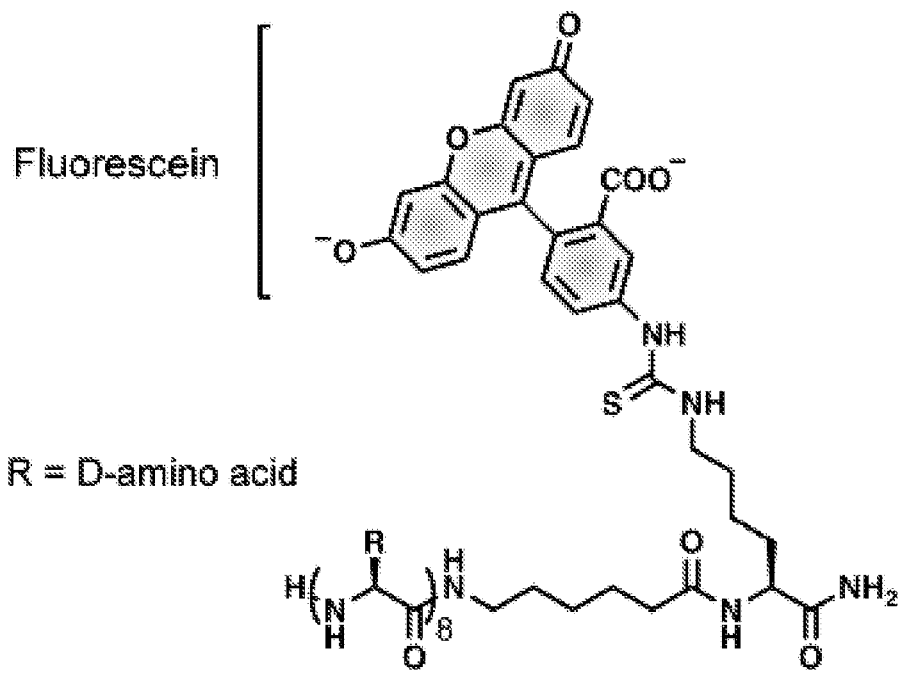
Figure 3C:
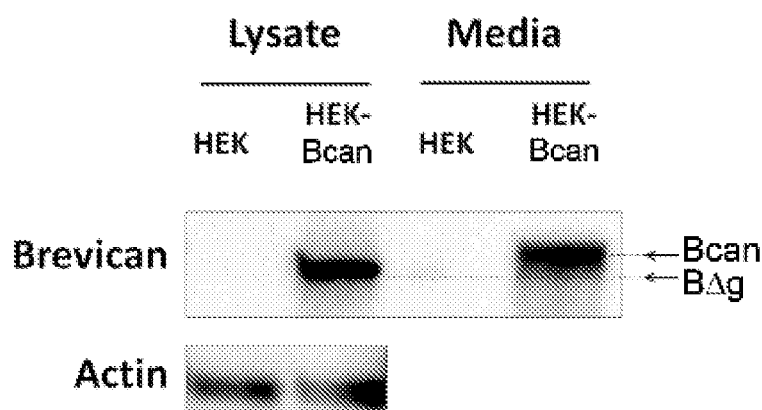
Figure 3D:
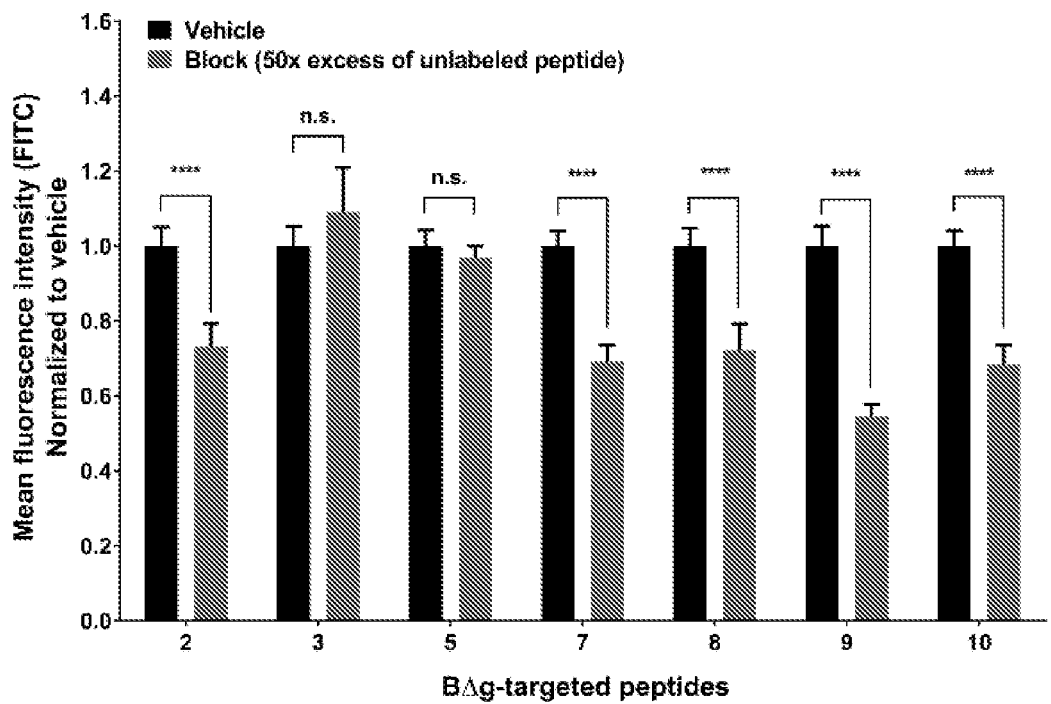
Figure 3E:
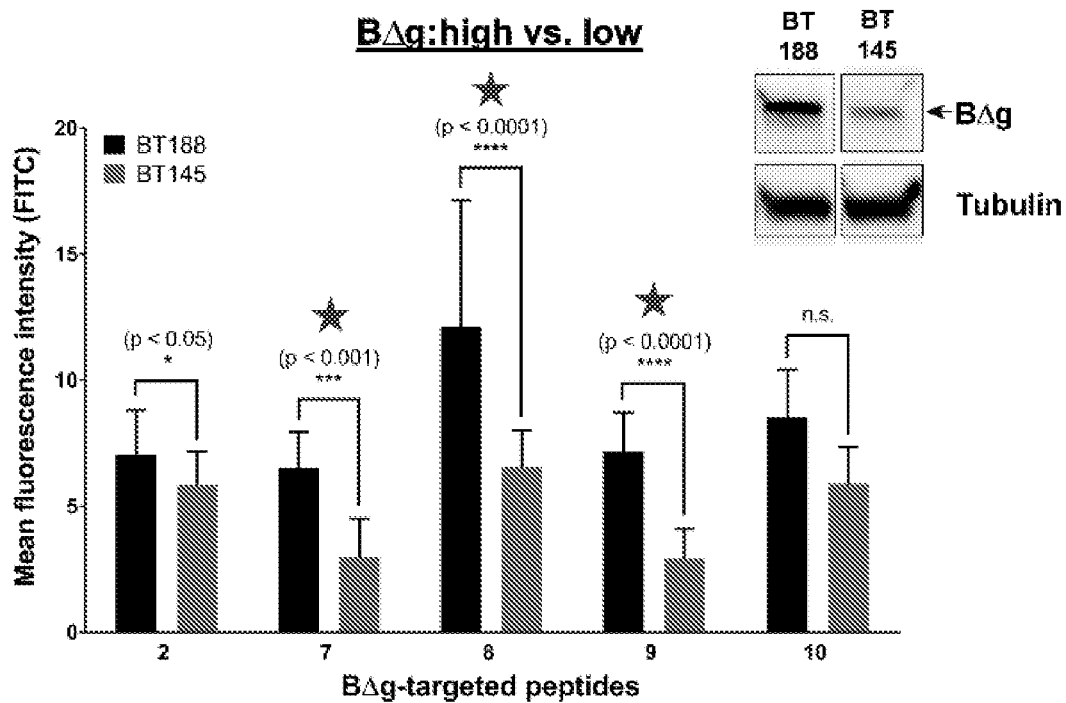
Figure 3F:
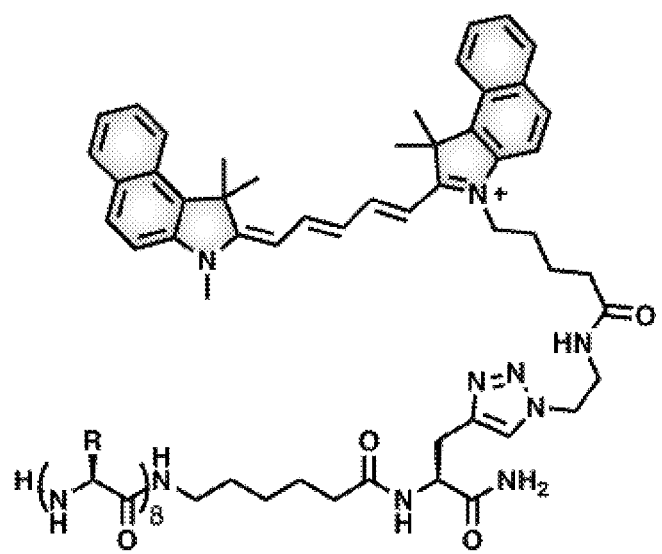
Figure 3G:
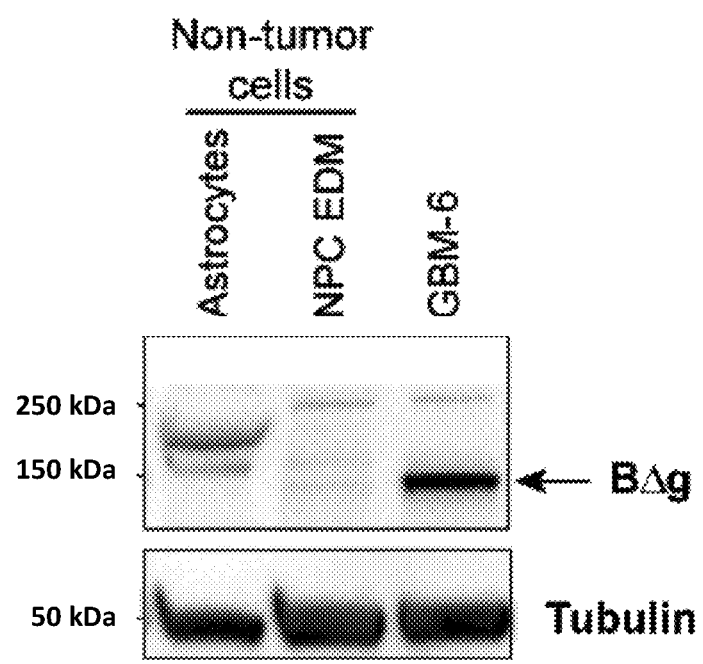
Figure 3H:
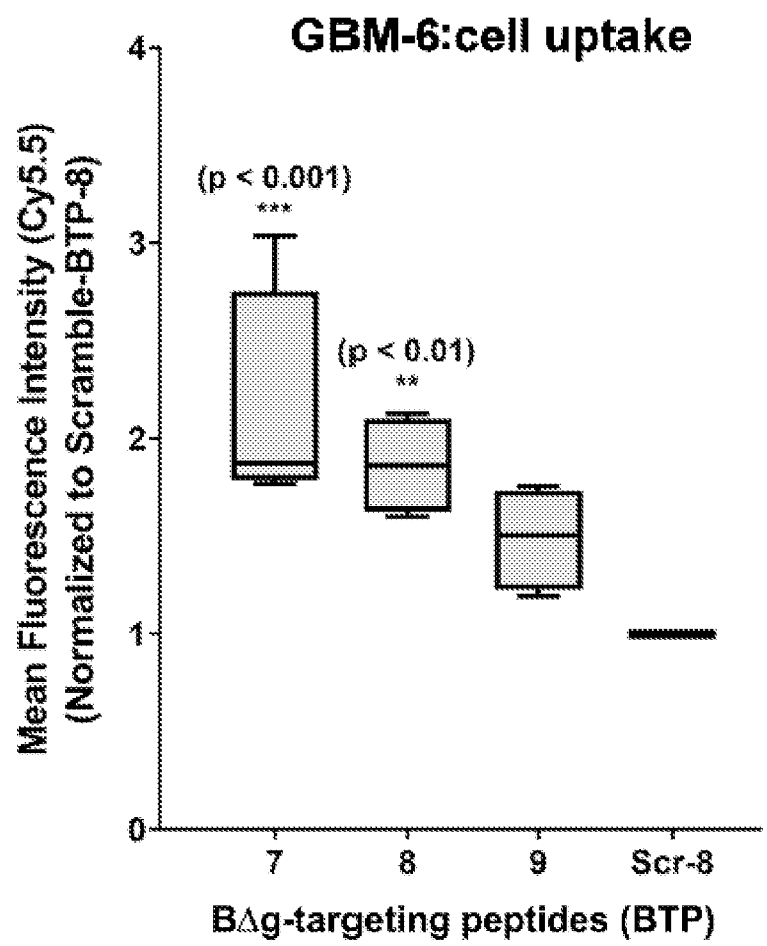
Figure 3I:
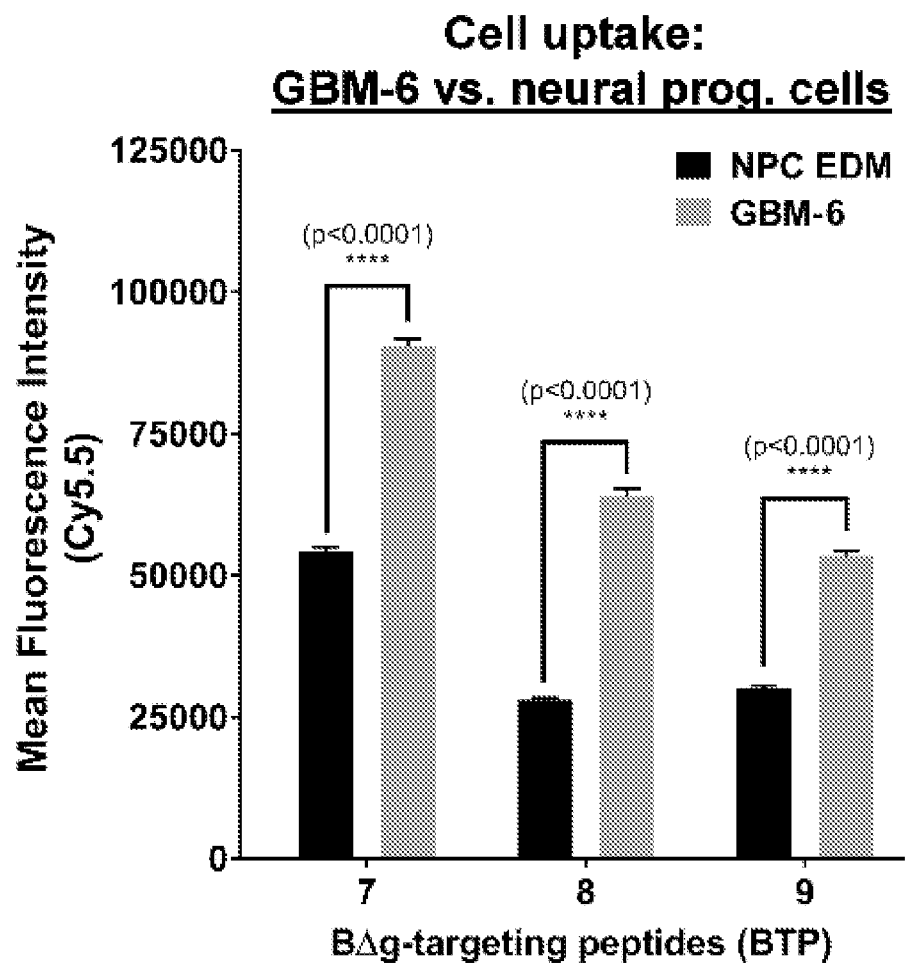
Figure 4A:
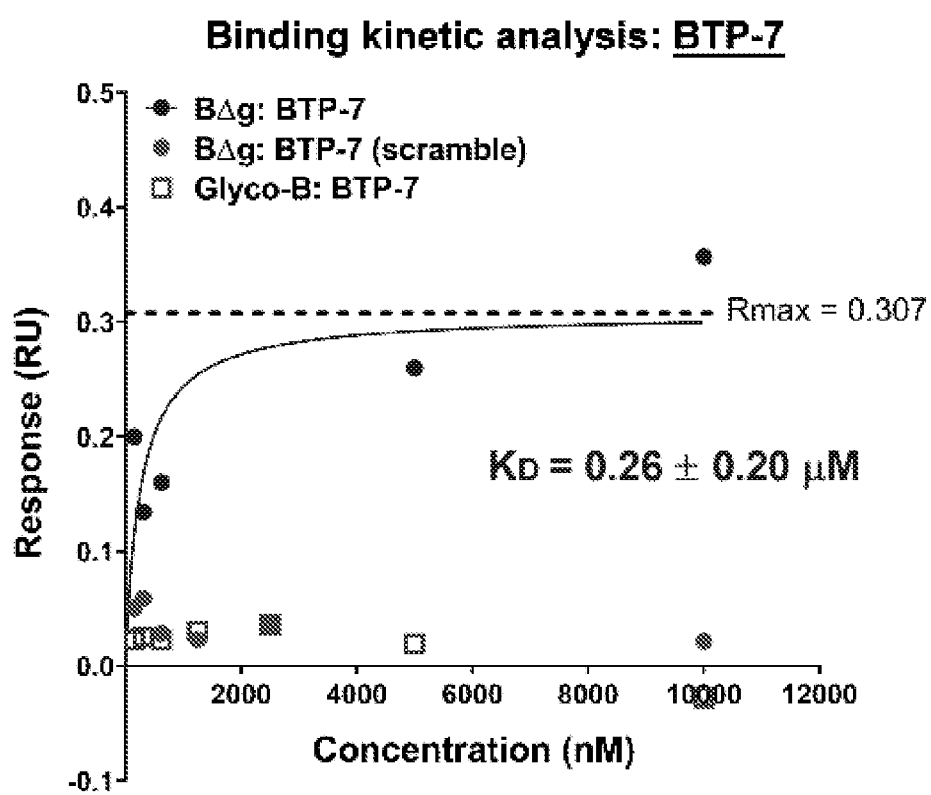
FIGS. 4A-C. Binding affinity and specificity of the top 3 peptide candidates to BΔg protein. Steady state analysis using the Octet platform (Forte Bio) to measure the binding affinity of (a) BTP-7, (b) BTP-8 and (c) BTP-9 to recombinant BΔg (blue) or the fully glycosylated Bcan protein. All peptides show specific binding to BΔg, and not to the control Bcan protein. The $K_D$ (dissociation constant) of each peptide to BΔg is indicated in the corresponding plot. BTP-7 displays the greatest binding affinity. A scramble sequence of BTP-7 displays no binding to BΔg, as represented by green dots in panel (a). All steady state curves were plotted on the GraphPad Prism software (version 7.03), and the $K_D$ and $R_{max}$ values were measured through a non-linear regression (one site specific binding) fit.
Figure 4B:
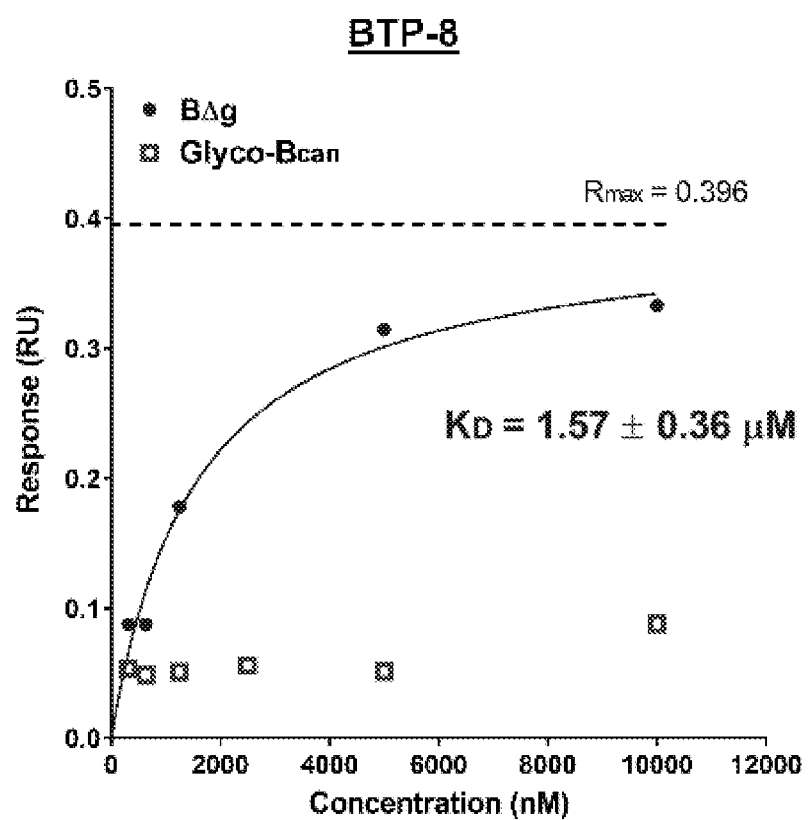
Figure 4C:
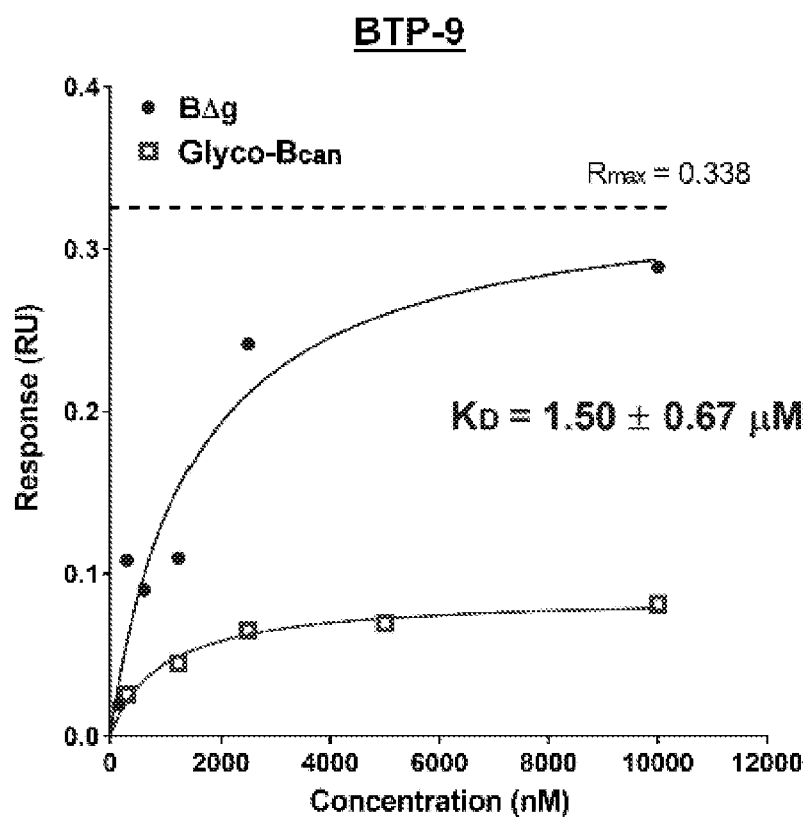

Screen 1:

Magnetic-activated sorting. A high-throughput magnetic capture approach was utilized, where OBOC library beads with high affinity for the target protein would be labeled with magnetic "prey" particles and thus, become "magnetized" positive hits (FIG. 2b). The a.a. 535-548 peptide sequence of BΔg (epitope of BG1, and referred to as "BΔg-peptide") as well as a corresponding scramble (scramble(BΔg)) peptide was conjugated onto small magnetic particles (2 μm size). MALDI mass spectrometry of each magnetic particle formulation was performed to verify successful conjugation (FIG. 9*a,b*). Even though the two peptides have the same a.a. composition, both peptides exhibited different predicted 3-D structures (FIG. 2*f*). A 'negative screen' was first performed by incubating the OBOC library beads with magnetic particles conjugated to the scramble(BΔg) peptide to minimize false positive from this screen. Magnetized OBOC beads that have interacted with the scramble-magnetic beads (via non-specific interactions) were sorted from non-magnetized (bare) beads using a magnetic-activated microfluidics bead sorter.[22] The non-magnetized population (enriched library) was then collected, and incubated with magnetic particles displaying the a.a. 535-548 peptide sequence "BΔg-peptide". This time, the magnetized bead population was collected after sorting and subjected to Screen 2.

Screen 2:

Cell-based screen. To ensure that the peptide candidates also recognized BΔg in its native conformation on the cell's surface, a secondary cell-based screening approach was also conducted using BΔg-overexpressing U87 and non-expressing (astrocytes and U87) cells (FIG. 2*c,d,e*). First, hit beads from Screen 1 were mixed with live astrocytes (BΔg-negative), and a few hundred beads that did not interact with any cells were collected using a micropipette. These beads were then mixed with U87 cells (BΔg-negative), and approximately 100 beads that did not interact with any cells were isolated. These beads were then finally, incubated with BΔg-overexpressing U87 cells, and 7 hit beads with the highest cell association were isolated and washed extensively.

Example 3. Identification of BΔg-Targeting Peptides (BTP) by Cell Uptake Assays The peptide sequence on each of the 7 hit beads were identified by Edman degradation. The isolated peptides tend to contain multiple basic amino acids (such as lysine, histidine and arginine) (FIG. 3*a*). All peptides had a high isoelectric point (pI) and were positively charged (FIG. 3*a*). All peptides had a positive predicted hydrophilicity value, though BTP-2, 5 and 10 had the tendency to be more insoluble in aqueous solutions compared to the other peptides. To characterize BΔg specificity, each peptide was synthesized, purified and labeled with a fluorescein (FITC) dye on the C-terminus in accordance with the peptide orientation on the OBOC library bead (FIG. 3*b*, FIG. 10).

Firstly, the peptide candidates were characterized using HEK cells that had been engineered to overexpress BΔg (HEK-Bcan). Western blot analysis showed that the level of BΔg in the cell extract (and Bcan in the culture media) of HEK-Bcan cells is dramatically higher than in regular HEK cells (control) (FIG. 3*c*). To determine peptide specificity, a blocking study using a 50× molar excess of unlabeled peptide was performed by flow cytometry. Out of all 7 peptides, 5 of the candidate BΔg-Targeting Peptides (BTP), BTP-2, 7, 8, 9 and 10 demonstrated reduced uptake in HEK-Bcan cells in the presence of the blocking peptide (FIG. 3*a*). Flow cytometry analyses also revealed that these peptides showed increased cell uptake in HEK-Bcan cells compared to regular HEK cells (FIG. 12*a*). Similarly, these peptides also exhibited increased cell uptake in BΔg-expressing BT-188 glioma stem cells (GSCs) compared to BΔg-null astrocytes when analyzed by fluorescence microscopy (FIG. 12*b*). To further narrow down the top candidates, whether these 5 peptide candidates had differential uptake in BΔg-high BT188 GSCs compared with BΔg-low BT145 GSCs was investigated (FIGS. 1*d* and 3*e*). Four peptides, BTP-2, 7, 8 and 9 exhibited greater uptake in BT188 GSCs than BT145. BTP-7, 8 and 9 displayed the largest and most significant difference (FIG. 3*e*), and were thus considered the top three candidates.

To facilitate in vivo characterization, BTP-7, 8 and 9 were next labeled with a Cy5.5 dye (FIG. 3*f*, FIG. 11) that emits light in the near-infrared (NIR) region so that the peptide signal would not be hampered by the autofluorescence of tissues (which is prominently observed in the green emission channel). Furthermore, the use of NIR dyes enables deeper tissue penetration, which is beneficial for imaging whole organs. The GBM animal model was established with the well-characterized GBM-6 patient-derived xenoline (PDX) [36] due to its stable expression of BΔg in culture (and in vivo) (FIG. 3*g*) and ability to form aggressive intracranial tumors in nude mice. Using flow cytometry analysis, Cy5.5-labeled BTP-7 displayed the highest uptake in GBM-6 cells, followed by BTP-8, and then BTP-9 (FIG. 3*h*). Consistent with observations using the fluorescein-conjugated peptides, the Cy5.5-labeled peptides all exhibited greater uptake in GBM-6 cells compared with BΔg-null astrocytes (FIG. 12*c, d, e*). Additionally, GBM-6 cells had a significantly higher uptake of these peptides than neural progenitor cells (NPC) that do not express BΔg (FIG. 3*g, i*). As confirmed by flow cytometry analyses, the Cy5.5-labeled peptides showed increased cell uptake in HEK-Bcan cells compared to regular HEK cells (FIG. 120. To investigate whether the peptides were internalized by the cells (or stuck in the outer cellular membrane), GBM-6 cells were incubated with each peptide at 4° C. to inhibit endocytosis. This resulted in a dramatic reduction in cell uptake (compared to at 37° C.) (FIG. 12*g*), suggesting that the peptides would be internalized by the cells at regular body temperature. Confocal fluorescence imaging of the GBM-6 cells from the BTP-7 group provided further evidence to support that the peptide was internalized at 37° C., but not at 4° C. when endocytosis was inhibited (FIG. 12*h*).

Example 4. Binding Affinity of BTP Candidates to BΔg Protein

Binding kinetics analyses were performed using the Octet RED platform (Forte Bio) to measure the binding affinity of BTP-7, 8 and 9 to purified recombinant BΔg protein. BΔg (or control brevican protein) was loaded onto the Octet sensors, and then the sensors were exposed to each peptide (not labeled with a fluorophore) at increasing concentrations (up to 10 Steady state analyses of the data revealed that BTP-7 bound BΔg protein with the highest affinity ($K_D$=0.26 µM) compared to BTP-8 and BTP-9 ($K_D$=1.57 µM and 1.50 µM, respectively) (FIG. 4a-c), thus making BTP-7 the top candidate for BΔg targeting. These peptides do not bind the glycosylated isoform of normal brevican (FIG. 4a-c), highlighting their specificity for the deglycosylated BΔg isoform. A scramble sequence of the BTP-7 peptide was included as an additional control, which exhibited no binding for the BΔg protein (FIG. 4a). BTP-7 conjugated to a fluorescein dye retained its specificity for BΔg and does not bind to glycosylated brevican, although the binding affinity ($K_D$=3.80 µM) is more than 10 times less than the unlabeled BTP-7 (FIG. 13a). Conversely, BTP-7 conjugated to a Cy5.5 dye was found to have a higher affinity for BΔg ($K_D$=0.19 µM).

Example 5. BTP-7 Binds Intracranial GBM-6 Tumor Cells and Crosses the BBB

In healthy mice, the biodistribution of BTP-7-Cy5.5 was analyzed by imaging the major organs using an In Vivo Imaging System (IVIS) instrument 4 hours post-intravenous administration (FIG. 14a). As expected, clearance organs such as the liver and kidneys displayed the highest fluorescence intensity, while the brain and the heart showed relatively low uptake compared to other organs (FIG. 14a, b).

Figure 5A:
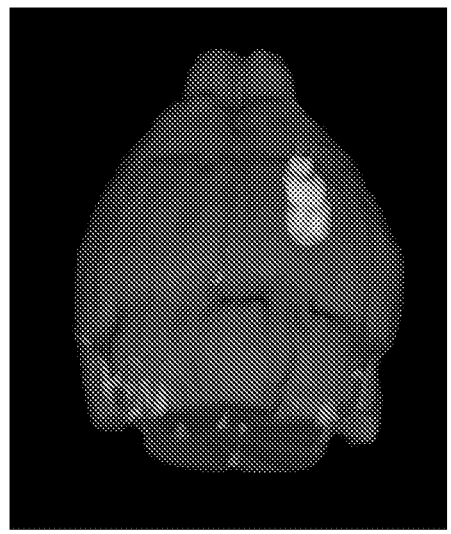
FIGS. 5A-I. BTP-7 targets intracranial GBM-6 tumor and crosses the BBB in vivo. (a) Representative image obtained through T2-weighted magnetic resonance imaging (MRI) showing an intracranial GBM-6 tumor established on the right frontal lobe of a nude mouse at Day 14 post-tumor implantation. (b) Representative fluorescence images showing brain cryo-sections 8-hrs post intravenous (i.v.) injection of Cy5.5-labeled BTP-7, BTP-8 or BTP-9 (100 μL of 500 μM peptide solution, n=3) at Day 15 post-tumor implantation. Cy5.5 dye (no peptide) was injected as a negative control. Tumor regions are marked with yellow dotted lines. (c) Bar graph showing quantification of the mean Cy5.5 intensity in the marked tumor region (from (b)) with s.d. error bars ($n_{sections}$=15). (d) Bar graph showing the quantification of tumor-to-non-tumor ratio (from (b); non-tumor regions are denoted with lines) with s.d. error bars. Statistics were performed using the one-way ANOVA and Tukey's Multiple Comparison test, and significance were compared to the Cy5.5 control group. (e) Bar graph with s.d. error bars showing the permeability of Cy5.5-labeled BTP-7 (or a scrambled peptide, Scr-7) (at 10 μM conc. for 3 hrs) in BBB organoids. Cy5.5-labeled BH3 peptide is used as a non-permeable control peptide. Co-incubation of the organoids with BTP-7 (or Scr-7) together with (f) 4.4 kDa rhodamine dextran or (g) 70 kDa fluorescein dextran (at 10 μg/mL conc. for 3 hrs) does not affect BBB surface integrity. The bar graphs display the mean fluorescence intensity of the 'co-incubation' group normalized to its corresponding 'peptide alone' control group. (h) Fluorescence images of brain cryo-sections showing (30 μm slices) showing the localization of BTP-7 and Scr-7 (in white) in the frontal lobe of non-tumor bearing mice. BTP-7 or Scr-7 (100 μL of 100 μM peptide solution) was injected via the tail vein. 4 hrs later, mice were injected with 100 μL of 50 mg/mL TRITC-dextran (155 kDa) via the tail vein. Mice were sacrificed 30 min later, and their brains excised, and cryo-sectioned into 16 μm slices. Tissue sections from the frontal lobe were imaged by confocal microscopy using a 20× objective. Areas with high TRITC signal indicate regions of high perfusion. Scale bar: 100 microns. (i) Bar graph showing the accumulation of BTP-7 and Scr-7 in the brain parenchyma. BBB permeability was quantified by measuring the mean Cy5.5 intensity within the brain parenchyma outside of highly perfused areas (as indicated by cyan circles in panel (h)) ($n_{tissues}$=2; $n_{areas}$=10). All statistics were performed using the one-way ANOVA and Tukey's Multiple Comparison test (* $p<0.05$,  $p<0.01$, * $p<0.001$, **** $p<0.0001$).
Figure 5B:
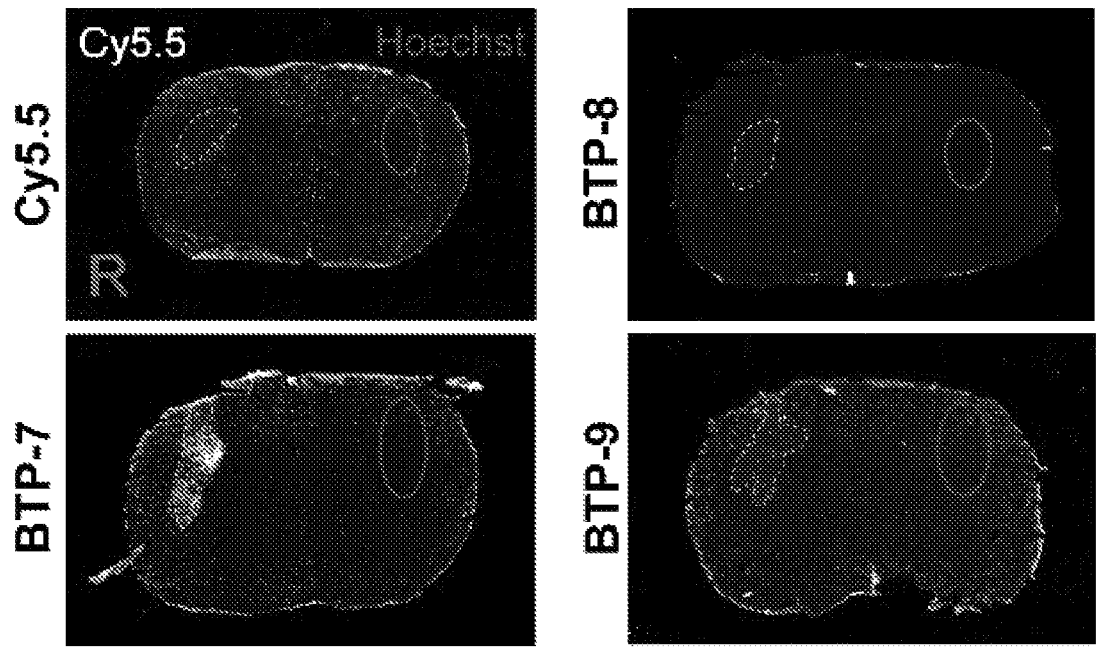
Figure 5C:
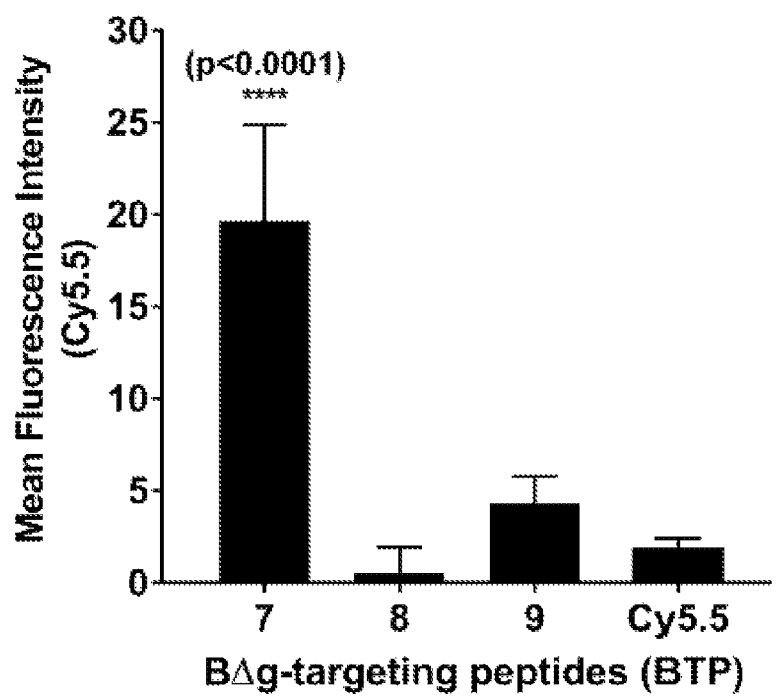
Figure 5D:
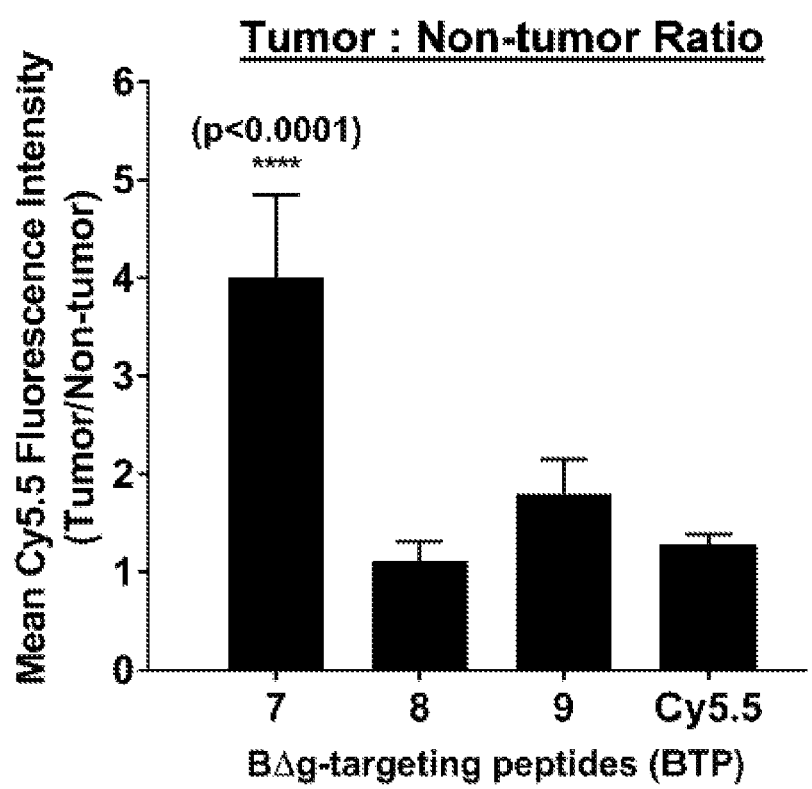

To study tumor uptake, GBM-6 glioma stem cells were implanted intracranially into the right frontal lobe of nude mice. The tumors were allowed to grow for two weeks, and then magnetic resonance imaging (MRI) was performed to verify tumor formation (FIG. 5a, FIG. 14c). Once the tumors were confirmed to be of similar sizes, the mice were assigned into different groups to be injected with either Cy5.5-labeled BTP-7, 8 or 9. Seven hours post-tail vein administration, and the animals were sacrificed and their brains processed for analysis. Fluorescence imaging of the brain cryo-sections revealed that BTP-7-Cy5.5 had significantly higher tumor uptake (more than 10 times) compared to the control Cy5.5 dye (without peptide) (FIG. 5b, c). Meanwhile, negligible fluorescence signal was detected in the tumors from mice treated with BTP-8-Cy5.5 or BTP-9-Cy5.5 (FIG. 5b, c), reaffirming that BTP-7 was the prime candidate peptide that could successfully target and bind gliomas in vivo. To further demonstrate specificity, the level of fluorescence intensity in the tumor was also compared with that of the contralateral (non-tumor bearing) side of the brain. Tumors in the BTP-7-Cy5.5 group exhibited 4 times higher fluorescence intensity compared to the contralateral area (FIG. 5d), highlighting the promise of BTP-7 as a glioma-specific delivery agent.

To further demonstrate specificity, whether BTP-7 could interact specifically with the a.a. 535-548 sequence of BΔg (see FIG. 2a, b), which is the epitope accessible for BΔg targeting, was investigated. Analysis of a mixture of BTP-7 and the BΔg-derived peptide by circular dichroism (CD) spectrometry indicated that the conformation of BTP-7 was altered in the presence of the BΔg-derived peptide, but this effect was minimal (or negligible) in the presence of the scramble(BΔg) peptide. Meanwhile, the BTP-8 structure appeared to be unaffected in the presence of the BΔg-derived (or scramble) peptide. This observation was not surprising given its low binding affinity for the BΔg protein (see FIG. 4a-c), as well as its lack of targeting tumor in vivo (see FIG. 5a-i). To ensure that the structural alteration observed in BTP-7 truly correlated with the presence of the BΔg-derived peptide, the structure of BTP-7 was analyzed upon mixing with various concentrations (0-67 µM) of the BΔg-derived (or scramble) peptide. A clear association was observed, showing that as the concentration of BΔg-peptide increased, the conformational change in BTP-7 intensified in a dose-dependent manner. This trend was not observed when BTP-7 was mixed with the scramble(BΔg) peptide, highlighting that BTP-7 interacted with the BΔg-derived peptide specifically.

Figure 5E:
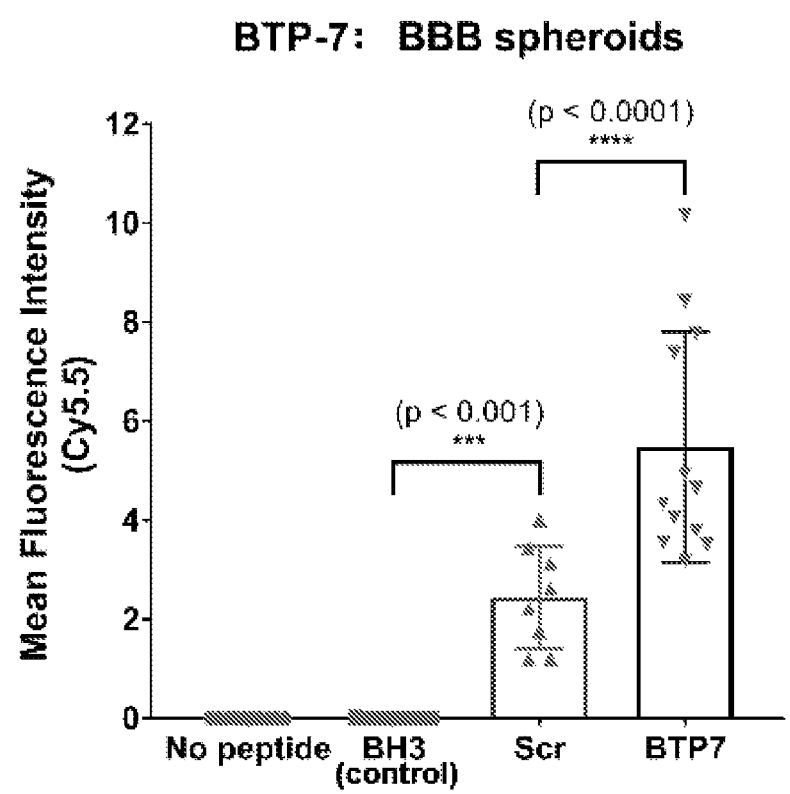
Figure 5F:
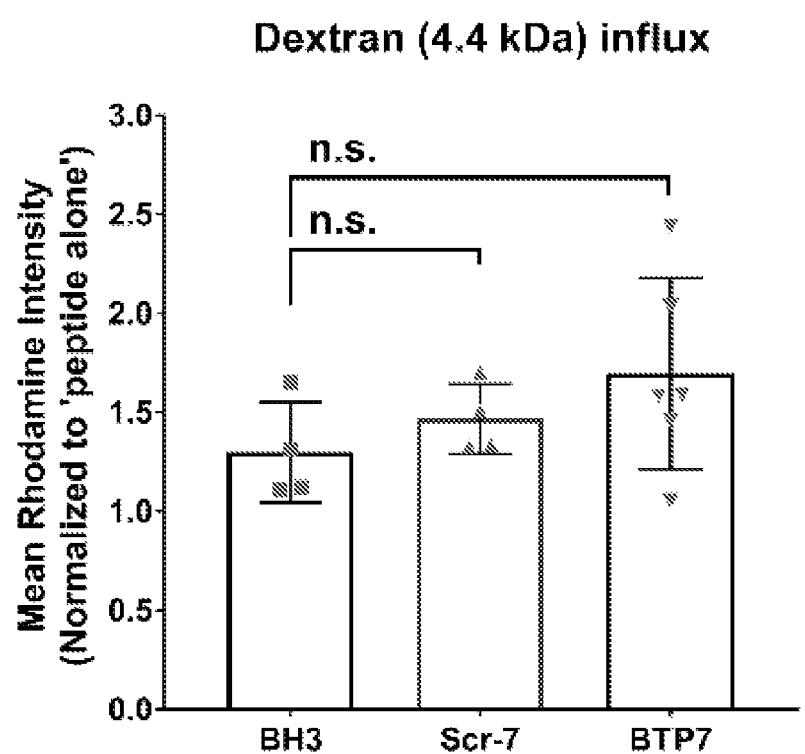
Figure 5G:
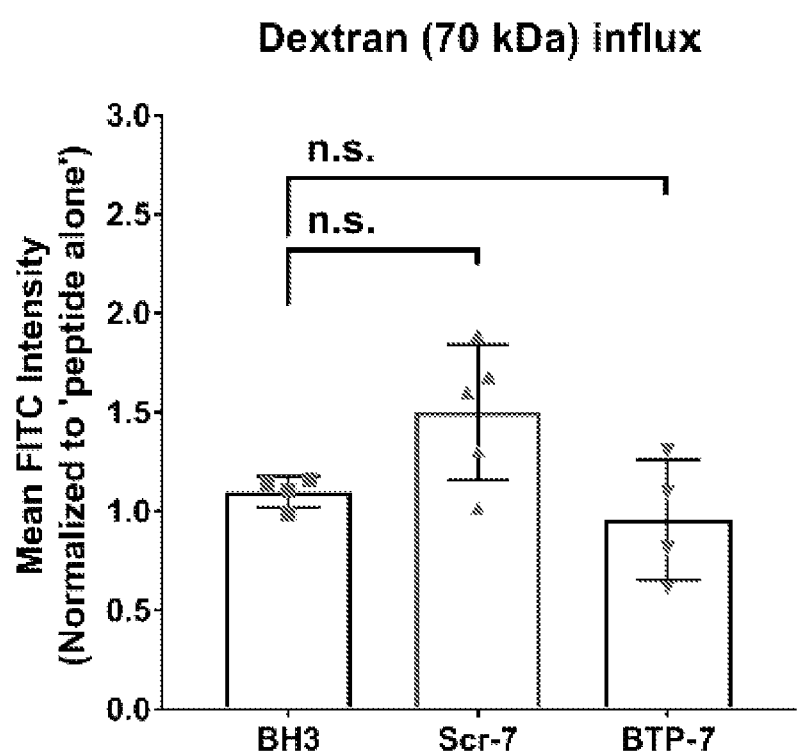
Figure 5H:
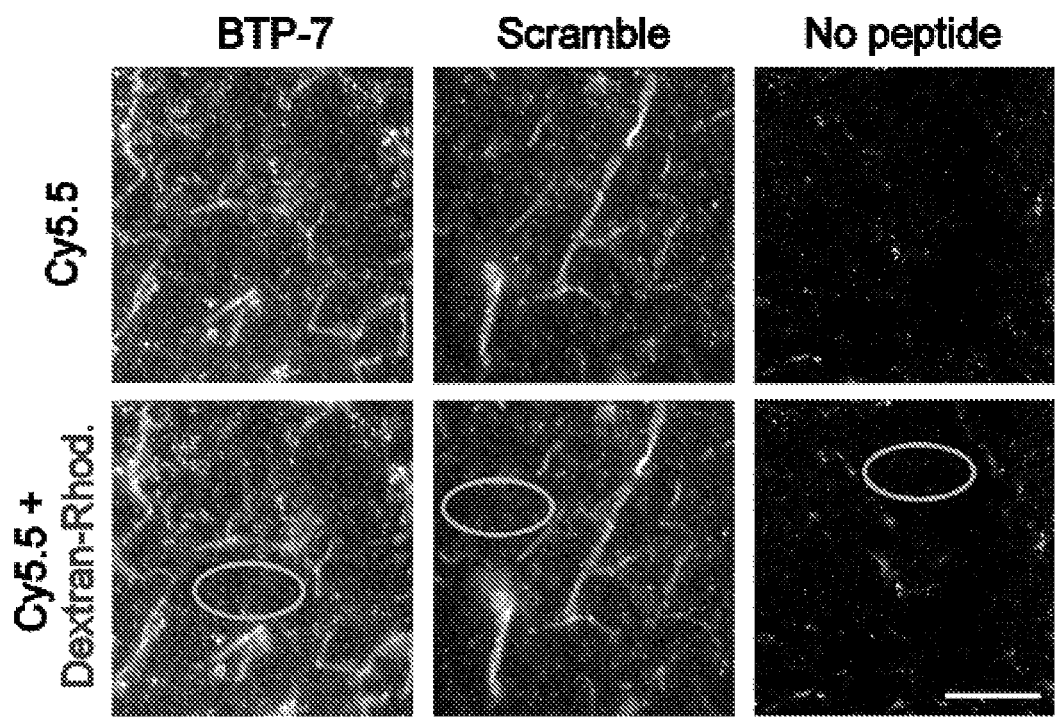
Figure 5I:
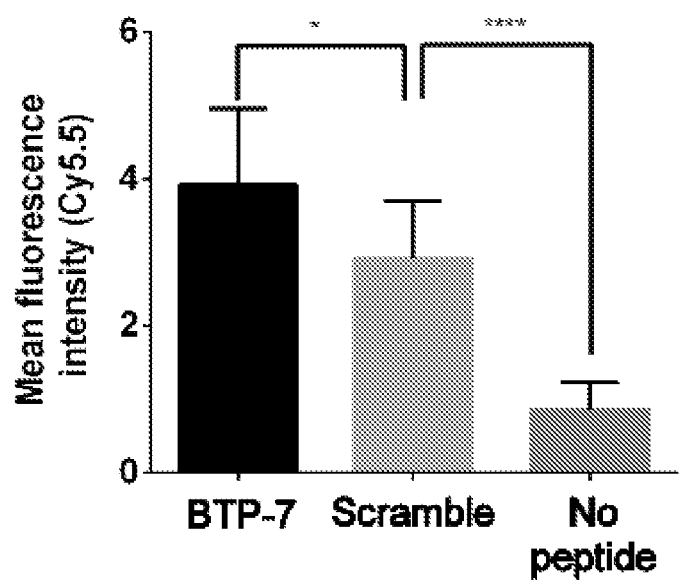

Next, whether BTP-7 could cross the BBB was studied. The first experiments employed the in vitro human BBB organoid model established from primary astrocytes, primary pericytes and immortalized brain endothelial cells.[31] BTP-7 exhibited a dramatic influx into the core of the organoids, highlighting its potential in penetrating the BBB (FIG. 5e). A scramble variant of BTP-7 (Scr-7) was also synthesized, labeled with a Cy5.5 dye and tested using the BBB organoids. While an increased in influx was observed in the organoids (compared to the control non-penetrating BH3 peptide[31]), the level of penetration was significantly lower than that observed with BTP-7 (FIG. 5e). To ensure that peptides were not damaging the organoids, causing the barrier to be leaky and thus resulting in an increased peptide influx, the organoids were co-incubated with each peptide and dextran. In the presence of BTP-7 or Scr-7, the organoids remained relatively impermeable to dextran molecules of varying sizes (4.4 kDa or 70 kDa) at a level that is comparable to the non-permeable BH3 peptide (FIG. 5f, g). To confirm their ability to cross the BBB in vivo, BTP-7-Cy5.5 or Scr-7-Cy5.5 was administered intravenously into healthy non-tumor bearing mice. After 4 hrs, TRITC-dextran was administered injected intravenously so that areas of high perfusion (i.e. blood vessels) could be easily visualized. Mice were sacrificed 30 mins later, their brains were excised and the frontal lobes were cryo-sectioned and examined. Confocal microscopy revealed that both BTP-7 and the Scr-7 accumulated within the brain parenchyma outside of regions of high perfusion (labeled by TRITC-dextran), though the level of BTP-7 extravasation across the BBB was higher that of Scr-7 (FIG. 5h, i). Overall, these results demonstrated the ability of BTP-7 to cross the BBB in vivo and in human BBB organoids, as well as target GBM in a human xenograft mouse model, highlighting its potential as a tumor-specific delivery agent in the development of novel efficacious and safe therapeutics to treat patients with malignant gliomas.

Figure 15A:
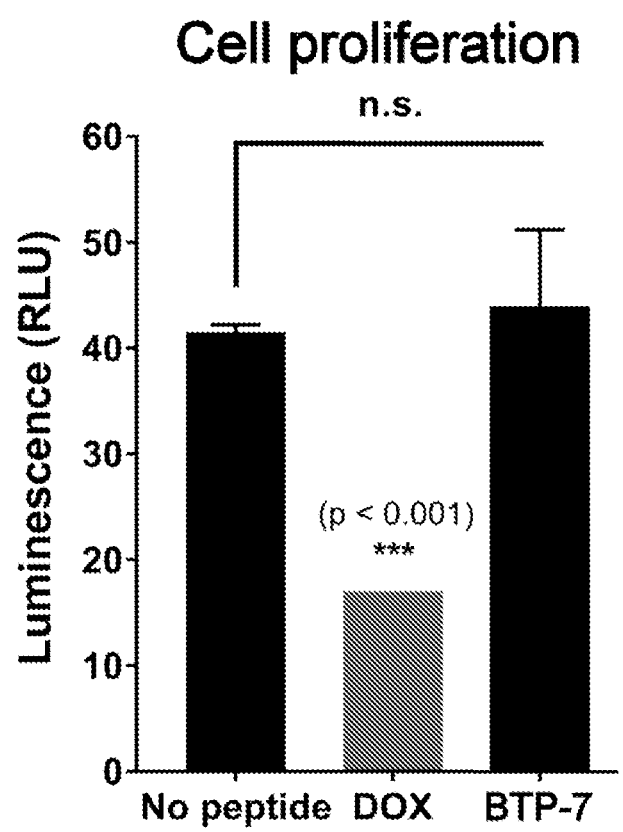
Figure 15D:
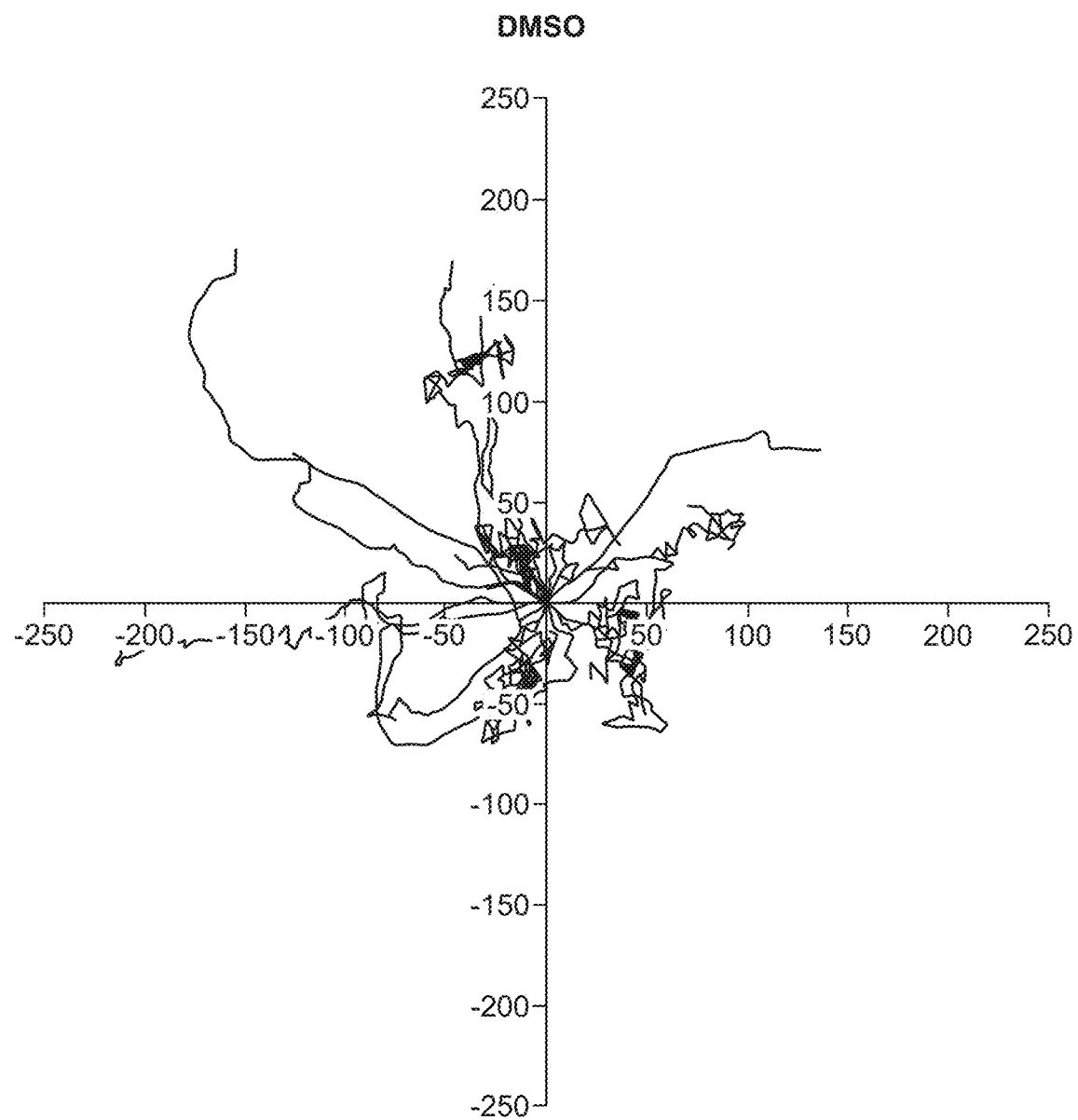
Figure 15D:
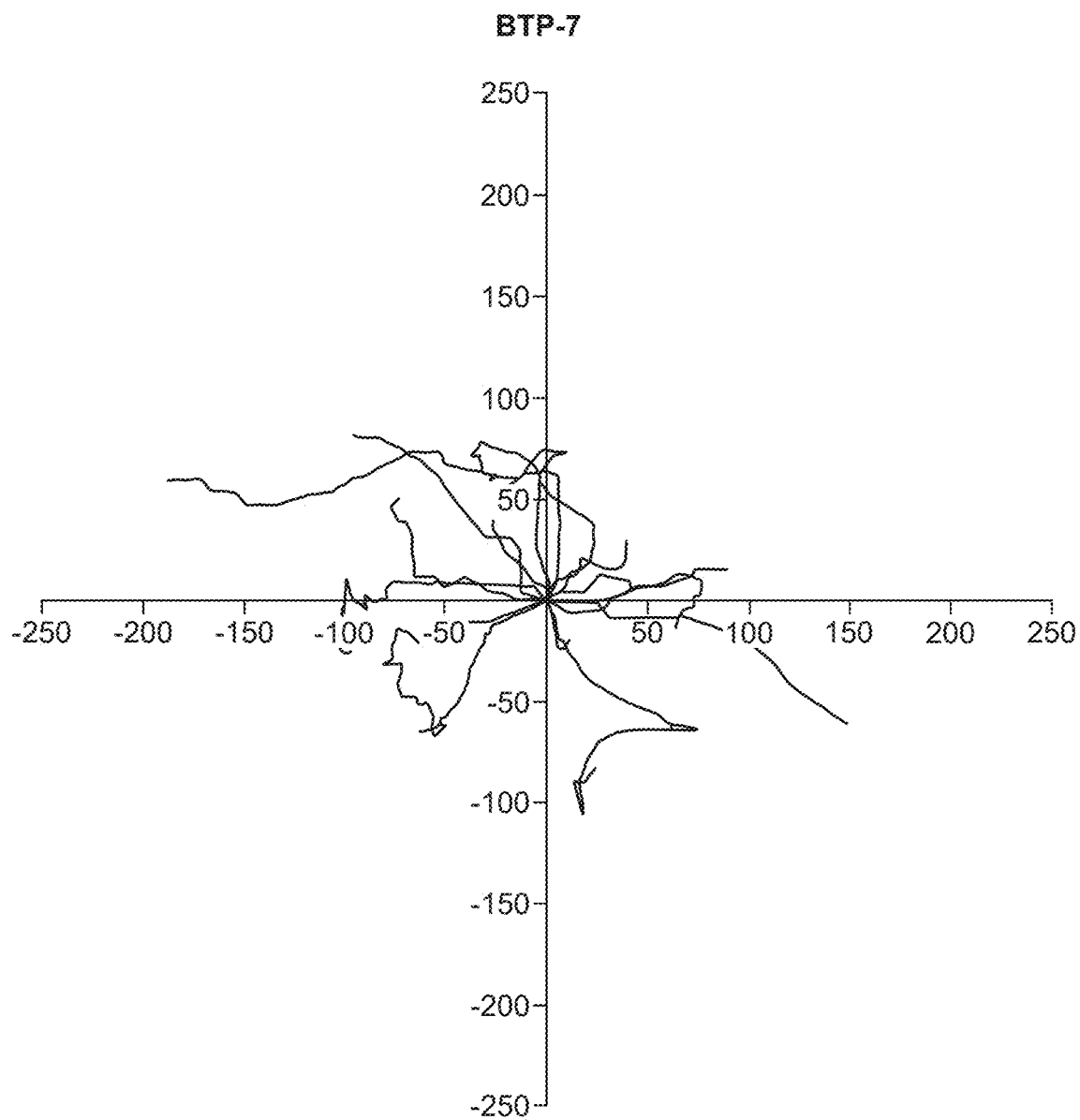

Example 6. BTP-7 as a Vehicle to Deliver a Toxic Drug Payload to Malignant Gliomas Next, experiments were performed to determine whether the BTP-7 peptide alone had any biological effects on glioma cells, though the function of BΔg is currently unknown. To test this, a cell proliferation assay was first performed on GBM-6 cells using unlabeled BTP-7 peptide. Even at a high concentration of 50 BTP-7 did not affect cell proliferation compared to untreated cells (FIG. 15a). Next, whether BTP-7 affected glioma cell invasion in collagen was investigated. Using real-time microscopy, GBM-6 neurospheres were embedded in collagen, and cell invasion was imaged and tracked over 48 hrs. BTP-7 did not affect the number of cells that had migrated and disseminated from the neurosphere (FIG. 15b). Similarly, BTP-7 did not affect the average distance traveled by the migrated cells (FIG. 15c, d).

Altogether, this demonstrates that while BTP-7 binds specifically to GBM cells, it does not affect the biology of the cells, and function only as a 'detector' to guide a linked functional cargo to the tumor.

Figure 6A:
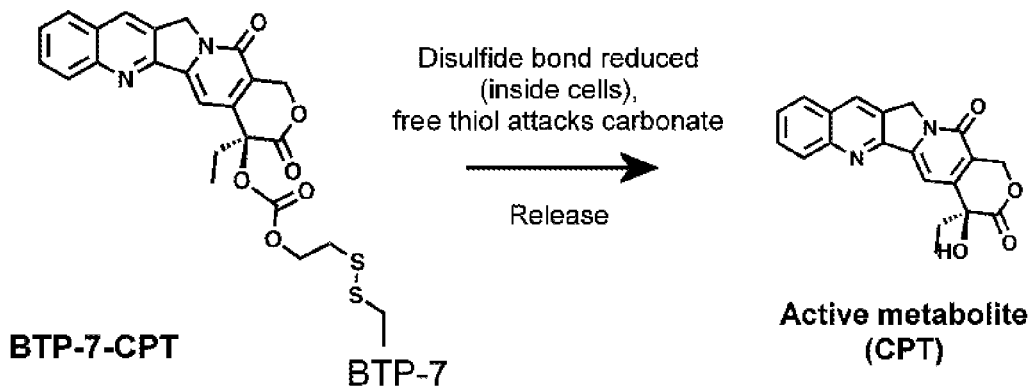
FIGS. 6A-E. Camptothecin (CPT) functionalized with BTP-7 preferentially inhibits proliferation of BΔg-expressing cells and prolongs survival in mouse model of GBM. (a) Chemical structure of BTP-7-CPT and the CPT drug. Upon cell internalization, the disulfide linker between BTP-7 and CPT is cleaved to release the active CPT metabolite. (b) Luminescent cell viability (CellTitre Glo) assay showing that BTP-7-CPT exhibits greater toxicity for Δg-overexpressing HEK (HEK-Bcan) cells than control HEK cells at 72 hrs post drug incubation. (c) CellTitre Glo assay showing no significant difference in cell viability between HEK and HEK-Bcan cells after 72 hrs of incubation with the scramble (Scr-7)-CPT drug conjugate. All statistics were performed using the two-way ANOVA and Sidaks's Multiple Comparison test (d) CellTitre Glo assay showing that BTP-7-CPT is toxic to GBM-6 glioma stem cells. For these cell viability plots, s.d. error bars are displayed ($n_{wells}$=3). All curves were generated using the GraphPad Prism software (version 7.03), and the $IC_{50}$ (half maximal inhibitory concentration) values for each drug and cell type are measured through the non-linear log(inhibitor) vs. response—variable slope (four parameters)' fit. (e) Kaplan-Meier survival plot of mice bearing GBM-6 tumors. Mice were injected intraperitoneally (i.p. at 10 mg/kg dose) with BTP-7-CPT (represented in blue; median survival=73 days), Scr-7-CPT (median survival=67 days) or saline (gray; median survival=46 days). Treatment was performed every 2 days starting from Day 25 to Day 49 post tumor implantation. A significant difference ($p<0.05$) is observed between the BTP-7-CPT and Scr-7-CPT group, and ($p<0.0001$) between the BTP-7-CPT and vehicle group, as determined by the Gehan-Breslow-Wilcoxon test.
Figure 6B:
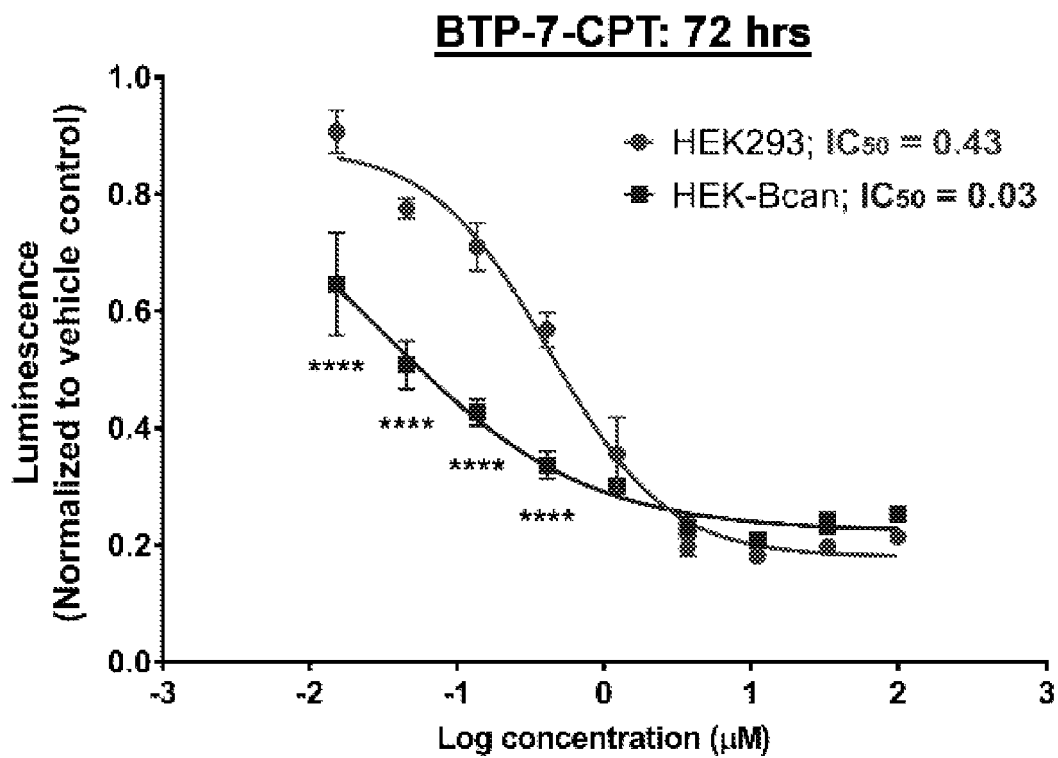
Figure 6C:
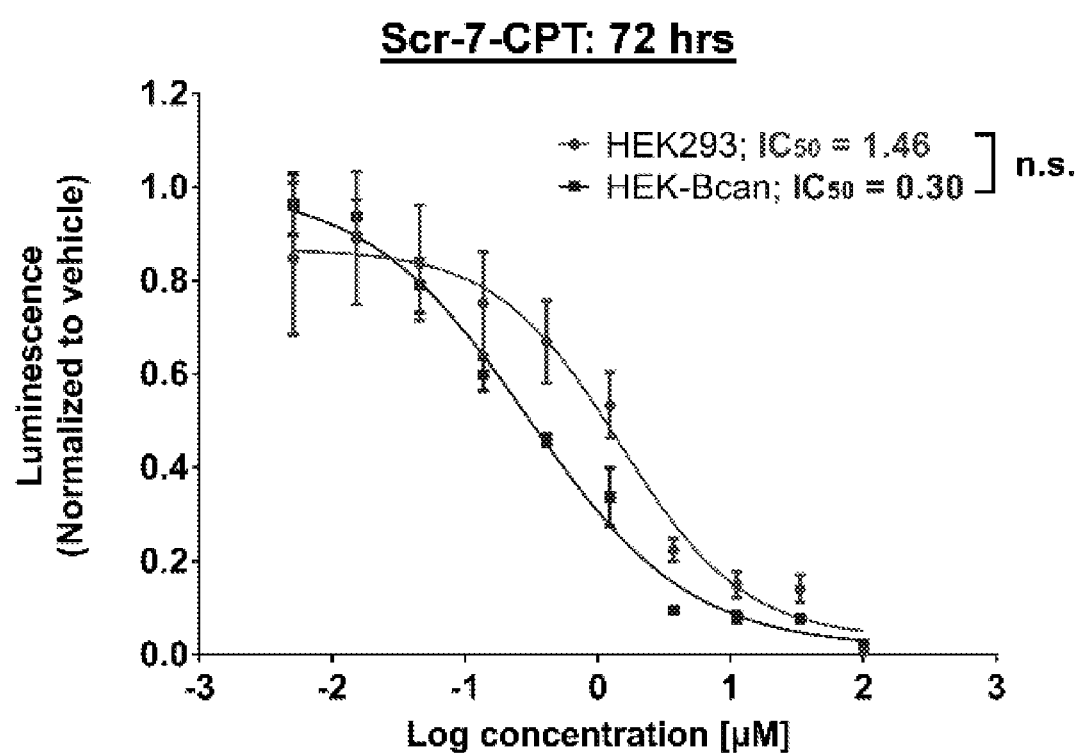
Figure 6D:
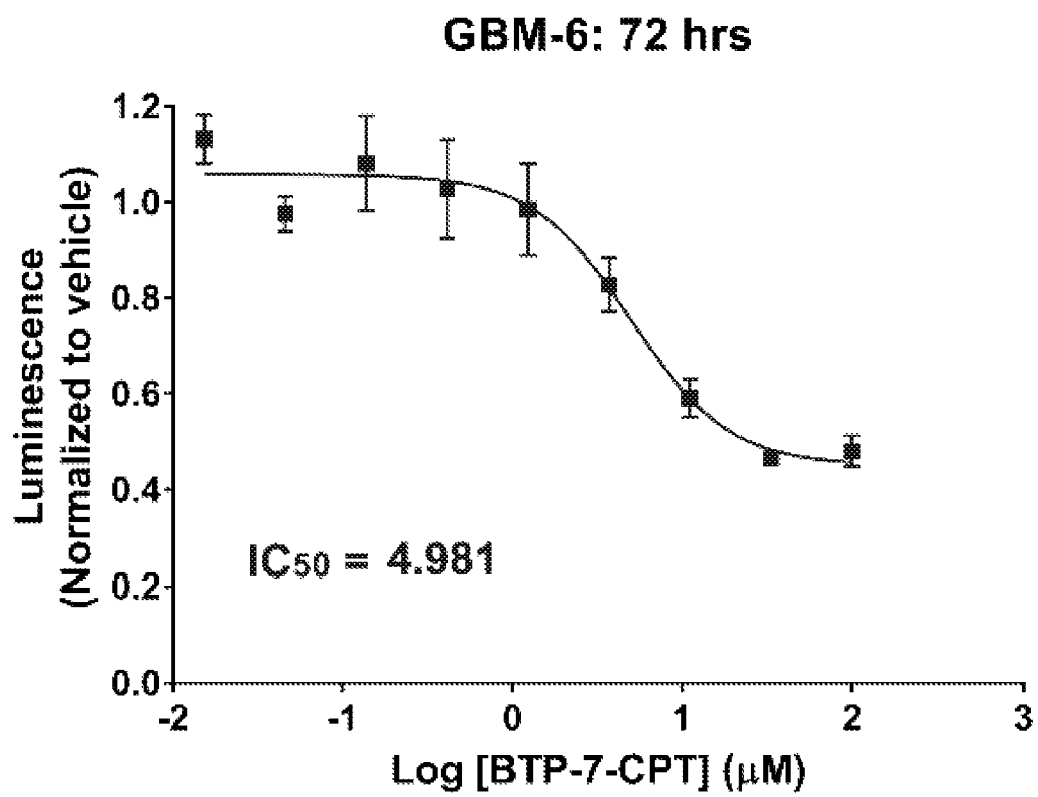

It was hypothesized that BTP-7 would be an ideal vehicle that can simultaneously act as a Trojan horse to shuttle therapeutics across the BBB to maximize efficacy, as well as a 'tumor missile' to target a therapeutic payload directly to the tumor tissues once inside the brain to minimize potential neurotoxicity. As a proof-of-principle, camptothecin (CPT) was functionalized with BTP-7 (BTP-7-CPT) via a disulfide linker at the C-terminus that is cleaved upon cell internalization to release the active CPT drug metabolite (FIG. 6a, FIG. 16a).[38] A Scr-7-CPT conjugate was also synthesized as a control. First, the results showed that BTP-7-CPT is more toxic to BΔg-overexpressing HEK cells than control HEK cells (FIG. 6b), highlighting that the BTP-7 drug conjugate preferentially killed cells that express BΔg. Meanwhile, the scramble drug conjugate, Scr-7-CPT did not exhibit a significant difference in toxicity between the two cell lines (FIG. 6c), further demonstrating the specificity of BTP-7. BTP-7-CPT was toxic to GBM-6 cells at various concentrations tested (between 1-11 µM) (FIG. 16b) with an $IC_{50}$ of 5 (FIG. 6d).

Figure 6E:
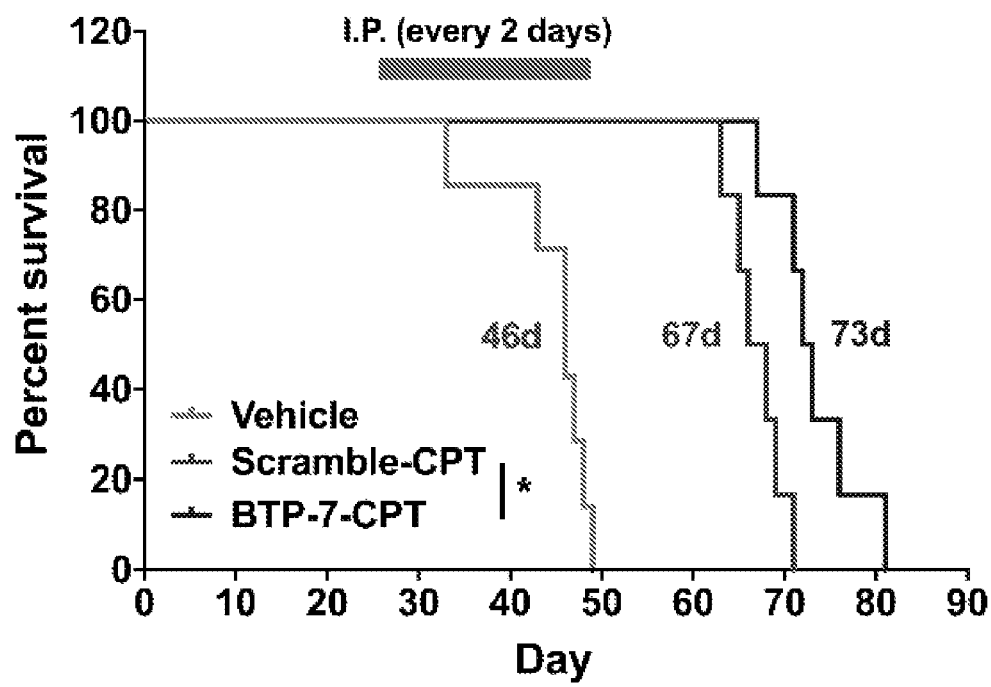

To assess the efficacy of BTP-7-CPT, GBM-6 tumors were established in the right frontal lobe of nude mice (6-7 mice per group) and allowed to grow for approximately 25 days. MRI was used to assess the tumor size, and once the tumors were confirmed to be of similar sizes (FIG. 16c), the mice were randomly designated into three treatment groups: vehicle (control), Scr-7-CPT, and BTP-7-CPT. Treatment was administered intraperitoneally (i.p.) at a dose of 10 mg/kg every two days starting from Day 25 to 49 post-tumor implantation. MRI was performed on Day 47, and a dramatic decrease in tumor size was observed in mice treated with BTP-7-CPT or Scr-7-CPT (FIG. 16c). By this time, the tumor in the vehicle group had reached the endpoint, and the tumor was seen to be pushing outwards on the skull, causing the entire brains to be noticeably edematous/enlarged in the MRI scan compared to the treated groups (depicted in FIG. 16c). The last treatment dose was administered on Day 49, and then the mice were weighed daily and monitored closely. The animals were sacrificed when signs of morbidity were observed. Treatment with either of the CPT conjugates extended survival in mice compared to the group that only received vehicle (FIG. 6e). Mice treated with BTP-7-CPT had prolonged survival (median survival=73 days) compared to mice treated with Scr-7-CPT (median survival=67 days) ($p<0.05$).

Figure 7A:
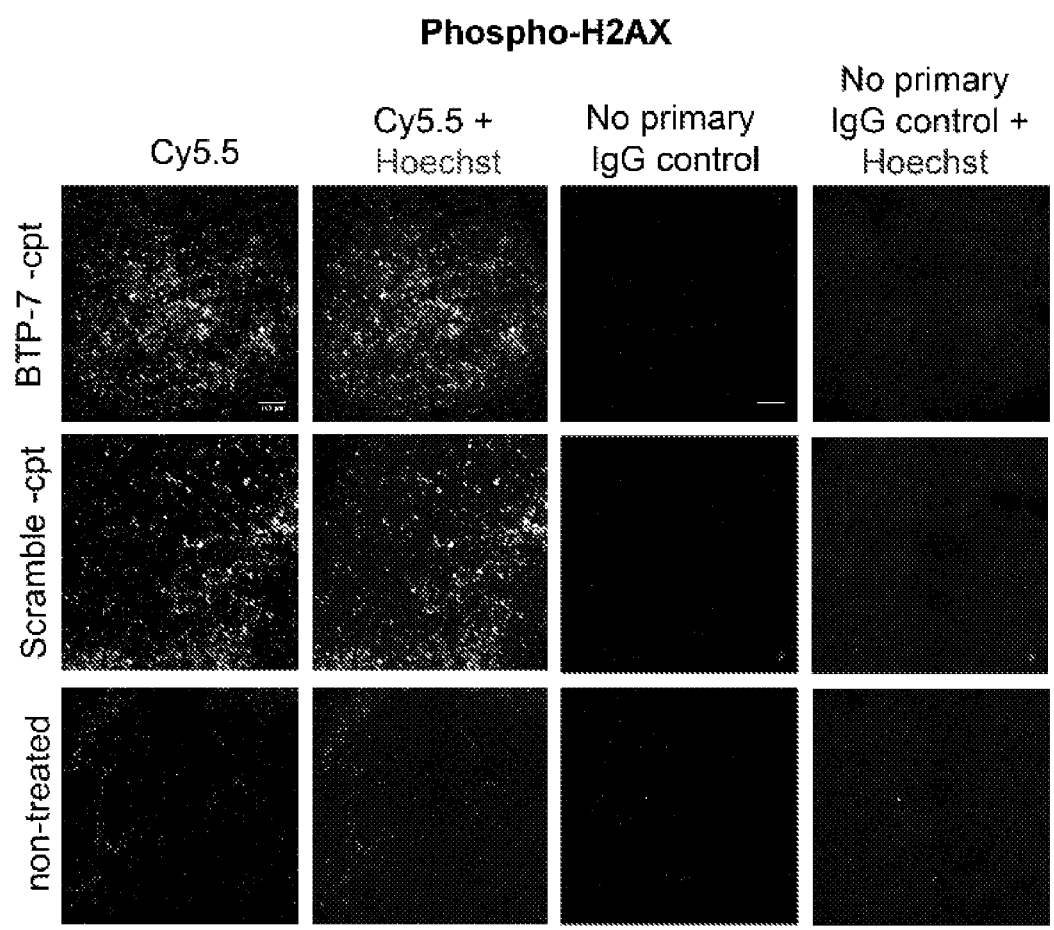
FIGS. 7A-D. Ex vivo analyses of brain cryo-sections from mice bearing GBM-6 tumors after BTP-7-CPT treatment. (a) At Day 49, mice from each group (treated i.p. with 10 mg/kg dose; every 2 days starting from Day 25 to Day 49 post tumor implantation) were euthanized, and their brains collected, cryo-sectioned into 16 μm sections, immunostained for phospho-H2AX (DNA damage marker; white) and imaged using a 20× objective. Tile scans and z-slices were merged to generate a maximum intensity projection. Nuclei of tissues were stained with Hoechst dye (blue). Scale bar: 100 microns. (b) Bar graph showing the level of DNA damage (from panel (a)) for each group. Areas within the tumor region were selected and the mean fluorescence intensity was quantified using the ImageJ software ($n_{tissue}$=3). The graph shows s.d. error bars, and statistical analysis were performed using one-way ANOVA and Tukey's multiple comparisons test. (c) Fluorescence images showing the level of phospho-H2AX (DNA damage marker)
Figure 7B:
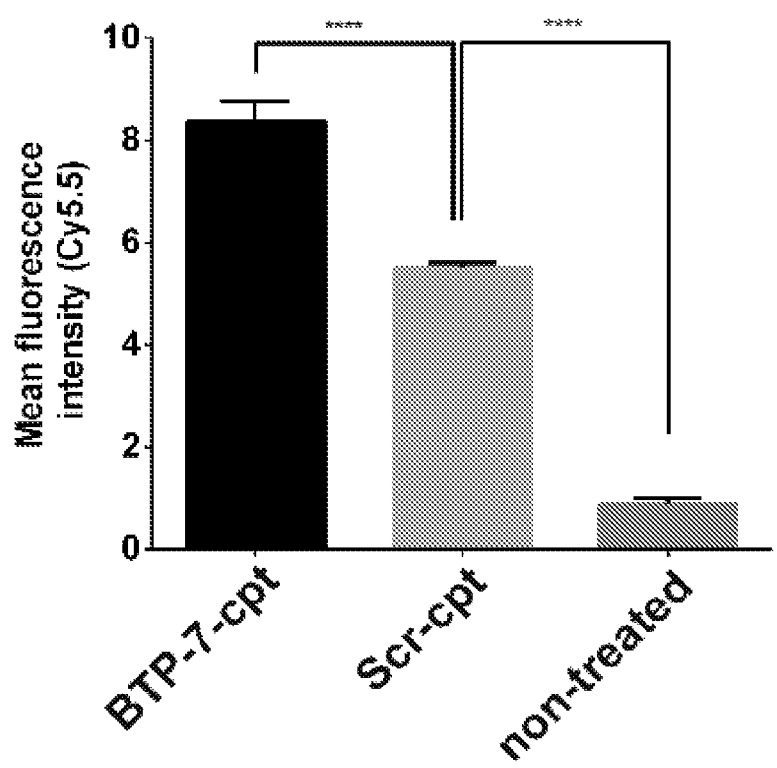
Figure 7C:
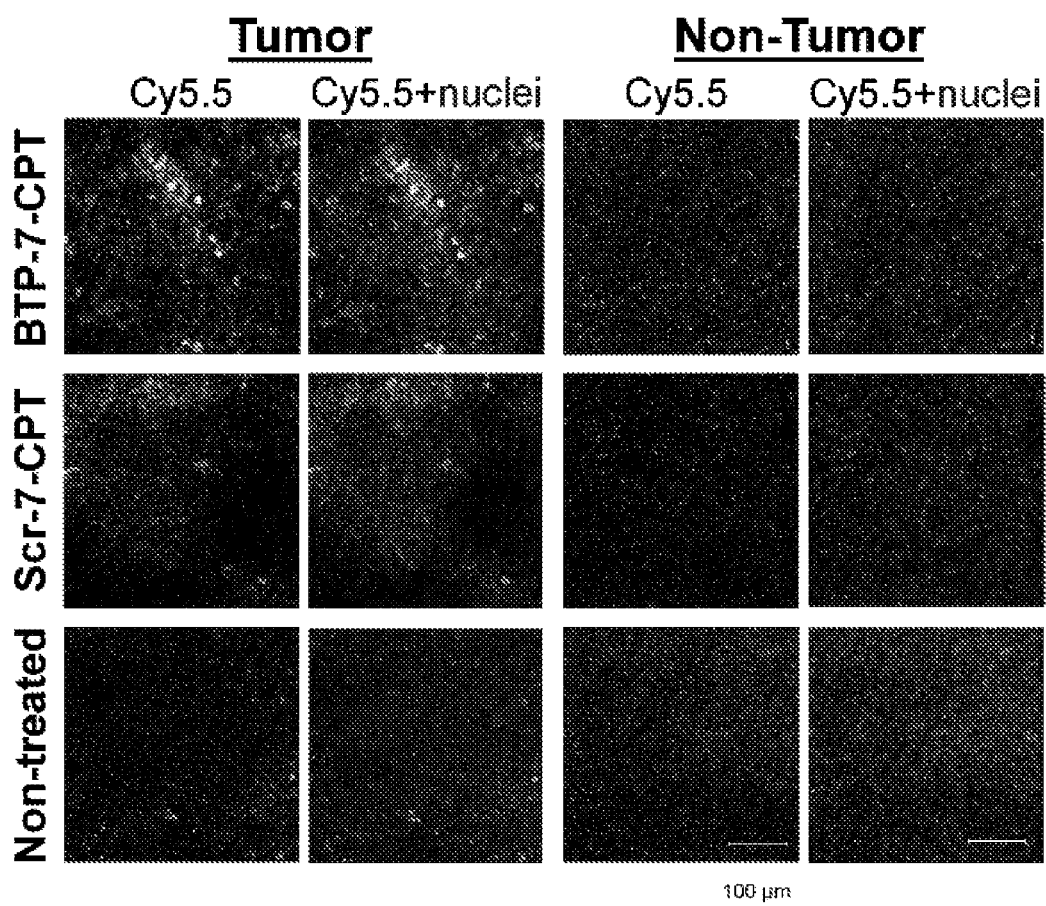
Figure 7D:
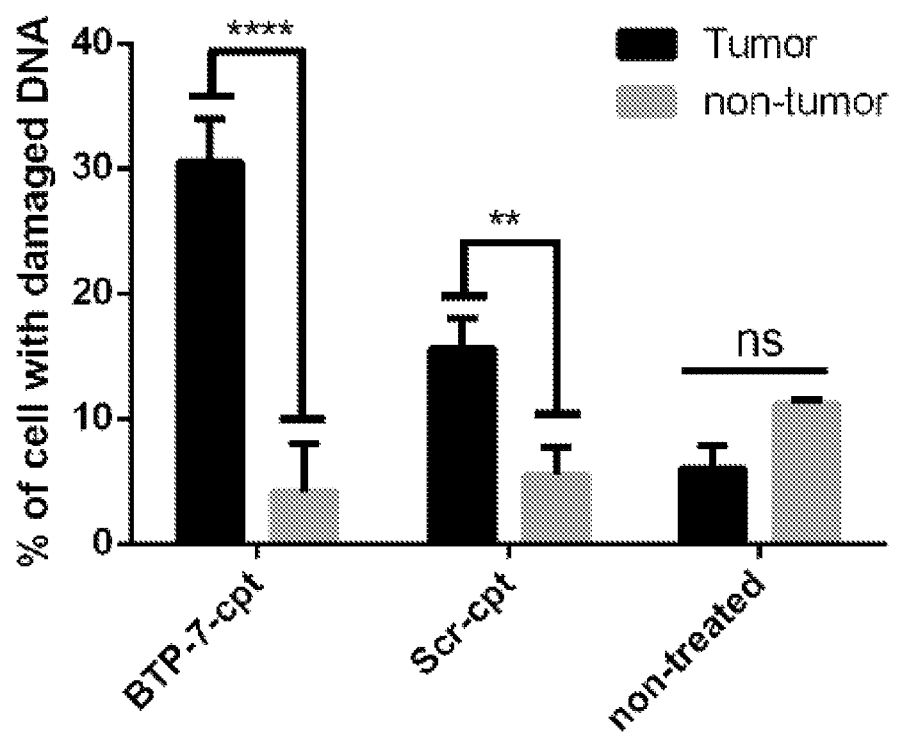

Ex vivo analyses using immunofluorescence staining of brain cryo-sections from all three groups at Day 49 was performed to evaluate the specificity of each drug at the molecular level. Upon $CO_2$ asphyxiation, transcardial perfusion with PBS followed by formalin was performed so that the entire brain could be fixed. The frontal lobe was cryo-sectioned, and the whole brain slice was stained for expression of phospho-H2AX to assess the level of DNA damage. The tumor tissues in the BTP-7-CPT group exhibited a significantly higher levels of phospho-H2AX than tumor tissues from the Scr-7-CPT group (FIG. 7a, b, c). Tumors from both treated groups displayed much higher phospho-H2AX level compared with tumors from the vehicle group (FIG. 7a, b, c). Quantification estimated about 30% of the GBM-6 tumor tissues from the BTP-7-CPT group and 15% of the tumor tissues from Scr-7-CPT group stained positive for phospho-H2AX and thus, had damaged DNA (FIG. 7c). Furthermore, for both treated groups, the level of phospho-H2AX in the tumor was dramatically higher compared with the contralateral side of the brain containing no tumor (FIG. 7c, d). It was postulated that the increase in DNA damage level in the Scr-7-CPT group was largely an attribute to the enhanced permeability and retention (EPR) effect created by the tumor, as well as the ability of Scr-7 to cross the BBB.

REFERENCES

1. Stupp, R. et al. Radiotherapy plus Concomitant and Adjuvant Temozolomide for Glioblastoma. N. Engl. J. Med. 352, 987-996 (2005).
2. Holland, E. C. Glioblastoma multiforme: the terminator. Proc. Natl. Acad. Sci. U.S.A 97, 6242-6244 (2000).
3. Dhermain, F. G., Hau, P., Lanfermann, H., Jacobs, A. H. & van den Bent, M. J. Advanced MRI and PET imaging for assessment of treatment response in patients with gliomas. Lancet Neurol. 9, 906-920 (2010).
4. Louis, D. N. Molecular pathology of malignant gliomas. Annu. Rev. Pathol. 1, 97-117 (2006).
5. Kemper, E. M., Boogerd, W., Thuis, I., Beijnen, J. H. & van Tellingen, O. Modulation of the blood-brain barrier in oncology: therapeutic opportunities for the treatment of brain tumours? Cancer Treat. Rev. 30, 415-423 (2004).
6. Löscher, W. & Potschka, H. Drug resistance in brain diseases and the role of drug efflux transporters. Nat. Rev. Neurosci. 6, 591-602 (2005).
7. Raavé, R., van Kuppevelt, T. H. & Daamen, W. F. Chemotherapeutic drug delivery by tumoral extracellular matrix targeting. J. Control. Release Off. J. Control. Release Soc. 274, 1-8 (2018).
8. Jaworski, D. M., Kelly, G. M. & Hockfield, S. BEHAB, a new member of the proteoglycan tandem repeat family of hyaluronan-binding proteins that is restricted to the brain. J. Cell Biol. 125, 495-509 (1994).
9. Viapiano, M. S., Bi, W. L., Piepmeier, J., Hockfield, S. & Matthews, R. T. Novel tumor-specific isoforms of BEHAB/brevican identified in human malignant gliomas. Cancer Res. 65, 6726-6733 (2005).
10. Jaworski, D. M., Kelly, G. M., Piepmeier, J. M. & Hockfield, S. BEHAB (brain enriched hyaluronan binding) is expressed in surgical samples of glioma and in intracranial grafts of invasive glioma cell lines. Cancer Res. 56, 2293-2298 (1996).
11. Hu, B., Kong, L. L., Matthews, R. T. & Viapiano, M. S. The proteoglycan brevican binds to fibronectin after proteolytic cleavage and promotes glioma cell motility. J. Biol. Chem. 283, 24848-24859 (2008).
12. Viapiano, M. S., Hockfield, S. & Matthews, R. T. BEHAB/brevican requires ADAMTS-mediated proteolytic cleavage to promote glioma invasion. J. Neurooncol. 88, 261-272 (2008).
13. Zhang, H., Kelly, G., Zerillo, C., Jaworski, D. M. & Hockfield, S. Expression of a cleaved brain-specific extracellular matrix protein mediates glioma cell invasion In vivo. J. Neurosci. Off. J. Soc. Neurosci. 18, 2370-2376 (1998).
14. Lu, R. et al. The role of brevican in glioma: promoting tumor cell motility in vitro and in vivo. BMC Cancer 12, 607 (2012).
15. Ladner, R. C., Sato, A. K., Gorzelany, J. & de Souza, M. Phage display-derived peptides as therapeutic alternatives to antibodies. Drug Discov. Today 9, 525-529 (2004).
16. Zhang, X.-X., Eden, H. S. & Chen, X. Peptides in cancer nanomedicine: drug carriers, targeting ligands and protease substrates. J. Control. Release Off. J. Control. Release Soc. 159, 2-13 (2012).
17. Milton, R., Milton, S. & Kent, S. Total chemical synthesis of a D-enzyme: the enantiomers of HIV-1 protease show reciprocal chiral substrate specificity [corrected]. Science 256, 1445-1448 (1992).

18. Welch, B. D., VanDemark, A. P., Heroux, A., Hill, C. P. & Kay, M. S. Potent D-peptide inhibitors of HIV-1 entry. Proc. Natl. Acad. Sci. 104, 16828-16833 (2007).
19. Lam, K. S. et al. A new type of synthetic peptide library for identifying ligand-binding activity. Nature 354, 82-84 (1991).
20. Cho, C.-F., Amadei, G. A., Breadner, D., Luyt, L. G. & Lewis, J. D. Discovery of novel integrin ligands from combinatorial libraries using a multiplex 'beads on a bead' approach. Nano Lett. 12, 5957-5965 (2012).
21. Cho, C.-F., Behnam Azad, B., Luyt, L. G. & Lewis, J. D. High-throughput screening of one-bead-one-compound peptide libraries using intact cells. ACS Comb. Sci. 15, 393-400 (2013).
22. Cho, C.-F. et al. Design of a Microfluidic Chip for Magnetic-Activated Sorting of One-Bead-One-Compound Libraries. ACS Comb. Sci. 18, 271-278 (2016).
23. Cho, C.-F. et al. Viral nanoparticles decorated with novel EGFL7 ligands enable intravital imaging of tumor neovasculature. Nanoscale 9, 12096-12109 (2017).
24. Garcia-Carbonero, R. & Supko, J. G. Current perspectives on the clinical experience, pharmacology, and continued development of the camptothecins. Clin. Cancer Res. Off. J. Am. Assoc. Cancer Res. 8, 641-661 (2002).
25. Motl, S., Zhuang, Y., Waters, C. M. & Stewart, C. F. Pharmacokinetic considerations in the treatment of CNS tumours. Clin. Pharmacokinet. 45, 871-903 (2006).
26. Morgan, M. T. et al. Dendrimer-encapsulated camptothecins: increased solubility, cellular uptake, and cellular retention affords enhanced anticancer activity in vitro. Cancer Res. 66, 11913-11921 (2006).
27. Oberlies, N. H. & Kroll, D. J. Camptothecin and taxol: historic achievements in natural products research. J. Nat. Prod. 67, 129-135 (2004).
28. Mijalis, A. J. et al. A fully automated flow-based approach for accelerated peptide synthesis. Nat. Chem. Biol. 13, 464-466 (2017).
29. Amadei, G. A., Cho, C.-F., Lewis, J. D. & Luyt, L. G. A fast, reproducible and low-cost method for sequence deconvolution of 'on-bead' peptides via 'on-target' maldi-TOF/TOF mass spectrometry. J. Mass Spectrom. JMS 45, 241-251 (2010).
30. Henne, W. A., Doorneweerd, D. D., Hilgenbrink, A. R., Kularatne, S. A. & Low, P. S. Synthesis and activity of a folate peptide camptothecin prodrug. Bioorg. Med. Chem. Lett. 16, 5350-5355 (2006).
31. Cho, C.-F. et al. Blood-brain-barrier spheroids as an in vitro screening platform for brain-penetrating agents. Nat. Commun. 8, 15623 (2017).
32. Fadzen, C. M. et al. Perfluoroarene-Based Peptide Macrocycles to Enhance Penetration Across the Blood-Brain Barrier. J. Am. Chem. Soc. 139, 15628-15631 (2017).
33. Lam, K. S. et al. A new type of synthetic peptide library for identifying ligand-binding activity. Nature 354, 82-84 (1991).
34. Cho, C.-F., Amadei, G. A., Breadner, D., Luyt, L. G. & Lewis, J. D. Discovery of novel integrin ligands from combinatorial libraries using a multiplex 'beads on a bead' approach. Nano Lett. 12, 5957-5965 (2012).
35. Viapiano, M. S., Matthews, R. T. & Hockfield, S. A novel membrane-associated glycovariant of BEHAB/brevican is up-regulated during rat brain development and in a rat model of invasive glioma. J. Biol. Chem. 278, 33239-33247 (2003).
36. Giannini, C. et al. Patient tumor EGFR and PDGFRA gene amplifications retained in an invasive intracranial xenograft model of glioblastoma multiforme. Neuro-Oncol. 7, 164-176 (2005).
37. Hayashi-Takanaka, Y., Stasevich, T. J., Kurumizaka, H., Nozaki, N. & Kimura, H. Evaluation of Chemical Fluorescent Dyes as a Protein Conjugation Partner for Live Cell Imaging. PLoS ONE 9, e106271 (2014).
38. Saito, G., Swanson, J. A. & Lee, K.-D. Drug delivery strategy utilizing conjugation via reversible disulfide linkages: role and site of cellular reducing activities. Adv. Drug Deliv. Rev. 55, 199-215 (2003).
39. McLendon, R. et al. Comprehensive genomic characterization defines human glioblastoma genes and core pathways. Nature 455, 1061-1068 (2008).
40. Verhaak, R. G. W. et al. Integrated genomic analysis identifies clinically relevant subtypes of glioblastoma characterized by abnormalities in PDGFRA, IDH1, EGFR, and NF1. Cancer Cell 17, 98-110 (2010).
41. Polivka, J. et al. Advances in Experimental Targeted Therapy and Immunotherapy for Patients with Glioblastoma Multiforme. Anticancer Res. 37, 21-33 (2017).
42. Johnson, B. E. et al. Mutational Analysis Reveals the Origin and Therapy-Driven Evolution of Recurrent Glioma. Science 343, 189-193 (2014).
43. Phillips, H. S. et al. Molecular subclasses of high-grade glioma predict prognosis, delineate a pattern of disease progression, and resemble stages in neurogenesis. Cancer Cell 9, 157-173 (2006).
44. Dwyer, C. A., Bi, W. L., Viapiano, M. S. & Matthews, R. T. Brevican knockdown reduces late-stage glioma tumor aggressiveness. J. Neurooncol. 120, 63-72 (2014).
45. Kalepu, S. & Nekkanti, V. Insoluble drug delivery strategies: review of recent advances and business prospects. Acta Pharm. Sin. B 5, 442-453 (2015).
46. Chen, Y. & Liu, L. Modern methods for delivery of drugs across the blood-brain barrier. Adv. Drug Deliv. Rev. 64, 640-665 (2012).
47. Leriche, G., Chisholm, L. & Wagner, A. Cleavable linkers in chemical biology. Bioorg. Med. Chem. 20, 571-582 (2012).
48. Rudolf et al., Curr Opin Chem Biol. 2013 February; 17(1):110-7.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An isolated peptide that binds to deglycosylated brevican (BΔg), wherein the peptide comprises a sequence of one of SEQ ID NOs: 6-9, or a variant thereof that is at least 80% identical to a sequence of one of SEQ ID NOs: 6-9, wherein the variant retains the ability to bind BΔg, and wherein the peptide is no more than 40 amino acids long.

2. The isolated peptide of claim 1, wherein the peptide comprises TKWGHVNK (SEQ ID NO:6) or a variant thereof.

3. The isolated peptide of claim 1, wherein the peptide is modified.

4. The isolated peptide of claim 3, wherein one or more of the amino acids in the peptide sequence are D-amino acid enantiomers.

5. The isolated peptide of claim 3, wherein the peptide is cyclized.

6. The isolated peptide of claim 3, wherein the peptide is biotinylated at the amino terminus and/or amidated at the carboxy terminus.

7. The isolated peptide of claim 1, wherein the peptide is linked to a payload.

8. The isolated peptide of claim 7, wherein the payload is selected from the group consisting of therapeutic agents and detectable agents.

9. The isolated peptide of claim 7, wherein the payload is selected from the group consisting of antibodies, peptides, oligonucleotides, and microbubbles.

10. The isolated peptide of claim 8, wherein the therapeutic agent comprises a cytotoxin, radioactive ion, or chemotherapeutic agent.

11. The isolated peptide of claim 8, wherein the detectable agent comprises a fluorophore, radioactive ion, or contrast agent.

12. The isolated peptide of claim 8, wherein the detectable agent comprises a nanoparticle.

13. The isolated peptide of claim 12, wherein the nanoparticle comprises an iron oxide nanoparticle; peptide-coated nanoparticle; gold nanoparticle; superparamagnetic iron oxide nanoparticle micelle; liposome; or polymeric micelle.

14. A composition comprising the isolated peptide of claim 1.

15. An isolated peptide that binds to deglycosylated brevican (BΔg), wherein the peptide comprises a sequence of SEQ ID NO: 7 or 8, or a variant thereof that is at least 80% identical to a sequence of SEQ ID NO: 7 or 8, wherein the variant retains the ability to bind BΔg, and wherein the peptide is no more than 20 amino acids long.

16. An isolated peptide that binds to deglycosylated brevican (BΔg), wherein the peptide comprises a sequence of SEQ ID NOs: 6 or 9, or a variant thereof that is at least 95% identical to a sequence of SEQ ID NOs: 6 or 9 or has up to one amino acid difference from the sequence of one of SEQ ID NOs: 6 or 9, wherein the variant retains the ability to bind BΔg.

17. The isolated peptide of claim 16, which is no more than 40 amino acids long.

18. The isolated peptide of claim 17, which is no more than 20 amino acids long.

19. The isolated peptide of claim 16, wherein the peptide comprises a variant that is at least 95% identical to SEQ ID NO:6 or has up to one amino acid difference from SEQ ID NO:6.

20. The isolated peptide of claim 19, wherein the peptide is modified.

21. The isolated peptide of claim 20, wherein one or more of the amino acids in the peptide sequence are D-amino acid enantiomers.

22. The isolated peptide of claim 20, wherein the peptide is cyclized.

23. The isolated peptide of claim 20, wherein the peptide is biotinylated at the amino terminus and/or amidated at the carboxy terminus.

24. The isolated peptide of claim 19, wherein the peptide is linked to a payload.

25. The isolated peptide of claim 24, wherein the payload is selected from the group consisting of therapeutic agents and detectable agents.

26. The isolated peptide of claim 24, wherein the payload is selected from the group consisting of antibodies, peptides, oligonucleotides, and microbubbles.

27. The isolated peptide of claim 25, wherein the therapeutic agent comprises a cytotoxin, radioactive ion, or chemotherapeutic agent.

28. The isolated peptide of claim 25, wherein the detectable agent comprises a fluorophore, radioactive ion, or contrast agent.

29. The isolated peptide of claim 25, wherein the detectable agent comprises a nanoparticle.

30. The isolated peptide of claim 29, wherein the nanoparticle comprises an iron oxide nanoparticle; peptide-coated nanoparticle; gold nanoparticle; superparamagnetic iron oxide nanoparticle micelle; liposome; or polymeric micelle.

31. The isolated peptide of claim 19, which is no more than 40 amino acids long.

32. The isolated peptide of claim 31, which is no more than 20 amino acids long.

33. A composition comprising the isolated peptide of claim 19.

34. The isolated peptide of claim 4, wherein all the amino acids in the peptide sequence are D-amino acid enantiomers.

35. The isolated peptide of claim 21, wherein all the amino acids in the peptide sequence are D-amino acid enantiomers.

36. A composition comprising the isolated peptide of claim 35.

* * * * *

SEQUENCE LISTING

<160> NUMBER OF SEQ ID NOS: 13

<210> SEQ ID NO 1

```
<211> LENGTH: 14
<212> TYPE: PRT
<213> ORGANISM: Artificial
<220> FEATURE:
<223> OTHER INFORMATION: synthetically generated peptide

<400> SEQUENCE: 1

Val His Gly Pro Pro Thr Glu Thr Leu Pro Thr Pro Arg Glu
1               5                   10

<210> SEQ ID NO 2
<211> LENGTH: 14
<212> TYPE: PRT
<213> ORGANISM: Artificial
<220> FEATURE:
<223> OTHER INFORMATION: synthetically generated peptide

<400> SEQUENCE: 2

Thr Arg Glu Leu Thr Pro Gly Val Glu Thr His Pro Pro Pro
1               5                   10

<210> SEQ ID NO 3
<211> LENGTH: 8
<212> TYPE: PRT
<213> ORGANISM: Artificial
<220> FEATURE:
<223> OTHER INFORMATION: synthetically generated peptide

<400> SEQUENCE: 3

Trp Arg Lys Ala Phe Thr Gly Tyr
1               5

<210> SEQ ID NO 4
<211> LENGTH: 8
<212> TYPE: PRT
<213> ORGANISM: Artificial
<220> FEATURE:
<223> OTHER INFORMATION: synthetically generated peptide

<400> SEQUENCE: 4

Arg Arg Arg His Asp Ala Asn Pro
1               5

<210> SEQ ID NO 5
<211> LENGTH: 8
<212> TYPE: PRT
<213> ORGANISM: Artificial
<220> FEATURE:
<223> OTHER INFORMATION: synthetically generated peptide

<400> SEQUENCE: 5

Asn Lys His Val Phe Arg His Trp
1               5

<210> SEQ ID NO 6
<211> LENGTH: 8
<212> TYPE: PRT
<213> ORGANISM: Artificial
<220> FEATURE:
<223> OTHER INFORMATION: synthetically generated peptide

<400> SEQUENCE: 6

Thr Lys Trp Gly His Val Asn Lys
1               5

<210> SEQ ID NO 7
<211> LENGTH: 8
```

```
<212> TYPE: PRT
<213> ORGANISM: Artificial
<220> FEATURE:
<223> OTHER INFORMATION: synthetically generated peptide

<400> SEQUENCE: 7

Thr Ile Arg Lys Leu Val Arg His
1               5

<210> SEQ ID NO 8
<211> LENGTH: 8
<212> TYPE: PRT
<213> ORGANISM: Artificial
<220> FEATURE:
<223> OTHER INFORMATION: synthetically generated peptide

<400> SEQUENCE: 8

Ala Asp Arg Arg Gln Arg Ala Ile
1               5

<210> SEQ ID NO 9
<211> LENGTH: 8
<212> TYPE: PRT
<213> ORGANISM: Artificial
<220> FEATURE:
<223> OTHER INFORMATION: synthetically generated peptide

<400> SEQUENCE: 9

Ser His Trp Ala Val Asn Arg Phe
1               5

<210> SEQ ID NO 10
<211> LENGTH: 19
<212> TYPE: DNA
<213> ORGANISM: Artificial
<220> FEATURE:
<223> OTHER INFORMATION: synthetic PCR primer sequence

<400> SEQUENCE: 10
gctcctgcag ctttagcag                                             19

<210> SEQ ID NO 11
<211> LENGTH: 19
<212> TYPE: DNA
<213> ORGANISM: Artificial
<220> FEATURE:
<223> OTHER INFORMATION: synthetic PCR primer sequence

<400> SEQUENCE: 11
aggtagtgga cgtggcaag                                             19

<210> SEQ ID NO 12
<211> LENGTH: 8
<212> TYPE: PRT
<213> ORGANISM: Artificial
<220> FEATURE:
<223> OTHER INFORMATION: synthetically generated peptide

<400> SEQUENCE: 12

Lys Asn Val His Gly Trp Lys Thr
1               5

<210> SEQ ID NO 13
<211> LENGTH: 14
<212> TYPE: PRT
<213> ORGANISM: Artificial
<220> FEATURE:
```

```
<223> OTHER INFORMATION: synthetically generated peptide

<400> SEQUENCE: 13

Val His Gly Pro Pro Thr Glu Thr Leu Pro Thr Pro Arg Glu
1               5                   10
```